United States Patent
Wang et al.

(10) Patent No.: US 9,809,784 B2
(45) Date of Patent: *Nov. 7, 2017

(54) LAUNDRY DETERGENTS AND CLEANING COMPOSITIONS COMPRISING SULFONATE GROUP-CONTAINING POLYMERS

(71) Applicant: The Procter & Gamble Company, Cincinnati, OH (US)

(72) Inventors: Xiaoli Wang, Beijing (CN); Xianling Zhai, Beijing (CN); Peng Qin, Beijing (CN); Xiaoyan Liu, Beijing (CN); Akiko Hemmi, Osaka (JP); Hirotaka Mizoguchi, Osaka (JP); Rika Matsumoto, Osaka (JP)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,175

(22) Filed: Sep. 23, 2015

(65) Prior Publication Data

US 2016/0090553 A1   Mar. 31, 2016

(30) Foreign Application Priority Data

Sep. 25, 2014   (WO) .................... CN2014/087376

(51) Int. Cl.
| | | |
|---|---|---|
| *C11D 3/37* | (2006.01) | |
| *C11D 1/02* | (2006.01) | |
| *C11D 3/00* | (2006.01) | |
| *C08F 216/16* | (2006.01) | |
| *C08F 220/06* | (2006.01) | |

(52) U.S. Cl.
CPC .......... *C11D 3/0036* (2013.01); *C08F 216/16* (2013.01); *C08F 220/06* (2013.01); *C11D 3/378* (2013.01); *C11D 3/3723* (2013.01); *C11D 3/3788* (2013.01)

(58) Field of Classification Search
CPC ....... C11D 3/37; C11D 3/3707; C11D 3/3757; C11D 3/378

See application file for complete search history.

(56) References Cited

U.S. PATENT DOCUMENTS

| | | | |
|---|---|---|---|
| 6,451,952 B2 | 9/2002 | Yamaguchi et al. | |
| 7,390,776 B2 | 6/2008 | Tsumori et al. | |
| 8,586,523 B2 * | 11/2013 | Dupont | C08F 216/14 510/276 |
| 8,877,962 B2 | 11/2014 | Nakano et al. | |
| 2011/0183880 A1 | 7/2011 | Yoneda et al. | |
| 2011/0245132 A1 * | 10/2011 | Dupont | C08F 216/14 510/357 |

FOREIGN PATENT DOCUMENTS

| | | | | |
|---|---|---|---|---|
| EP | 798320 | * | 10/1997 | ............ C08F 222/00 |
| JP | 2004075977 | | 3/2004 | |
| JP | 2008208375 | | 9/2008 | |
| JP | 2010111792 | | 5/2010 | |
| WO | WO 2014/032264 A1 | | 3/2014 | |
| WO | WO 2016/045031 A1 | | 3/2016 | |

OTHER PUBLICATIONS

International Search Report for Application No. PCT CN/2014/087376, dated Jun. 16, 2015, containing 5 pages.

* cited by examiner

*Primary Examiner* — Brian P Mruk
(74) *Attorney, Agent, or Firm* — Gregory S. Darley-Emerson; Leonard W. Lewis; Steven W. Miller

(57) ABSTRACT

The present invention relates to a detergent or cleaning composition, preferably a liquid laundry detergent composition, comprising a sulfonate group-containing copolymer, which is useful in improving anti-soil redeposition in high water hardness conditions and whiteness maintenance benefit of such detergent or cleaning composition. Processes for making and methods of using the detergent or cleaning composition are also encompassed by the present invention.

23 Claims, No Drawings

LAUNDRY DETERGENTS AND CLEANING COMPOSITIONS COMPRISING SULFONATE GROUP-CONTAINING POLYMERS

FIELD OF THE INVENTION

The present invention is in the field of detergent or cleaning compositions. In particular, it relates to a liquid laundry detergent composition comprising sulfonate group-containing copolymers with structural units derived from: (i) a sulfonate group-containing monomer, (ii) a polyoxyalkylene monomer, and (iii) a carboxyl group-containing monomer. Such copolymers have specific molecular weights, specific mass ratios between different structural units, and specific numbers of repeating oxyaklyene units in the polyoxyalkylene monomer, which are carefully balanced so as to improve the cleaning performance of laundry detergent compositions containing such copolymers. Further, the copolymers of the present invention are compatible with liquid laundry detergent compositions, with minimal risk of phase separation (which is a particular challenge when formulating liquid detergent products). Processes for making and methods of using the detergent or cleaning compositions are also encompassed by the present invention.

BACKGROUND OF THE INVENTION

An important purpose of detergents and/or cleaning compositions is to remove soils and stains from fabrics to achieve consumer perceivable cleaning benefit. The ability of a particular detergent or cleaning composition to remove soils and stains is determined not only by the surfactant activity level in the composition, but also by many others factors.

For example, the wash water used with detergents or cleaning compositions may contain various metal ions (e.g., calcium or magnesium ions) that can chemically combine with surfactants in the wash to form insoluble precipitates, which not only render the surfactant ineffective for soil/stain removal, but also form scums that further soil the fabric surface. Therefore, water with a higher concentration of metal ions (i.e., hard water) presents a particularly challenging wash condition. This challenge is further exacerbated by the recent change in consumers' laundering habits that are aiming at reducing energy consumption (e.g., by re-using wash water, such as re-using bath water for laundering) and improving environmental sustainability (e.g., by eliminating phosphate and/or zeolite builders and reducing total surfactant content in detergents) of the laundering processes. This brings additional challenges because re-used wash water tends to have harder (i.e., high concentrations of metal ions) and increased levels of soil contaminants, and elimination of phosphate and/or zeolite builder and reduction of total surfactant content in the detergent or cleaning compositions may lead to significant reduction in the cleaning performance.

Various polymers have been used in detergents or cleaning compositions in recent years as detergent builders in augmenting the cleaning power of surfactants. For example, some polymers can bind calcium ions and/or other alkali earth metal ions in water, thereby improving the water hardness tolerance of the detergents or cleaning compositions and allowing either elimination or significant reduction of conventional phosphate and/or zeolite builders in such compositions. Other polymers can effectively suspend soil particles (either inorganic or organic) that have already been removed from the fabric surface by surfactants, in the wash liquor and prevent their redeposition back onto the fabric surface during subsequent wash and rinse steps.

Water-soluble copolymers formed by polymerization of one or more monomers derived from unsaturated monocarboxylic acid, unsaturated polyalkylene glycol, and sulfonate group-containing hydrocarbons (such as those disclosed in Japanese Patent Application Publication Nos. JP2004-75977 and JP2010-111792A; U.S. Pat. No. 6,451,952 and U.S. Pat. No. 7,390,776) have demonstrated effectiveness as polymeric detergent builders. Specifically, JP2010-111792A discloses a group of copolymers containing structural units derived from sulfonate group-containing monomers, polyoxyalkylene monomers, and carboxylic acid monomers, which exhibited improved effectiveness in anti-soil redeposition and can be used in detergent or cleaning compositions to improve the overall cleaning performance thereof. However, there is still room for improvement in such polymers with respect to their anti-soil redeposition properties, and particularly their anti-redeposition properties against hydrophilic soils (such as clay) under high water hardness conditions.

There is a continuing need for a detergent or cleaning composition with superior cleaning performance than has existed before. In particular, there is a need for a detergent or cleaning composition incorporating water-soluble polymers with further improved anti-soil redeposition efficacy, especially anti-redeposition efficacy against hydrophilic soil under higher water hardness conditions. It would also be advantageous to provide laundry detergent compositions with improved fabric whiteness maintenance benefit after repeated wash cycles over extended periods of time. Further, it would be advantageous to provide liquid laundry detergent compositions with improved phase stability, i.e., exhibiting little or no phase separation over time even under environmental stresses imposed by harsh shipping conditions (e.g., elevated temperate and sun exposure).

SUMMARY OF THE INVENTION

It is a discovery of the present invention that when a detergent or cleaning composition contains copolymers with structural units as broadly and generally disclosed by JP2010-111792A, but which are characterized by specific molecular weights, specific mass ratios between different structural units, and specific numbers of repeating oxyaklyene units in the polyoxyalkylene monomer that are carefully selected to meet the criteria as described hereinafter, the anti-soil redeposition efficacy of such a detergent or cleaning composition is further improved, especially against hydrophilic soil under wash conditions marked by higher water hardness (i.e., higher water hardness tolerance). The detergent or cleaning composition of the present invention produces a low amount of salt precipitates and has a high washing effect even when used in an area where there is hard water with high concentrations of calcium ions and magnesium ions (for example, not less than 100 mg/L). The effect is particularly remarkable when the detergent composition contains an anionic surfactant such as LAS. Further, such a detergent or cleaning composition exhibits improved fabric whiteness maintenance benefit and/or satisfactory phase stability when it is in a liquid form.

In a first aspect, the present invention relates to a detergent or cleaning composition comprising a sulfonate group-containing copolymer that contains:
   (i) a structural unit (a) derived from a sulfonate group-containing monomer (A);

(ii) a structural unit (b) derived from a polyoxyalkylene monomer (B) represented by the following formula (1):

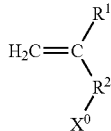
(1)

while $R^1$ represents a hydrogen atom or a methyl group; $R^2$ represents a direct bond, —$CH_2$—, or —$CH_2CH_2$—; and $X^0$ represents a structural unit represented by the following formula (2):

—Zn—$OR^0$ (2)

while Z may be the same or different and each represents a structural unit derived from a $C_2$-$C_{20}$ alkylene oxide; $R^0$ represents hydrogen atom or a $C_1$-$C_{30}$ organic group; and n is an integer of from 1 to about 200; and (iii) a structural unit (c) derived from a carboxyl group-containing monomer (C), while the sulfonate group-containing copolymer includes from about 20% to about 90% by mass in an acid form equivalent of the structural unit (c) in 100% by mass of all monomer structural units constituting the sulfonate group-containing copolymer, and while the sulfonate group-containing copolymer is characterized by a parameter of of P×Mw×n that ranges from about 950,000 to about 800,000,000, in which:

P is defined as the ratio by mass of the structural unit (b) to the structural unit (a) in the sulfonate group-containing copolymer is P;

Mw is the weight average molecular weight of the sulfonate group-containing copolymer; and n is the integer in the formula (2) described hereinabove.

Preferably but not necessarily, the weight average molecular weight (Mw) of the sulfonate group-containing copolymer is from about 20,000 to about 200,000, more preferably from about 25,000 to about 100,000 and most preferably from about 30,000 to about 75,000.

The ratio by mass (P) of the structural unit (b) to the structural unit (a) in the sulfonate group-containing copolymer is preferably from about 1.2 to about 20, more preferably from about 1.5 to about 15 and most preferably from about 2 to about 10.

In a second aspect, the present invention relates to a detergent or cleaning composition comprising a sulfonate group-containing copolymer that contains:

(i) a structural unit (a) derived from a sulfonate group-containing monomer (A);

(ii) a structural unit (b) derived from a polyoxyalkylene monomer (B) represented by the following formula (1):

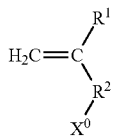
(1)

while $R^1$ represents a hydrogen atom or a methyl group; $R^2$ represents a direct bond, $CH_2$, or $CH_2CH_2$; and $X^0$ represents a structural unit represented by the following formula (2):

—Zn—$OR^0$ (2)

while Z may be the same or different and each represents a structural unit derived from a $C_2$-$C_{20}$ alkylene oxide; $R^0$ represents hydrogen atom or a $C_1$-$C_{30}$ organic group; and n is an integer of from 1 to about 200; and (iii) a structural unit (c) derived from a carboxyl group-containing monomer (C), while the sulfonate group-containing copolymer includes from about 20% to about 90% by mass in an acid form equivalent of the structural unit (c) in 100% by mass of all monomer structural units constituting the sulfonate group-containing copolymer; the ratio by mass of the structural unit (b) to the structural unit (a) in the sulfonate group-containing copolymer is P, which ranges from about about 1.2 to about 20; the sulfonate group-containing copolymer has a weight average molecular weight of Mw, which ranges from about 20,000 to about 200,000; and the product (P×Mw) of the ratio by mass (P) of the structural unit (b) to the structural unit (a) in the sulfonate group-containing copolymer multiplied by the weight average molecular weight (Mw) of the sulfonate group-containing copolymer ranges from about 25,000 to about 2,000,000.

Please note that all descriptions directed to "sulfonate group-containing copolymer" or simply "copolymer" hereinafter shall apply to sulfonate group-containing copolymers of both the first and the second aspects of the present invention, unless otherwise noted.

In a particularly preferred embodiment of the present invention, the sulfonate group-containing monomer (A) in the copolymer is a compound represented by the following formula (3):

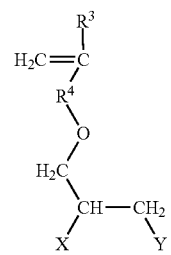
(3)

wherein $R^3$ represents a hydrogen atom or a methyl group; $R^4$ represents a direct bond, $CH_2$, or $CH_2CH_2$; X and Y each represent a hydroxy group or $SO_3M$ where M represents a hydrogen atom, Li, Na, or K, and at least one of X and Y is $SO_3M$.

The sulfonate group-containing copolymer as described hereinabove preferably contains from about 2% to about 38%, more preferably from about 4% to about 20% and most preferably from about 5% to about 16%, by mass in an acid form equivalent of the structural unit (a) in 100% by mass of all monomer structural units constituting the sulfonate group-containing copolymer. It may also contain from about 9% to about 76%, preferably from about 20% to about 49% and more preferably from about 30% to about 45%, by mass of the structural unit (b) in 100% by mass of all monomer structural units constituting the sulfonate group-containing copolymer. The integer (n) in formula (2), which represents the number of repeating oxyalkylene unit in the structural unit (b), is preferably from about 5 to about 100, more preferably form about 10 to about 80, still more preferably from about 25 to 70, and most preferably from about 40 to about 60. The sulfonate group-containing copolymer may also contain from about 25% to about 85%, preferably from about 35% to about 75% and more preferably from about 40% to about 55%, by mass in acid form equivalent of the structural unit (c) in 100% by mass of all monomer structural units constituting the sulfonate group-containing copolymer.

In a most preferred embodiment of the present invention, the sulfonate group-containing copolymer contains:
(i) from about 5% to about 16% by mass of the structure unit (a) in acid form equivalent in 100% by mass of all monomer structural units constituting the sulfonate group-containing copolymer, wherein the sulfonate group-containing monomer (A) is 3-allyloxy-2-hydroxypropanesulfonate;
(ii) from about 30% to about 45% by mass of the structure unit (b) in 100% by mass of all monomer structural units constituting the sulfonate group-containing copolymer, wherein the polyoxyalkylene monomer (B) comprises an ethylene oxide-derived group having from about 40 to about 60 repeating oxyethylene units; and
(iii) from about 40% to about 55% by mass of the structure unit (c) in acid form equivalent in 100% by mass of all monomer structural units constituting the sulfonate group-containing copolymer, wherein the carboxyl group-containing monomer (C) is acrylic acid or a salt thereof,
wherein the ratio by mass (P) of the structural unit (b) to the structural unit (a) in the sulfonate group-containing copolymer is from about 2.5 to about 5, wherein the weight average molecular weight (Mw) of the sulfonate group-containing copolymer is from about 30,000 to about 75,000, and wherein the parameter of P×Mw×n ranges from 1,000,000 to 50,000,000.

The detergent or cleaning composition as described hereinabove can be in any solid or liquid product form including, for example, selected from the group consisting of a laundry detergent composition, a hard surface cleaning composition, a hand dishwashing composition, and an automatic dishwashing composition. The detergent or cleaning composition is preferably in a liquid form. More preferably, the detergent or cleaning composition is in a single phase or multiphase unit dose form, i.e., containing a liquid detergent or cleaning composition encapsulated in a single compartment or multi-compartment water-soluble pouch. In a specific embodiment, the detergent or cleaning composition is in a single phase or multiphase unit dose form containing either a liquid automatic dishwashing composition or a liquid laundry detergent composition encapsulated in a single compartment or multi-compartment water-soluble pouch.

Specifically, such a detergent or cleaning composition may further include (in addition to the sulfonate group-containing polymer) a surfactant selected from the group consisting of anionic surfactants, cationic surfactants, nonionic surfactants, amphoteric surfactants, zwitterionic surfactants, and mixtures thereof. The surfactant can be an anionic surfactant selected from the group consisting of alkyl benzene sulfonate, alkoxylated alkyl sulfates, alkyl sulfates, and mixtures thereof.

Preferably, the detergent or cleaning composition of the present invention is a liquid laundry detergent composition that further contains one or more adjunct cleaning additives selected from the group consisting of builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, perfumes, and mixtures thereof. In a particularly preferred embodiment of the present invention, such a detergent or cleaning composition is substantially free of zeolite builder and phosphate builder.

These and other features of the present invention will become apparent to one skilled in the art upon review of the following detailed description when taken in conjunction with the appended claims. Note that preferred embodiments of the present invention include any combination of two or more of those preferred embodiments of the present invention as described hereinbelow.

DETAILED DESCRIPTION OF THE INVENTION

Definitions

As used herein, the articles "a" and "an" when used in a claim, are understood to mean one or more of what is claimed or described.

As used herein, the term "substantially free of" or "substantially free from" means that the indicated material is present in an amount of no more than about 5 wt %, preferably no more than about 2%, and more preferably no more than about 1 wt % by weight of the composition.

As used therein, the term "essentially free of" or "essentially free from" means that the indicated material is present in an amount of no more than about 0.1 wt % by weight of the composition, or preferably not present at an analytically detectable level in such composition. It may include compositions in which the indicated material is present only as an impurity of one or more of the materials deliberately added to such compositions.

As used herein the phrase "detergent composition," "cleaning composition" or "detergent or cleaning composition" includes compositions and formulations designed for cleaning soiled material. Such compositions include but are not limited to, laundry detergent compositions, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. The cleaning compositions may have a form selected from liquid, powder, single-phase or multi-phase unit dose, pouch, tablet, gel, paste, bar, or flake. In a preferred embodiment of the present invention, the detergent or cleaning composition of the present invention is a liquid laundry detergent composition. More preferably, the detergent or cleaning composition is in a single phase or multi-phase unit dose form, e.g., a liquid laundry detergent composition that is contained in a single compartment or multi-compartment water-soluble pouch, e.g., formed by a water-soluble polymer such as poly-vinyl alcohol (PVA) or copolymers thereof.

As used herein, the term "laundry detergent" means a liquid or solid composition, and includes, unless otherwise indicated, granular or powder-form all-purpose or "heavy-duty" washing agents, especially cleaning detergents as well as cleaning auxiliaries such as bleach additives or pre-treat types. In a preferred embodiment of the present invention, the laundry detergent is a liquid laundry detergent composition.

As used herein, the term "water hardness" or "hardness" means uncomplexed cations ion (i.e., $Ca^{2+}$ or $Mg^{2+}$) present in water that have the potential to precipitate under alkaline conditions, and thereby diminishing the surfactancy and cleaning capacity of surfactants. Further, the terms "high water hardness" and "elevated water hardness" can be used interchangeably and are relative terms for the purposes of the present invention, and are intended to include, but not limited to, a hardness level containing at least 12 grams of calcium ion per gallon water (gpg, "American grain hardness" units).

As used herein, the term "average molecular weight" refers to the weight average molecular weight of the polymer chains in a polymer composition. Further, the "weight average molecular weight" ("$M_w$") may be calculated using the equation:

$$M_w = (\Sigma_i N_i M_i^2)/(\Sigma_i N_i M_i)$$

Where $N_i$ is the number of molecules having a molecular weight $M_i$. The weight average molecular weight must be measured by the method described in the Test Methods section.

As used herein, the term "anti-soil redeposition" means the ability of the polymer to prevent soil components from reattaching to fibers or materials in washing treatment using water, which can be measured by the method described in the Test Methods section.

The assays disclosed in the Test Methods section of the present application are used to determine the respective values of the parameters of the present invention, As mentioned hereinabove, the present invention specifically provides a detergent or cleaning composition containing a sulfonate group-containing copolymer comprising: (i) a structural unit (a) derived from a sulfonate group-containing monomer (A); (ii)

a structural unit (b) derived from a polyoxyalkylene monomer (B); and (iii) a structural unit (c) derived from a carboxyl group-containing monomer (C).

Sulfonate Group-Containing Monomer (A)

The sulfonate group-containing monomer (A) of the present invention, which is also referred to as a sulfonate group-containing unsaturated monomer, is a monomer having a sulfonate group and a carbon-carbon double bond. The sulfonate group is intended to include sulfonic acids and their salts. Examples of salts of sulfonic acids include, but are not particularly limited to: metal salts, ammonium salts, and organic amine salts of sulfonic acids. Suitable metal salts preferably include, for example, alkali metal ions such as sodium ions or potassium ions; alkaline earth metal ions such as magnesium ions, calcium ions, strontium ions, or barium ions; aluminum ions; or ferric or ferrous ions. Suitable organic amine salts preferably include organic amine groups such as, for example, an alkanolamine such as monoethanolamine, diethanolamine, or triethanolamine; an alkylamine such as monoethylamine, diethylamine, or triethylamine; or a polyamine such as ethylenediamine or triethylenediamine. The salts of sulfonic acids are preferably potassium sulfonate, sodium sulfonate, ammonium sulfonate, or quaternary amines of sulfonic acids.

The sulfonate group-containing monomer (A) may contain one or more sulfonate groups.

In one preferred but not necessary embodiment of the present invention, the monomer (A) is represented by the following formula (3):

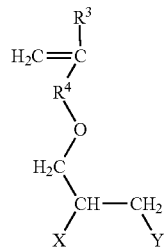

(3)

wherein $R^3$ represents a hydrogen atom or a methyl group; $R^4$ represents a direct bond, $CH_2$, or $CH_2CH_2$; X and Y each represent hydroxy or $SO_3M$ where M represents a hydrogen atom, Li, Na, or K, and at least one of X and Y is $SO_3M$. It is preferred that one of X and Y in the above formula (3) is a $SO_3M$ and the other is a hydroxy group. It is more preferred that X is a hydroxy group and Y is a $SO_3M$. Further, M may represent an ammonium group or an organic amine group as mentioned hereinabove regarding the salts of sulfonic acid. The term "direct bond" as used herein refers to a covalent bond directly connecting two adjacent atoms. Therefore, when $R^4$ is a direct bond, the carbon atom and the oxygen atom adjacent to $R^4$ are directly connected to each other by a covalent bond without any other atom in between.

Suitable examples of the sulfonate group-containing monomer (A) include, but are not limited to: compounds represented by the formula (3) as described hereinabove, 2-acrylamide-2-methylpropanesulfonic acid, styrene sulfonic acid, (meth)allylsulfonic acid, vinyl sulfonic acid, 2-(meth)allyloxyethylenesulfonic acid, and salts thereof. Specifically, compounds falling within the formula (3) as described hereinabove, such as 3-(meth)allyloxy-2-hydroxypropanesulfonic acid and 3-(meth)allyloxy-1-hydroxypropanesulfonic acid as well as salts thereof are, are preferred examples of the sulfonate group-containing monomer (A) of the present invention because it has been observed that copolymers of the present invention having a structural unit derived from a compound represented by the formula (3) has improved anti-soil redeposition properties and increased preservation stability. In order to more successfully ensure the effect of the present invention enough, 3-allyloxy-2-hydroxypropanesulfonic acid and the sodium salt thereof are more preferred. Alternatively, 2-acrylamide-2-methylpropanesulfonic acid and the sodium salt there of are also preferred examples of the sulfonate group-container monomer (A) for the practice of the present invention.

The sulfonate group-containing copolymer contains preferably from about 2% to about 38% by mass in acid form equivalent of the structural unit (a) in 100% by mass of all structural units constituting the sulfonate group-containing copolymer, more preferably from about 2% to about 30% by mass, still more preferably from about 3% to about 25% by mass, further more preferably from about 4% to about 20% by mass, particularly preferably from about 5% to about 18% by mass, and most preferably from about 5% to about 16% by mass.

Further, the sulfonate group-containing copolymer preferably contains no more than about 1% by mass of the structural unit (a) derived from the sulfonate group-containing monomer (A) that has two or more sulfonate groups, in 100% by mass of all structural units constituting the sulfonate group-containing copolymer.

The "acid form equivalent" herein means that the proportion (compositional ratio) of the mass of each of the sulfonate group-containing monomer, the carboxyl group-containing monomer, and other acid group-containing monomers is calculated as the proportion of the acid form of the each monomer. The same shall apply to calculation of the proportion of the mass of the structural unit derived from the monomer relative to the mass of the structural units derived from all monomers contained in the copolymer. Specifically, calculation of the proportion of the mass of sodium acrylate or a structural unit derived therefrom relative to the mass of all monomer components means calculation of the mass of acrylic acid, or the structural unit derived from acrylic acid, as an acid of sodium acrylate; calculation of the proportion of the mass of sodium 3-allyloxy-2-hydroxypropanesulfonate or a structural unit derived therefrom relative to the mass of all monomer components means calculation of the mass of 3-allyloxy-2-hydroxypropanesulfonic acid, or the structural unit derived from 3-allyloxy-2-hydroxypropanesulfonic acid, as an acid of sodium 3-allyloxy-2-hydroxypropanesulfonate. Further, the proportions of the masses of an amine salt group-containing monomer and an amine salt structure-containing structural unit may also be calculated as the proportions of the masses of an amine (amino group)-containing monomer and an amine structure (amino group structure)-containing structural unit, respectively.

The copolymer of the present invention preferably contains the structural unit (a) derived from the sulfonate group-containing monomer (A) represented by the formula (3). The structural unit (a) derived from the sulfonate group-containing monomer represented by the formula (3) hereinabove is a copolymerized structural unit formed by radical polymerization of the sulfonate group-containing monomer represented by the formula (3), which can be represented by the following formula (4):

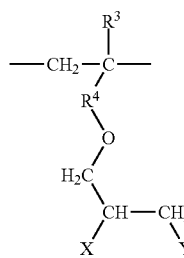
(4)

wherein $R^3$ represents a hydrogen atom or a methyl group; $R^4$ represents a direct bond, $CH_2$, or $CH_2CH_2$; X and Y each represent a hydroxy group or $SO_3M$ where M represents a hydrogen atom, Li, Na, or K, and at least one of X and Y is $SO_3M$. It is preferred that one of X and Y in the above formula (4) is a $SO_3M$ and the other is a hydroxy group. It is more preferred that X is a hydroxy group and Y is a $SO_3M$. Further, M may represent an ammonium group or an organic amine group as mentioned hereinabove regarding the salts of sulfonic acid.

The method for preparing the sulfonate group-containing monomer (B) is not particularly limited, and any suitable method can be used for the preparation. For example, a method for adding a hydrogen sulfite to the glycidyl group of (meth)allylglycidyl ether is mentioned as an example of a simple method for the preparation.

Polyoxyalkylene Monomer (B)

The polyoxyalkylene monomer (B) of the present invention is characterized by having a structure represented by the following formula (1):

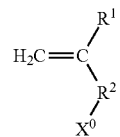
(1)

In the structure represented by the formula (1), $R^1$ can be either a hydrogen atom or a methyl group. $R^2$ can be a direct bond, $CH_2$, or $CH_2CH_2$. Preferably, $R^1$ and $R^2$ are respectively: (i) a hydrogen atom and $CH_2$; (ii) a methyl group and $CH_2$; or (iii) a methyl group and $CH_2CH_2$. More preferably, $R^1$ and $R^2$ are respectively a methyl group and $CH_2$, or a methyl group and $CH_2CH_2$. Most preferably, $R^1$ and $R^2$ are respectively a methyl group and $CH_2CH_2$.

$X^0$ is a structural unit represented by the following formula (2):

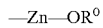
$-Z_n-OR^0$ (2)

In the formula (2), Z represents a structural unit derived from a $C_2$-$C_{20}$ alkylene oxide; $R^0$ represents a hydrogen atom or a $C_1$-$C_{30}$ organic group; and n represents the number of alkylene oxide-derived structural repeating units and is an integer of from about 1 to about 200.

Examples of the organic group in $R^0$ include $C_1$-$C_{30}$ alkyl, $C_2$-$C_{30}$ alkenyl, and $C_6$-$C_{30}$ aryl. These may further have a substituent group. Examples of the substituent group include heterocyclic rings, alkoxy groups, aryloxy groups, alkylthio groups, arylthio groups, alkoxycarbonyl groups, aryloxycarbonyl groups, sulfamoyl groups, acyl groups, acyloxy groups, amide groups, carbamoyl groups, ureido groups, alkylsulfonyl groups, arylsulfonyl groups, amino groups, halogens, fluorohydrocarbon groups, cyano groups, nitro groups, hydroxy, mercapto, and silyl groups. Specific examples of the $C_1$-$C_{30}$ organic group include methyl, ethyl, butyl, octyl, lauryl, cyclohexyl, phenyl, naphthyl, pyridyl, pyrimidyl, imidazolidyl, morpholyl, butenyl, pentenyl, hexenyl, heptenyl, methylcarbonyl, and ethylcarbonyl. $R^0$ is preferably a hydrogen atom or a methyl group, and more preferably a hydrogen atom.

In the formula (2), the "structural unit derived from an alkylene oxide" represents an oxyalkylene structural unit containing a ring-opening alkylene oxide. For example, in cases where an alkylene oxide is ethylene oxide (EO), the "structural unit derived from an alkylene oxide" is a $-OCH_2CH_2-$ (oxyethylene) structural unit containing a ring-opening ethylene oxide. The oxyalkylene structural unit is derived from an alkylene oxide having from about 2 to about 20 carbon atoms, preferably from about 2 to about 15 carbon atoms, more preferably from about 2 to about 10 carbon atoms, still more preferably from about 2 to about 5 carbon atoms, particularly preferably from about 2 to about 3 carbon atoms, and most preferably about 2 carbon atoms.

Examples of the structural unit derived from an alkylene oxide include structural units derived from compounds such as ethylene oxide (EO), propylene oxide (PO), isobutylene oxide, 1-butene oxide, 2-butene oxide, trimethylethylene oxide, tetramethylene oxide, tetramethylethylene oxide, butadiene monoxide, octylene oxide, styrene oxide, and 1,1-diphenyl ethylene oxide. In particular, the structural unit derived from an alkylene oxide (oxyalkylene) is preferably derived from EO or PO (that is, oxyethylene or oxypropylene), and is more preferably oxyethylene. Such a structural unit can contain a single species of oxyalkylene, or it may contain two or more species of oxyalkylenes.

A preferred polyoxyalkylene monomer (B) of the present invention mainly includes multiple repating structural units of oxyethylene (—O—$CH_2$—$CH_2$—). In this case, the phrase "mainly includes . . . oxyethylene" means that if two or more species of oxyalkylenes are present in the monomer, oxyethylene accounts for most of all oxyalkylenes (e.g., no less than about 50 mol %, or preferably no less than about 70 mol %, or more preferably no less than about 80 mol % or about 90 mol %, or most preferably about 100%, relative to 100 mol % of all oxyalkylaenes). This allows smooth progress of polymerization in a production process, and provides excellent effects such as improvement in water solubility or anti-redeposition properties. If the proportion of the oxyethylene is not less than about 50 mol %, the hydrophilicity of the group formed by the oxyalkylene can be further improved.

In the formula (2), n represents the number of alkylene oxide-derived structural repeating units, and it is an integer of from about 1 to about 200, preferably from about 5 to about 100, more preferably from about 10 to about 80, and still more preferably from about 20 to about 80 or from about 25 to about 70, and most preferably from about 40 to about 60. When n is in the above preferred ranges, the compatibility with liquid detergents and the anti-redeposition properties of the resulting sulfonate group-containing copolymer tend to be improved.

The sulfonate group-containing copolymer of the present invention preferably contains from about 9% to about 76% by mass of the structural unit (b) in 100% by mass of all structural units constituting the sulfonate group-containing copolymer, more preferably from about 10% to about 70% by mass, still more preferably from about 12% to about 65% by mass, further more preferably from about 15% to about 60% by mass, particularly preferably from about 18% to about 50% by mass or from about 20% to about 49% by mass, and most preferably from about 30% to about 45% by mass. In the calculation of the total weight of all structural units derived from all monomers in the present invention, the weights of the sulfonate group-containing monomer, the carboxyl group-containing monomer, and other acid group-containing monomers contained in all monomer components are calculated as the weights of their acids monomers.

The copolymer of the present invention is characterized by having the structural unit (b) derived from the polyoxyalkylene monomer (B) represented by the formula (1) hereinabove. The structural unit (b) derived from the polyoxyalkylene monomer herein is a copolymerized structural unit formed by radical polymerization of the polyoxyalkylene monomer (B), and is represented by the following formula (5):

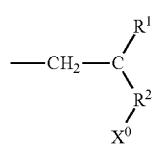

(5)

wherein $R^1$ represents a hydrogen atom or a methyl group; $R^2$ represents a direct bond, $CH_2$, or $CH_2CH_2$; and $X^0$ represents a structural unit represented by the formula (2) described hereinabove.

Method of Producing the Polyoxyalkylene Monomer (B)

The polyoxyalkylene monomer (B) of the present invention as described hereinabove may be produced by any suitable method. Preferably, it is produced by method (I) in which an alkylene oxide is added to an alcohol having a carbon-carbon double bond, such as allyl alcohol, methallyl alcohol, or isoprenol; alternatively, it is produced by method (II) in which a polyalkylene glycol is added to a halide having a carbon-carbon double bond, such as allyl chloride, methallyl chloride, isoprenyl chloride, or vinyl chloride.

In the above-described method (I), an alkylene oxide is added to an alcohol having a carbon-carbon double bond by, for example, 1) anionic polymerization in which a hydroxide of an alkali metal, a strong alkali such as an alkoxide, or alkylamine is used as a base catalyst, 2) cationic polymerization in which a halide of a metal or metalloid, mineral acid, or acetic acid is used as a catalyst, or 3) coordination polymerization in which a combination of an alkoxide of a metal such as aluminum, iron, or zinc, an alkaline-earth compound, and/or Lewis acid is used. Thus, the alkylene oxide is added to the hydroxy group of the alcohol, and the length of the polyoxyalkylene chain so formed is determined by the charge ratio of the alkylene oxide and the alcohol added during the polymerization.

The polyoxyalkylene monomer (B) of the present invention as described hereinabove has good stability during polymerization. Accordingly, the anti-redeposition properties of the resulting copolymer are improved. Further, the polyoxyalkylene monomer (B) of the present invention as described hereinabove provides a copolymer with favorable temporal stability. Further, when processed into various products (compositions) for various applications, the copolymer of the present invention, i.e., containing the structural unit (b) derived from the polyoxyalkylene monomer (B) as described hereinabove, shows excellent stability, and whereby the resulting products preferably exhibit stable performance.

Carboxyl Group-Containing Monomer (C)

The carboxyl group-containing monomer (C) of the present invention, which is also referred to as a carboxyl group-containing unsaturated monomer, is a monomer having a carboxyl group and a carbon-carbon double bond. The carboxyl group is intended to include carboxylic acids and their salts. Examples of the salts of the carboxylic acids include, but are not particularly limited to, metal salts, ammonium salts, and organic amine salts of carboxylic acids. Preferred examples of metal ions in the metal salts include alkali metal ions such as sodium and potassium ions; alkaline earth metal ions such as magnesium, calcium, strontium, and barium ions; aluminum ions; and ferric or ferrous ions. Further, preferred examples of organic amine groups of the organic amine salts include alkanolamines such as monoethanolamine, diethanolamine, and triethanolamine; alkylamines such as monoethylamine, diethylamine, and triethylamine; polyamines such as ethylenediamine and triethylenediamine. Examples of the salts of the carboxylic acids include lithium salts, potassium salts, sodium salts, ammonium salts, and quaternary amine salts.

Examples of the carboxyl group-containing monomer (C) include (meth)acrylic acid, maleic acid and anhydride thereof, fumaric acid, itaconic acid, crotonic acid, 2-methylene glutaric acid, and salts thereof. Particularly preferred carboxyl group-containing monomer (C) is (meth)acrylic acid, maleic acid or anhydride thereof, or a salt thereof, due to their high polymerizability and their ability to form a copolymer with high anti-redeposition properties. Still more preferred carboxyl group-containing monomer (C) is acrylic acid, maleic acid or anhydride thereof, or a salt thereof. Most preferred carboxyl group-containing monomer (C) is acrylic acid or its salt. In the event where the carboxyl group-containing monomer (C) is a compound that can form an acid anhydride, such as maleic acid, the monomer then may be in the acid anhydride form, such as maleic anhydride. The carboxyl group-containing monomers described hereinabove may be used either alone or in combinations of two, three, four or more.

The sulfonate group-containing copolymer of the present invention contains from about 20% to about 90% by mass in acid form equivalent of the structural unit (c) in 100% by mass of all structural units constituting the sulfonate group-containing copolymer. The amount of the structural unit (c) is preferably from about 25% to about 85% by mass, more preferably from about 30% to about 80% by mass, still more preferably from about 35% to about 75% by mass, still more preferably from about 40% to about 73% by mass, and particularly preferably from about 40% to about 55% by mass. The sulfonate group-containing polymer of the present invention having a proportion of the structural unit (c) of from about 20% to about 90% by mass has improved anti-redeposition properties, particularly anti-redeposition properties against hydrophilic soil under high hardness condition. In order to improve the compatibility with liquid detergents as well as the anti-redeposition properties, the proportion of the structural unit (c) is most preferably from about 40% to about 55% by mass. In light of the structure, the proportion of the mass of the carboxyl group-containing monomer that corresponds to a salt of an acid is calculated as the mass of the acid. In cases where the carboxyl group-containing monomer is an acid anhydride, the mass of the monomer is calculated as the mass of the dicarboxylic acid, which is an acid of the monomer, prepared from the acid anhydride by hydrolysis.

The sulfonate group-containing copolymer of the present invention contains preferably from about 1% to about 100% by mass, more preferably from about 20% to about 100% by mass, still more preferably from about 50% to about 100% by mass, particularly preferably from about 80% to about 100% by mass, and most preferably 100% by mass, in acid form equivalent of a structural unit derived from a monocarboxylic acid such as (meth)acrylic acid in 100% by mass of the total of the structural unit (c) derived from the carboxyl group-containing monomer (C).

The copolymer of the present invention contains the structural unit (c) derived from the carboxyl group-containing monomer (C). The structural unit (c) is a copolymerized structural unit formed by radical polymerization of the carboxyl group-containing monomer (C). For example, in cases where the carboxyl group-containing monomer (C) is acrylic acid or a sodium salt thereof, the corresponding structural unit (c) is represented by —$CH_2$—$CH(COOH)$— or —$CH_2$—$CH(COONa)$—.

Other Monomers

The sulfonate group-containing copolymer of the present invention may contain an additional structural unit (e) derived from a monomer (E) other than the sulfonate group-containing monomer (A), the polyoxyalkylene monomer (B), and the carboxyl group-containing monomer (C).

The monomer (E) is not particularly limited, provided that it is copolymerizable with the monomers (A), (B), and (C). Examples of suitable monomers (E) include, but are not limited to: hydroxy group-containing alkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and α-(hydroxymethyl)ethyl (meth)acrylate; alkyl (meth)acrylates prepared by esterification of (meth)acrylic acid with a $C_1$-$C_{18}$ alcohol, such as methyl (meth)acrylate, ethyl (meth)acrylate, butyl (meth)acrylate, cyclohexyl (meth)acrylate, and lauryl (meth)acrylate; amino group-containing acrylates such as dimethylaminoethyl (meth)acrylate and quaternized dimethylaminoethyl (meth)acrylate; amide group-containing monomers such as (meth)acrylamide, dimethyl acrylamide, and isopropyl acrylamide; vinyl esters such as vinyl acetate; alkenes such as ethylene and propylene; aromatic vinyl monomers such as styrene; maleimide derivatives such as maleimide, phenyl maleimide, and cyclohexyl maleimide; nitrile group-containing vinyl monomers such as (meth)acrylonitrile; phosphonic acid (salt) group-containing monomers such as vinylphosphonic acid, (meth)allylphosphonic acid, and their salts; aldehyde group-containing vinyl monomers such as (meth)acrolein; alkyl vinyl ethers such as methyl vinyl ether, ethyl vinyl ether, and butyl vinyl ether; other functional group-containing monomers such as vinyl chloride, vinylidene chloride, allyl alcohol, and vinyl pyrrolidone. These other monomers may be used either alone or in combinations of two, three, four or more.

The structural unit (e) derived from the monomer (E) herein is a copolymerized structural unit formed by radical polymerization of the monomer (E). For example, in cases where the monomer (E) is methyl acrylate, the structural unit (e) is a structural unit represented by —$CH_2$—$CH(COOCH_3)$—.

The sulfonate group-containing copolymer may contain only one structure unit (e) or two or more structure units (e) as described hereinabove.

Preferably, the copolymer of the present invention contains from 0% to about 30% by mass, more preferably from 0% to about 20% by mass, still more preferably from 0% to about 10% by mass, and most preferably 0% by mass of the structural unit (e) derived from the monomer (E) in 100% by mass of all structural units constituting the sulfonate group-containing copolymer.

Preferably, two or more of the structural units (a), (b), (c), and optionally (e) satisfy the above-described proportions (by mass) in the copolymer of the present invention. That is, the copolymer of the present invention containing a combination of the structural units (a), (b), (c) and optionally (e) with the above-described preferred proportions (by mass) is also a preferred embodiment of the copolymer of the present invention. The total of the proportions of the combination is 100% by mass.

Sulfonate Group-Containing Copolymer

The sulfonate group-containing copolymer according to the first aspect of the present invention is characterized by a specific ratio by mass P of the structural unit (b) to the structural unit (a), a specific weight average molecular weight Mw, and a specific number n of alkylene oxide-derived structural repeating units, so that the product of P×Mw×n ranges from about 950,000 to about 800,000,000. The product of P×Mw×n is preferably not less than about 1,000,000, and more preferably it ranges from 1,000,000 to 50,000,000. The sulfonate group-containing copolymer of the present invention having such a parameter of P×Mw×n is characterized by further improved adsorption for hydrophilic soil, which in turn leads to improved anti-redeposition properties against hydrophilic soil under higher water hardness condition. The product of P×Mw×n is more preferably not less than about 1,500,000, and still more preferably not less than about 2,000,000. The product of P×Mw×n is preferably not more than about 500,000,000 and more preferably not more than about 100,000,000.

The sulfonate group-containing copolymer according to the second aspect of the present invention is characterized by a specific ratio by mass P of the structural unit (b) to the structural unit (a) that ranges from about 1.2 to about 20 and a specific weight average molecular weight Mw of the copolymer that ranges from about 20,000 to about 200,000, while the product of P×Mw is from about 25,000 to about 2,000,000.

In the first aspect of the present invention, it is also preferred that the ratio by mass P of the structural unit (b) to the structural unit (a) ranges from about 1.2 to about 20. In both the first and second aspects of the present invention, it is preferred that the ratio by mass P ranges from about 1.3 to about 20, more preferably from about 1.5 to about 15, still more preferably from about 2 to about 10, and most preferably from about 2.5 to about 5. When the ratio by mass P is calculated, the masses of the structural unit (a) and the structural unit (b) are calculated as the masses of the acid form equivalents of them, i.e., P is determined as a mass ratio of the acid form equivalent of the structural unit (b) to the acid form equivalent of the structural unit (a).

Without being bound by any theory, it is believed that the specific ratio by mass P of the structural unit (b) to the structural unit (a), i.e., from about 1.2 to about 20, contributes to the improved anti-soil redeposition properties of the copolymer of the present invention, particularly its improved anti-redeposition properties against hydrophilic soil under high water hardness conditions. Further, when the ratio by mass P is from about 3 to about 10, it is believed to improve the compatibility of the copolymer with liquid detergents as well as its anti-redeposition properties.

In the first aspect of the present invention, it is also preferred that the weight average molecular weight Mw of the sulfonate group-containing copolymer ranges from about 20,000 to about 200,000. In both the first and second aspects of the present invention, it is preferred that Mw ranges from about 22,000 to about 150,000, more preferably from about 25,000 to about 100,000, still more preferably from about 30,000 to about 80,000, and most preferably from about 30,000 to about 75,000.

Without being bound by any theory, it is believed that the sulfonate group-containing polymer of the present invention with the specified weight average molecular weight Mw, i.e., from about 20,000 to about 200,000 has improved anti-redeposition properties, particularly anti-redeposition properties against hydrophilic soil under high water hardness conditions. Further, in order to improve compatibility with liquid detergents as well as further improving the anti-redeposition properties, the weight average molecular weight Mw of the copolymer is particularly preferred to range from about 20,000 to about 80,000, and more preferably from about 30,000 to about 75,000. On one hand, if the weight average molecular weight Mw of the copolymer is larger than about 200,000, the copolymer may become highly viscous and difficult to handle. On the other hand, if Mw is smaller than about 20,000, the anti-redeposition properties of the copolymer significantly deteriorate, resulting in poorer performance as a detergent builder. The weight average molecular weight Mw of the sulfonate group-containing copolymer of the present invention is determined by the specific method used in the examples as described hereinafter.

Further, a synergistic effect is observed between the ratio by mass P of the structural unit (b) to the structural unit (a) and the weight average molecular weight Mw of the copolymer. Specifically, when the product of the ratio by mass P multiplied by the weight average molecular weight Mw is in a specific range of from about 25,000 to about 2,000,000, the resulting sulfonate group-containing copolymer exhibits significantly improved anti-soil redeposition properties, particularly anti-redeposition properties against hydrophilic soil under high water hardness conditions. Further, such product of the ratio by mass P multiplied by the weight average molecular weight Mw may lead to synergistic improvement in the copolymer's compatibility with liquid detergents as well as the anti-redeposition properties. Preferably, the product of the the ratio by mass P multiplied by the weight average molecular weight Mw ranges from about 50,000 to about 1,500,000, more preferably from about 70,000 to about 1,200,000, still more preferably from about 100,000 to about 1,000,000, yet still more preferably from about 120,000 to about 1,000,000, and most preferably from about 130,000 to about 1,200,000.

Further, the number n of alkylene oxide-derived structural repeating units in the formula (2) of the structural unit (b) in the sulfonate group-containing copolymer also contributes to improvement of the anti-redeposition properties and liquid detergent compatibility of the copolymer, especially when it is provided within a specific range in combination with a specific proportion of the structural unit (c), a specific ratio by mass P of the structural unit (b) to the structural unit (a), and a specific weight average molecular weight Mw of the copolymer. Specifically, when the product of the ratio by mass P multiplied by the weight average molecular weight Mw and further multiplied by the number n of the alkylene oxide-derived structure repeating units in the formula (2) for the structural unit (b), i.e., P×Mw×n, is ranged from about 950,000 to 800,000,000, and more preferably from 1,000,000 to 50,000,000 and when the proportion of the structural unit (c) is ranged from about 20% to 90% by mass in acid form equivalent of the structural unit (c) in 100% by mass of all monomer structural units constituting the sulfonate group-containing copolymer, the resulting copolymer exhibits significant improvement in its anti-soil redeposition properties and liquid detergent compatibility in comparison with polymers that do not have such specified parameters.

In the sulfonate group-containing copolymer of the present invention, the ratio by mass of the structural unit (a) to the structural unit (b) to the structural unit (c) is preferably (2 to 38)/(9 to 76)/(20 to 90), more preferably (2 to 30)/(10 to 70)/(25 to 85), still more preferably (3 to 25)/(12 to 65)/(30 to 80), further more preferably (4 to 20)/(15 to 60)/(35 to 75), particularly preferably (5 to 18)/(18 to 50)/(40 to 73), still more preferably (5 to 16)/(20 to 49)/(43 to 70), and most preferably (5 to 16)/(30-45)/(40-55). The total of the proportions of the structural units (a), (b), and (c) is 100% by mass.

The sulfonate group-containing copolymers of the present invention have improved anti-soil redeposition ability. Preferably, such copolymers have an Anti-Redeposition Performance of at least about 64%, preferably from about 64.8% to about 68.1%. The Anti-Redeposition Performance of the copolymers can be measured by the procedure described hereinafter in the Sections entitled "Evaluation of Anti-Redeposition Properties." Given their enhanced anti-soil redeposition properties, the sulfonate group-containing copolymers of the present invention are particularly useful for formulating laundry detergent compositions with improved whiteness maintenance performance and cleaning performance. Further, the sulfonate group-containing copolymers of the present invention exhibit satisfactory liquid detergent compatibility, which renders them useful for formulating liquid laundry detergent products with improved phase stability.

Method of Producing Sulfonate Group-Containing Copolymer

The method of producing the sulfonate group-containing copolymer of the present invention is not particularly limited, and a known polymerization method or a modified method based thereon can be readily used.

The production method preferably involves copolymerizing monomer components including a sulfonate group-containing monomer (A), a polyoxyalkylene monomer (B), a carboxyl group-containing monomer (C), and optionally a monomer (E), which are the same as those described hereinabove.

In order to sufficiently exert the effects of the present invention, the proportion of the sulfonate group-containing monomer (A) is, but not particularly limited to, preferably from about 2% to about 38% by mass, more preferably from about 2% to about 30% by mass, still more preferably from about 3% to about 25% by mass, further more preferably from about 4% to about 20% by mass, particularly preferably from about 5% to about 18% by mass, and most preferably from about 5% to about 16% by mass in acid form equivalent in 100% by mass of all the monomers.

In order to sufficiently exert the effects of the present invention, the proportion of the polyoxyalkylene monomer (B) is, but not particularly limited to, preferably from about 9% to about 76% by mass, more preferably about 10% to about 70% by mass, still more preferably from about 12% to about 65% by mass, further preferably from about 15% to about 60% by mass, particularly preferably from about 18% to about 50% by mass, yet more preferably from about 20% to about 49%, and most preferably from about 30% to about 45% by mass in acid form equivalent in 100% by mass of all the monomers.

In order to sufficiently exert the effects of the present invention, the proportion of the carboxyl group-containing monomer (C) is preferably from about 20% to about 90% by mass, more preferably from about 25% to about 85% by mass, still more preferably from about 30% to about 80% by mass, further more preferably from about 35% to about 75% by mass, particularly preferably from 40% to 73% by mass, yet more preferably from about 43% to about 70%, and most preferably from about 40% to about 55% by mass in acid form equivalent in 100% by mass of all the monomers.

The proportion of the monomer (E) is preferably from 0% to about 30% by mass, more preferably from 0% to about 20% by mass, still more preferably from 0% to about 10% by mass, and most preferably 0% by mass in 100% by mass of all the monomers.

The monomer components preferably contain two or more of the sulfonate group-containing monomer (A), the polyoxyalkylene monomer (B), the carboxyl group-containing monomer (C), and optionally the monomer (E) in the above preferred proportions. That is, combination of the sulfonate group-containing monomer (A), the polyoxyalkylene monomer (B), the carboxyl group-containing monomer (C), and optionally the monomer (E) in the above preferred proportions in all the monomers is also a preferred embodiment of the method of producing the sulfonate group-containing copolymer of the present invention.

During copolymerization of the monomer components, the monomer components are preferably copolymerized using a polymerization initiator. Polymerization initiators known in the art may be used. Specifically, preferred examples thereof include hydrogen peroxide; persulfates such as sodium persulfate, potassium persulfate, and ammonium persulfate; azo compounds such as dimethyl-2,2'-azobis(2-methylpropionate), 2,2'-azobis(2-amidinopropane) hydrochloride, 4,4'-azobis-4-cyanovaleric acid, azobisisobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Among these polymerization initiators, hydrogen peroxide and persulfates are preferred, and persulfates are most preferred. Any of these polymerization initiators may be used alone, or a mixture of two or more of these may be used.

The amount of the polymerization initiator to be used in the polymerization reaction may be appropriately controlled depending on the amount of the monomer components to be used, and is not particularly limited. For example, the amount of the polymerization initiator is preferably not less than about 0.001 parts by mass and not more than about 20 parts by mass, more preferably not less than about 0.005 parts by mass and not more than about 15 parts by mass, and still more preferably not less than about 0.01 parts by mass and not more than about 10 parts by mass for 100 parts by mass of the monomers.

Further, a chain transfer agent can be preferably used in addition to the polymerization initiator. The chain transfer agent to be used is not particularly limited as long as it is a compound that allows for control of the molecular weight. Known chain transfer agents in the art may be used. Specific examples of the chain transfer agent thiol chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octyl mercaptan, and butyl thioglycolate; halides such as carbon tetrachloride, methylene chloride, bromoform, and bromotrichloroethane; secondary alcohols such as isopropanol and glycerin; and lower oxides and their salts such as phosphorous acid, hypophosphorous acid, and their salts (sodium hypophosphate, potassium hypophosphate, etc.), sulfurous acid, hydrogen sulfurous acid, dithionous acid, metabisulfurous acid, and their salts (sodium hydrogen sulfite, potassium hydrogen sulfite, sodium dithionite, potassium dithionite, sodium metabisulfite, potassium metabisulfite, etc.). Any of these chain transfer agents may be used alone, or a mixture of two or more of these may be used.

The amount of the chain transfer agent used in the method of producing the sulfonate group-containing copolymer of the present invention is from about 0.5 g to about 10 g per mol of all the monomers. The chain transfer agent in such a proportion allows easy production of the sulfonate group-containing copolymer with a preferred molecular weight. The amount of the chain transfer agent used is preferably from about 1.0 g to about 7.0 g per mol of all the monomers and more preferably from about 2.0 g to about 5.0 g per mol of all the monomers.

During production of the sulfonate group-containing copolymer of the present invention, a reaction accelerator may be added for the purpose of reducing the amount of the initiator or the like to be used. Examples of the reaction accelerator include heavy metal ions. The term "heavy metal ions" herein is intended to include metals having a specific gravity of not less than about 4 $g/cm^3$. Preferred examples of the heavy metal ions include ions of iron, cobalt, manganese, chromium, molybdenum, tungsten, copper, silver, gold, lead, platinum, iridium, osmium, palladium, rhodium, and ruthenium. Any of these heavy metal ions may be used alone, or two or more of these may be used in combination. Among these, iron is more preferred. The ionic valency of the heavy metal ion is not particularly limited. For example, when iron is used as a heavy metal, the initiator may include iron ion in the $Fe^{2+}$ form or $Fe^{3+}$ form, or may contain iron in both forms.

The state of the above heavy metal ion is not particularly limited as long as it is present in an ionic form. It is preferable to use a solution prepared by dissolving a heavy metal compound because of the easy handling. The heavy metal compound used in this case may be any compound containing a heavy metal ion desired to be contained in the initiator, and it may be determined depending on the initiator to be used. In cases where the heavy metal ion used is iron, preferred examples of the heavy metal compound to be used include Mohr's salt $(Fe(NH_4)_2(SO_4)_2.6H_2O)$, ferric sulfate heptahydrate, ferrous chloride, and ferric chloride. Furthermore, in cases where the heavy metal ion used is manganese, preferred examples of the heavy metal compound include manganese chloride. These heavy metal compounds are all water-soluble compounds. Therefore, it is possible to use them in the form of aqueous solutions, and consequently, the handleability is excellent. The solvents of the solutions of the heavy metal compounds dissolved thereto are not limited to water, and any solvent may be used as long as it does not interfere with the polymerization reaction and can dissolve the heavy metal compound in the production of hydrophobic group-containing copolymer of the present invention.

Furthermore, the heavy metal ion content is preferably from about 0.1 to about 10 ppm in the total mass of the polymerization reaction liquid at the time of the completion of the polymerization reaction. When the heavy metal ion content is present at no less than about 0.1 ppm, the effect of the heavy metal ion is sufficiently exhibited. When the heavy metal ion content is present at no more than about 10 ppm, the color of the polymer to be prepared can be further improved. However, when the heavy metal ion content in the polymerization reaction liquid is too high, it may lead to discoloration in the resulting polymer, rendering such polymer unsuitable to be used as a detergent builder. Therefore, by controlling the heavy metal ion content within the above-described range, such problems can be effectively avoided.

The phrase "at the time of the completion of the polymerization reaction" means the time point when the polymerization reaction has been practically completed in the polymerization reaction solution, and the desired polymer has been prepared. For example, in cases where the polymer formed as a result of polymerization in the polymerization reaction solution is to be neutralized with an alkaline component, the amount of the heavy metal ion is calculated based on the total mass of the polymerization reaction solution after neutralization. When it contains two or more kinds of heavy metal ions, the total amount of the heavy metal ions may be control to fall within the above-specified range.

A most preferred combination of the initiator and the chain transfer agent is the combination of one or more of persulfates and one or more of sulfites. In this case, the persulfate and the sulfite may be mixed in any ratio. Specifically, from about 0.3 to about 8 parts by mass of the sulfite is preferably used per 1 part by mass of the persulfate. The lower limit of the amount of the sulfite is more preferably about 0.5 parts by mass and most preferably about 0.7 parts by mass per 1 part by mass of the persulfate. The upper limit of the amount of the sulfite is more preferably about 7 parts by mass and most preferably about 6 parts by mass per 1 part by mass of the persulfate. Not less than about 0.3 parts by mass of the sulfite enables to reduce the total amount of the initiator used for reducing the molecular weight. Further, not more than about 8 parts by mass of the sulfite enables sufficient suppression of side reactions and sufficient reduction of impurities formed by such side reactions.

The combination of chain-transfer agent, polymerization initiator and reaction accelerator is not particularly limited, and these may be selected from any of those described hereinabove. Examples of the combinations of chain-transfer agent, polymerization initiator and reaction accelerator include, but are not limited to: sodium hydrogen sulfite (SBS)/hydrogen peroxide $(H_2O_2)$, sodium hydrogen sulfite (SBS)/sodium persulfate (NaPS), sodium hydrogen sulfite (SBS)/Fe, sodium hydrogen sulfite (SBS)/hydrogen peroxide $(H_2O_2)$/Fe, sodium hydrogen sulfite (SBS)/sodium persulfate (NaPS)/Fe, sodium hydrogen sulfite (SBS)/sodium persulfate (NaPS)/hydrogen peroxide $(H_2O_2)$, and sodium hydrogen sulfite (SBS)/oxygen/Fe. More preferred are sodium hydrogen sulfite (SBS)/sodium persulfate (NaPS) and sodium hydrogen sulfite (SBS)/sodium persulfate (NaPS)/Fe. Most preferred is sodium hydrogen sulfite (SBS)/sodium persulfate (NaPS)/Fe.

Further during the production of the sulfonate group-containing copolymer of the present invention, a catalyst for decomposing a polymerization initiator may be added to the polymerization reaction system. Examples of the catalyst for decomposing the polymerization initiator include: halogenated metals such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, benzoic acid, and their esters and metal salts; and heterocyclic amines and their derivatives such as pyridine, indole, imidazole, and carbazole. Any of these decomposition catalysts may be used alone, or two or more of these may be used in combination.

A reducing compound can also be added to the polymerization reaction system. Examples of the reducing compound include organic metal compounds such as ferrocene; metal naphthenates such as iron naphthenate, copper naphthenate, nickel naphthenate, cobalt naphthenate, and manganese naphthenate; inorganic compounds capable of generating metal ions such as iron, copper, nickel, cobalt, and manganese; inorganic compounds such as boron trifluoride ether adducts, potassium permanganate, and perchloric acid; sulfur-containing compounds such as sulfur dioxide, sulfites, sulfates, bisulfites, thiosulfates, sulfoxylates, benzene sulfinic acid and their substituted compounds, and homologues of cyclic sulfinic acid such as p-toluene sulfinic acid; mercapto compounds such as octyl mercaptan, dodecyl mercaptan, mercapto ethanol, α-mercaptopropionic acid, thioglycolic acid, thiopropionic acid, sodium α-thiopropionate sulfopropylester, and sodium α-thiopropionate sulfoethylester; nitrogen-containing compounds such as hydrazine, β-hydroxyethylhydrazine, and hydroxylamine; aldehydes such as formaldehyde, acetaldehyde, propionaldehyde, n-butylaldehyde, isobutylaldehyde, and isovalerianaldehyde; and ascorbic acid. Any of these reducing compounds may also be used alone, or two or more of these may be used in combination. The reducing compound such as mercapto compounds may be added as a chain transfer agent.

The total amount of chain transfer agent, initiator, and reaction accelerator to be used is preferably ranging from about 2 g to about 20 g per mol of all monomer components. The total amount is more preferably from about 2 g to about 15 g and still more preferably from about 3 g to about 10 g. When the total amount is in the above-described range, the sulfonate group-containing copolymer of the present invention can be efficiently produced. Further, a desired molecular weight distribution of the sulfonate group-containing copolymer can be obtained.

The polymerization initiator and the chain transfer agent are delivered into a reactor by, for example, adding in a drop-wise manner or adding in batches/portions. Furthermore, the chain-transfer agent may be delivered into a reactor alone, or it may be mixed in advance with the monomers, solvents, or the like.

Examples of the method of delivering the monomer components, the polymerization initiator, and the like into a reactor in the copolymerization method include: a method in which all monomer components are delivered into a reactor, and a polymerization initiator is subsequently delivered into the reactor to carry out copolymerization; a method in which a portion of the monomer components is delivered into a reactor, and the remaining portion of the monomer components and a polymerization initiator are subsequently delivered into the reactor continuously or in steps (preferably continuously) to carry out copolymerization; a method in which a polymerization solvent is delivered into a reactor, and the monomer components and a polymerization initiator are all subsequently delivered into the reactor; and a method in which a portion of one of the monomers (for example, polyoxyalkylene monomer) is delivered into a reactor, and a polymerization initiator and the remaining monomers are (preferably continuously) added to the reactor to carry out copolymerization. In particular, copolymerization is preferably carried out by sequential drop-wise addition of a polymerization initiator and monomer components to a reactor because it is possible to obtain a copolymer with a narrow (sharp) molecular weight distribution, and the dispersibility of the copolymer is improved when it is used as a detergent builder.

The copolymerization may be carried out by any method, such as the commonly used methods of solution polymerization, bulk polymerization, suspension polymerization, or emulsion polymerization. Solution polymerization is particularly preferred. The copolymerization may be carried out either continuously or in batches. Known solvents may be used in such copolymerization. Preferred examples of the solvents include water; alcohols such as methyl alcohol, ethyl alcohol, and isopropyl alcohol; glycerin; polyethylene glycol; aromatic or aliphatic hydrocarbons such as benzene, toluene, xylene, cyclohexane, and n-heptane; esters such as ethyl acetate; ketones such as acetone and methyl ethyl ketone; amides such as dimethylformamide; and ethers such as diethyl ether and dioxane. Any of these solvents may be used alone, or two or more of these may be used in combination. In particular, one or more solvents selected from the group consisting of water and $C_1$-$C_4$ lower alcohols are preferably used in view of the solubility of the monomer components and the resulting copolymer. More preferably, the solvent used in this case is water or a solvent mixture containing water in an amount of at least about 50% by mass of the total amount of the solvent. Use of only water as the solvent is particularly preferred, because the step of removing the solvent can then be eliminated.

In the method of producing the sulfonate group-containing copolymer of the present invention, a pH regulator or buffer may also be used if needed.

The temperature in the polymerization is preferably not less than about 70° C., more preferably from about 75° C. to about 110° C., and still more preferably from about 80° C. to about 100° C. At a temperature in the polymerization within the above range, the amount of the remaining monomer components tends to reduce, and the anti-redeposition properties of the resulting copolymer tend to improve. The temperature in the polymerization is not necessarily kept constant all the time while the polymerization reaction progresses. For example, the polymerization may be started from room temperature; the temperature may be raised to the setting temperature for a proper temperature rising time or at a proper temperature raising rate; and the setting temperature may be kept. Alternatively, the polymerization temperature may be changed (raised or reduced) according to the method of dropping the monomer components, the initiator, or the like with a lapse of time while the polymerization reaction progresses.

The polymerization time is not particularly limited, and preferably ranges from about 30 min to about 420 min, more preferably from about 45 min to about 390 min, still more preferably from about 60 min to about 360 min, and most preferably from about 90 min to about 240 min. The term "polymerization time" herein means the time required to add the monomer.

The pressure in the reaction system may be any of normal pressure (atmospheric pressure), reduced pressure, and increased pressure. From the viewpoint of the molecular weight of the polymer to be obtained, the polymerization is preferably performed under normal pressure, or the reaction system is sealed and the polymerization is performed under increased pressure. The polymerization is preferably performed under normal pressure (atmospheric pressure) from the viewpoint of equipment such as pressuring and depressurizing apparatuses, a pressure-resistant reaction container, and pipes. The reaction system may be under air atmosphere, and may preferably be under inert atmosphere. For example, the air in the system is preferably replaced with an inert gas such as nitrogen before the polymerization is started.

The solid content (that is, the amount or concentration of polymer solids made of the monomers) in an aqueous solution at the end of the polymerization reaction in the polymerization reaction system is preferably not less than about 35% by mass and more preferably from about 40% to about 70% by mass. Such a high solid content concentration of not less than about 35% by mass at the end of the polymerization reaction enables one-step polymerization at high concentration. In this case, for example, a condensation step which may be required in a conventional production method can be eliminated, so that the sulfonate group-containing copolymer composition can be efficiently obtained. Accordingly, as a result of significant improvement in production efficiency, the productivity of the sulfonate group-containing copolymer composition can be significantly improved and the production cost can be reduced.

After completion of the polymerization reaction, a suitable alkali component may be appropriately added for post treatment, if needed, and the degree of neutralization (final degree of neutralization) of the resulting sulfonate group-containing copolymer may be set within a predetermined range. The final degree of neutralization is not particularly limited. This is because the final degree of neutralization of the copolymer varies depending on intended use. Specifically, the copolymer does not need to be neutralized and may be in an acidic form when used as a detergent builder for weak acidic detergents, which are considered to be gentle to the skin, or the copolymer may be neutralized with an alkali component to a degree of neutralization of about 90 mol % or higher in post treatment when used for neutral detergents or alkali detergents. Accordingly, the final degree of neutralization may be set to an extremely wide range of from about 1 to about 100 mol %. In particular, the final degree of neutralization of the copolymer to be used as an acidic polymer composition is preferably from about 1 to about 75 mol % and more preferably from about 5 to about 70 mol %. The final degree of neutralization of the copolymer to be used as a neutral or alkaline polymer composition is preferably from about 70 to about 99 mol % and more preferably from about 80 to about 97 mol %. When the final degree of neutralization of the copolymer to be used as a neutral or alkaline polymer composition is about 99 mol % or lower, discoloration of the aqueous polymer solution can be suppressed.

Suitable examples of the alkali component use for neutralization include: alkali metal hydroxides such as sodium hydroxide and potassium hydroxide, alkaline earth metal hydroxides such as calcium hydroxide and magnesium hydroxide, and organic amines such as ammonium, monoethanolamine, diethanolamine, and triethanolamine. The alkali components may be used alone, or a mixture of two or more of these may be used.

A copolymer composition formed by the copolymerization process described hereinabove essentially contains the sulfonate group-containing copolymer of the present invention. In addition, the copolymer composition may contain an unreacted sulfonate group-containing monomer, an unreacted polyoxyalkylene monomer, an unreacted carboxyl group-containing monomer, an unreacted polymerization initiator, a decomposed polymerization initiator, a binary copolymer of a sulfonate group-containing monomer and a carboxyl group-containing monomer, a hydrogen sulfite adduct (which is an impurity derived from the carboxyl group-containing monomer which remains unpolymerized although the above hydrogen sulfite and/or the compound capable of producing a hydrogen sulfite as a chain transfer agent is added thereto), and the like. Specific examples of the hydrogen sulfite adduct include 3-sulfopropionic acid (salts) and the like. It is preferred that the presence of homopolymer of the carboxyl group-containing monomer, which is formed as a side product of the copolymerization process, in the copolymer composition is reduced or minimized. Therefore, when the copolymer is used for formulating a laundry detergent composition, formation of precipitates from such laundry detergent composition can be effectively suppressed during washing under high water hardness conditions. Further, when the copolymer composition has a reduced or minimized amount of homopolymer of the carboxyl group-containing monomer therein, a liquid detergent containing such a copolymer composition exhibits improved temporal stability (i.e., reduced or minimized phase separation) as an additional advantageous effect.

It is preferred that the copolymer composition contains: (i) less than about 5% and more preferably less than about 3% or 2% by mass of the unreacted polyoxyalkylene monomer, (ii) less than about 5% and more preferably less than about 3% or 2% by mass of the unreacted sulfonate group-containing unsaturated monomer, and (iii) less than about 5% and more preferably less than about 3% or 2% by mass of the 3-sulfopropionic acid (salts), based on 100% by mass of the solid content of the copolymer composition. For the unreacted acid group-containing unsaturated monomer, the copolymer composition preferably contains such monomer in an amount of less than about 1% by mass and more preferably less than about 0.5% by mass based on 100% by mass of the solid content of the copolymer composition. For the unreacted carboxyl group-containing monomer, the copolymer composition preferably contains such monomer in an amount of not more than about 5000 mass ppm, more preferably not more than about 1000 mass ppm, and most preferably not more than about 100 mass ppm based on 100% by mass of the solid content of the polymer composition.

The amounts of unreacted polyoxyalkylene monomer, unreacted sulfonate group-containing unsaturated monomer, unreacted carboxyl group-containing monomer and 3-sulfopropionic acid (salts) in the copolymer composition of the present invention can be quantified by liquid chromatography under the following conditions.

Measuring device: L-7000 series (product of Hitachi Ltd.)
Detector: UV detector, L-7400 (product of Hitachi Ltd.)
Column: SHODEX RSpak DE-413 (product of Showa Denko K. K.)
Temperature: 40.0° C.
Eluent: 0.1% phosphoric acid aqueous solution
Flow velocity: 1.0 ml/min The copolymer composition herein is not particularly limited, and is preferably prepared without any purification step for eliminating impurities in view of the production efficiency. Further, the copolymer composition herein includes those obtained by diluting the resulting copolymer composition with a small amount of water (adding approximately from about 1% to about 400% by mass of water based on the amount of the mixture obtained) after the polymerization step for easy handling.

Uses of Sulfonate Group-Containing Copolymer

The sulfonate group-containing copolymer and the composition containing such a copolymer can be used as a coagulant, printing ink, adhesive, soil control (i.e., modification) agent, fire retardant, skin care agent, hair care agent, additive for shampoos, hair sprays, soaps, and cosmetics, anion exchange resin, dye mordant and auxiliary agent for fibers and photographic films, pigment dispersant for paper making, paper reinforcing agent, emulsifier, preservative, softening agent for textiles and paper, additive for lubricants, water treatment agent, fiber treating agent, dispersant, scale control agent (i.e., scale depressant), metal ion binding agent, viscosity improver, binder of any type, emulsifier, and the like. More specifically, the sulfonate group-containing polymer and the composition containing the same can be used in water treatment agents, fiber treating agents, inorganic pigment dispersants, detergent or cleaning compositions, and the like.

Detergents or Cleaning Compositions Containing the Sulfonate Group-Containing Copolymer The present invention provides a detergent or cleaning composition, preferably a laundry detergent composition and more preferably a liquid laundry detergent composition, that contains the sulfonate group-containing copolymer as described hereinabove and optionally other adjunct ingredients.

The phrases "detergent composition," "cleaning composition" and "detergent or cleaning composition" have been defined broadly hereinabove and are used interchangeably hereinafter. Specifically, the detergent or cleaning composition can be in any solid or liquid product form, and it can be a laundry detergent composition, a hard surface cleaning composition, a hand dishwashing composition, and an automatic dishwashing composition. The detergent or cleaning composition is preferably a liquid, and even more preferably it is in a single phase or multiphase unit dose form, i.e., the liquid detergent or cleaning composition is contained in a single compartment or multi-compartment water-soluble pouch. In a specific embodiment, the detergent or cleaning composition is in a single phase or multiphase unit dose form containing either a liquid automatic dishwashing composition or a liquid laundry detergent composition encapsulated in a single compartment or multi-compartment water-soluble pouch, which is formed, for example, by a water-soluble polymer such as polyvinyl alcohol (PVA) and/or polyvinylpyrrolidone (PVP).

The amount of the sulfonate group-containing copolymer contained in the detergent r cleaning composition is not particularly limited. To achieve high builder performance, the sulfonate group-containing copolymer is contained provided in an amount ranging from about 0.1% to about 15% by mass, more preferably from about 0.3% to about 10% by mass, and still more preferably from about 0.5% to about 5% by mass based on the total amount of the detergent or cleaning composition.

When the detergent or cleaning composition is in the form of a liquid laundry detergent composition, it may further comprise one or more organic solvents, which can be present in an amount ranging from about 1 wt % to about 80 wt %, preferably from about 10 wt % to about 60 wt %, more preferably from about 15 wt % to about 50 wt %, and most preferably from about 20 wt % to about 45 wt %, by total weight of the compositions.

Because phase separation is a constant challenge for liquid laundry detergent compositions, especially when the salt content in such compositions is high, the solvent system of the present invention is particularly designed to stabilize the sulfonate group-containing copolymer of the present invention and minimize the risk of phase separation. Specifically, the solvent system of the present invention is composed mostly of diols, such as ethylene glycol, diethylene glycol, propylene glycol, dipropylene glycol, butylene glycol, pentanediols, and combinations thereof. The diols are present in the liquid laundry detergent composition of the present invention in a total amount ranging from about 2 wt % to about 50 wt %. Preferably, the composition contains ethylene, diethylene glycoy, and/or propylene glycol in a total amount ranging from about 5 wt % to about 40 wt %. More preferably, the composition contains propylene glycol in the amount ranging from about 15 wt % to about 35 wt %. Other organic solvents may also be present, which include, but are not limited to: methanol, ethanol, glycerin, sodium cumene sulfonate, potassium cumene sulfonate, ammonium cumene sulfonate, sodium toluene sulfonate, potassium toluene sulfonate, sodium xylene sulfonate, potassium xylene sulfonate, ammonium xylene sulfonate, or mixtures thereof. Other lower alcohols, such $C_1$-$C_4$ alkanolamines, e.g., monoethanolamine and/or triethanolamine, may also be used. In a particularly preferred embodiment of the present invention, the liquid laundry detergent compositions of the present invention also contain from about 5 wt % to about 20 wt %, preferably from 6 wt % to 18 wt %, more preferably from 8 wt % to 16 wt % of glycerin in addition to the diol(s).

The liquid laundry detergent composition of the present invention preferably contains water in combination with the above-mentioned organic solvent(s) as carrier(s). In some embodiments, water is present in the liquid laundry detergent compositions of the present invention in the amount ranging from about 20 wt % to about 70 wt %, preferably from about 25 wt % to 60 wt %, and more preferably from about 30 wt % to about 50 wt %. In other embodiments, water is absent and the composition is anhydrous. Highly preferred compositions afforded by the present invention are clear, isotropic liquids.

The detergent or cleaning composition of the present invention contains one or more surfactants and one or more adjunct cleaning additives. The specific forms of the surfactants and the adjunct cleaning additives are not particularly limited, and are appropriately selected based on common knowledge in the field of detergents.

Anionic Surfactants

In some embodiments, the detergent or cleaning composition of the present invention comprises one or more anionic surfactants. In some embodiments, detergent or cleaning composition of the present invention may comprise a surfactant system consisting essentially of, or even consist of one or more anionic surfactants.

Specific and yet non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Alkoxylated alkyl sulfate materials comprise ethoxylated alkyl sulfate surfactants, also known as alkyl ether sulfates or alkyl polyethoxylate sulfates. Examples of ethoxylated alkyl sulfates include water-soluble salts, particularly the alkali metal, ammonium and alkylolammonium salts, of organic sulfuric reaction products having in their molecular structure an alkyl group containing from about 8 to about 30 carbon atoms and a sulfonic acid and its salts. (Included in the term "alkyl" is the alkyl portion of acyl groups. In some examples, the alkyl group contains from about 15 carbon atoms to about 30 carbon atoms. In other examples, the alkyl ether sulfate surfactant may be a mixture of alkyl ether sulfates, said mixture having an average (arithmetic mean) carbon chain length within the range of about 12 to 30 carbon atoms, and in some examples an average carbon chain length of about 25 carbon atoms, and an average (arithmetic mean) degree of ethoxylation of from about 1 mol to 4 mols of ethylene oxide, and in some examples an average (arithmetic mean) degree of ethoxylation of 1.8 mols of ethylene oxide. In further examples, the alkyl ether sulfate surfactant may have a carbon chain length between about 10 carbon atoms to about 18 carbon atoms, and a degree of ethoxylation of from about 1 to about 6 mols of ethylene oxide. In yet further examples, the alkyl ether sulfate surfactant may contain a peaked ethoxylate distribution, as described in WO1995011212A1, U.S. Pat. No. 5,120,697, U.S. Pat. No. 5,210,325, U.S. Pat. No. 4,946,984, U.S. Pat. No. 4,902,658, WO2010099303A1.

Non-ethoxylated alkyl sulfates may also be added to the disclosed cleaning compositions and used as an anionic surfactant component. Examples of non-alkoxylated, e.g., non-ethoxylated, alkyl sulfate surfactants include those produced by the sulfation of higher $C_8$-$C_{20}$ fatty alcohols. In some examples, primary alkyl sulfate surfactants have the general formula: $ROSO_3^-M^+$, wherein R is typically a linear $C_8$-$C_{20}$ hydrocarbyl group, which may be straight chain or branched chain, and M is a water-solubilizing cation. In some examples, R is a $C_{10}$-$C_{15}$ alkyl, and M is an alkali metal. In other examples, R is a $C_{12}$-$C_{14}$ alkyl and M is sodium.

Other useful anionic surfactants can include the alkali metal salts of alkyl benzene sulfonates, in which the alkyl group contains from about 9 to about 15 carbon atoms, in straight chain (linear) or branched chain configuration, e.g. those of the type described in U.S. Pat. Nos. 2,220,099 and 2,477,383. In some examples, the alkyl group is linear. Such linear alkylbenzene sulfonates are known as "LAS." In other examples, the linear alkylbenzene sulfonate may have an average number of carbon atoms in the alkyl group of from about 11 to 14. In a specific example, the linear straight chain alkyl benzene sulfonates may have an average number of carbon atoms in the alkyl group of about 11.8 carbon atoms, which may be abbreviated as C11.8 LAS. Such surfactants and their preparation are described for example in U.S. Pat. Nos. 2,220,099 and 2,477,383.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates. Further suitable anionic surfactants useful herein may be found in U.S. Pat. No. 4,285,841, Barrat et al., issued Aug. 25, 1981, and in U.S. Pat. No. 3,919,678, Laughlin, et al., issued Dec. 30, 1975, both of which are herein incorporated by reference.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic Surfactants

In some embodiments, the detergent or cleaning composition of the present invention comprises one or more nonionic surfactants. In certain specific embodiments, the detergent or cleaning composition comprises from about 0.1 wt % to about 40 wt %, preferably from about 0.2 wt % to about 15 wt %, more preferably from about 0.3 wt % to about 10 wt %, of one or more nonionic surfactants.

The nonionic surfactants useful herein can comprise any conventional nonionic surfactant. These can include, for e.g., alkoxylated fatty alcohols and amine oxide surfactants. In some examples, the cleaning compositions may contain an ethoxylated nonionic surfactant. These materials are described in U.S. Pat. No. 4,285,841, Barrat et al, issued Aug. 25, 1981. The nonionic surfactant may be selected from the ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. These surfactants are more fully described in U.S. Pat. No. 4,284,532, Leikhim et al, issued Aug. 18, 1981. In one example, the nonionic surfactant is selected from ethoxylated alcohols having an average of about 24 carbon atoms in the alcohol and an average degree of ethoxylation of about 9 moles of ethylene oxide per mole of alcohol.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be f ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1 to 30, as discussed in U.S. Pat. No. 6,153,577, U.S. Pat. No. 6,020,303 and U.S. Pat. No. 6,093,856; alkylpolysaccharides as discussed in U.S. Pat. No. 4,565,647 to Llenado, issued Jan. 26, 1986; specifically alkylpolyglycosides as discussed in U.S. Pat. No. 4,483,780 and U.S. Pat. No. 4,483,779; Polyhydroxy fatty acid amides as discussed in U.S. Pat. No. 5,332,528, WO 92/06162, WO 93/19146, WO 93/19038, and WO 94/09099; and ether capped poly (oxyalkylated) alcohol surfactants as discussed in U.S. Pat. No. 6,482,994 and WO 01/42408.

Suitable nonionic detersive surfactants also include alkyl polyglucoside and alkyl alkoxylated alcohol. Suitable nonionic surfactants also include those sold under the tradename Lutensol® from BASF.

In some aspects, the nonionic surfactant is selected from alkyl alkoxylated alcohols, such as a $C_{8-18}$ alkyl alkoxylated alcohol, for example, a $C_{8-18}$ alkyl ethoxylated alcohol. The alkyl alkoxylated alcohol may have an average degree of alkoxylation of from about 1 to about 50, or from about 1 to about 30, or from about 1 to about 20, or from about 1 to about 10. In certain aspects, the alkyl alkoxylated alcohol is a $C_{8-18}$ alkyl ethoxylated alcohol having an average degree of ethoxylation of from about 1 to about 10, or from about 1 to about 7, or from about 1 to about 5, or from about 3 to about 7. The alkyl alkoxylated alcohol can be linear or branched, substituted or unsubstituted.

Cationic Surfactants

In some embodiments, the detergent or cleaning composition of the present invention comprises one or more cationic surfactants.

In certain aspects, the detergent or cleaning compositions of the present invention comprise from about 0.1 wt % to about 10 wt %, preferably from about 0.2 wt % to about 7 wt %, and more preferably from about 0.3 wt % to about 5 wt %, of one or more cationic surfactants. In other aspects, the detergent or cleaning compositions of the invention are substantially free of cationic surfactants and surfactants that become cationic below a pH of 7 or below a pH of 6. Non-limiting examples of cationic surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

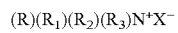

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Zwitterionic Surfactants

Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 at column 19, line 38 through column 22, line 48, for examples of zwitterionic surfactants; betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$.

Amphoteric Surfactants

Examples of amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis(2-hydroxyethyl)-2-sulfato-3-dodecoxypropylamine. See U.S. Pat. No. 3,929,678 to Laughlin et al., issued Dec. 30, 1975 at column 19, lines 18-35, for examples of amphoteric surfactants. Suitable amphoteric surfactants also include sarcosinates, glycinates, taurinates, and mixtures thereof.

Branched Surfactants

In some examples, the detergent or cleaning composition of the present invention comprises one or more branched surfactants. Suitable branched surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

In some aspects, the branched detersive surfactant is a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

In some aspects, the branched surfactant comprises a longer alkyl chain, mid-chain branched surfactant compound of the formula:

where:
(a) $A_b$ is a hydrophobic C9 to C22 (total carbons in the moiety), typically from about C12 to about C18, mid-chain branched alkyl moiety having: (1) a longest linear carbon chain attached to the —X—B moiety in the range of from 8 to 21 carbon atoms; (2) one or more C1-C3 alkyl moieties branching from this longest linear carbon chain; (3) at least one of the branching alkyl moieties is attached directly to a carbon of the longest linear carbon chain at a position within the range of position 2 carbon (counting from carbon #1 which is attached to the —X—B moiety) to position ω-2 carbon (the terminal carbon minus 2 carbons, i.e., the third carbon from the end of the longest linear carbon chain); and (4) the surfactant composition has an average total number of carbon atoms in the $A_b$-X moiety in the above formula within the range of greater than 14.5 to about 17.5 (typically from about 15 to about 17);
b) B is a hydrophilic moiety selected from sulfates, sulfonates, amine oxides, polyoxyalkylene (such as polyoxyethylene and polyoxypropylene), alkoxylated sulfates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonioalkanesulfonates, amidopropyl betaines, alkylated quats, alkylated/polyhydroxyalkylated quats, alkylated/polyhydroxylated oxypropyl quats, imidazolines, 2-yl-succinates, sulfonated alkyl esters, and sulfonated fatty acids (it is to be noted that more than one hydrophobic moiety may be attached to B, for example as in $(A_b\text{-X})_z$—B to give dimethyl quats); and
(c) X is selected from —CH2- and —C(O)—.

Generally, in the above formula the $A_b$ moiety does not have any quaternary substituted carbon atoms (i.e., 4 carbon atoms directly attached to one carbon atom). Depending on which hydrophilic moiety (B) is selected, the resultant surfactant may be anionic, nonionic, cationic, zwitterionic, amphoteric, or ampholytic. In some aspects, B is sulfate and the resultant surfactant is anionic.

In some aspects, the branched surfactant comprises a longer alkyl chain, mid-chain branched surfactant compound of the above formula wherein the $A_b$ moiety is a branched primary alkyl moiety having the formula:

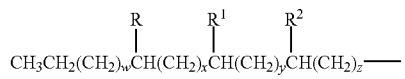

wherein the total number of carbon atoms in the branched primary alkyl moiety of this formula (including the R, $R^1$, and $R^2$ branching) is from 13 to 19; R, R1, and R2 are each independently selected from hydrogen and C1-C3 alkyl (typically methyl), provided R, R1, and R2 are not all hydrogen and, when z is 0, at least R or R1 is not hydrogen; w is an integer from 0 to 13; x is an integer from 0 to 13; y is an integer from 0 to 13; z is an integer from 0 to 13; and w+x+y+z is from 7 to 13.

In certain aspects, the branched surfactant comprises a longer alkyl chain, mid-chain branched surfactant compound of the above formula wherein the $A_b$ moiety is a branched primary alkyl moiety having the formula selected from:

or mixtures thereof; wherein a, b, d, and e are integers, a+b is from 10 to 16, d+e is from 8 to 14 and wherein further
when a+b=10, a is an integer from 2 to 9 and b is an integer from 1 to 8;
when a+b=11, a is an integer from 2 to 10 and b is an integer from 1 to 9;
when a+b=12, a is an integer from 2 to 11 and b is an integer from 1 to 10;
when a+b=13, a is an integer from 2 to 12 and b is an integer from 1 to 11;
when a+b=14, a is an integer from 2 to 13 and b is an integer from 1 to 12;
when a+b=15, a is an integer from 2 to 14 and b is an integer from 1 to 13;
when a+b=16, a is an integer from 2 to 15 and b is an integer from 1 to 14;
when d+e=8, d is an integer from 2 to 7 and e is an integer from 1 to 6;
when d+e=9, d is an integer from 2 to 8 and e is an integer from 1 to 7;
when d+e=10, d is an integer from 2 to 9 and e is an integer from 1 to 8;
when d+e=11, d is an integer from 2 to 10 and e is an integer from 1 to 9;
when d+e=12, d is an integer from 2 to 11 and e is an integer from 1 to 10;
when d+e=13, d is an integer from 2 to 12 and e is an integer from 1 to 11;
when d+e=14, d is an integer from 2 to 13 and e is an integer from 1 to 12.

In the mid-chain branched surfactant compounds described above, certain points of branching (e.g., the location along the chain of the R, $R^1$, and/or $R^2$ moieties in the above formula) are preferred over other points of branching along the backbone of the surfactant. The formula below illustrates the mid-chain branching range (i.e., where points of branching occur), preferred mid-chain branching range, and more preferred mid-chain branching range for monomethyl branched alkyl $A^b$ moieties.

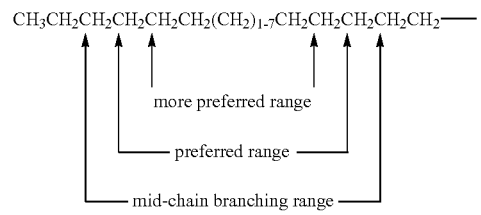

For mono-methyl substituted surfactants, these ranges exclude the two terminal carbon atoms of the chain and the carbon atom immediately adjacent to the —X—B group.

The formula below illustrates the mid-chain branching range, preferred mid-chain branching range, and more preferred mid-chain branching range for di-methyl substituted alkyl $A^b$ moieties.

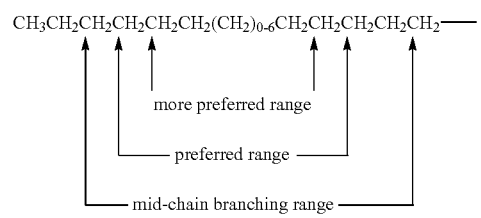

Additional suitable branched surfactants are disclosed in U.S. Pat. No. 6,008,181, U.S. Pat. No. 6,060,443, U.S. Pat. No. 6,020,303, U.S. Pat. No. 6,153,577, U.S. Pat. No. 6,093,856, U.S. Pat. No. 6,015,781, U.S. Pat. No. 6,133,222, U.S. Pat. No. 6,326,348, U.S. Pat. No. 6,482,789, U.S. Pat. No. 6,677,289, U.S. Pat. No. 6,903,059, U.S. Pat. No. 6,660,711, U.S. Pat. No. 6,335,312, and WO 9918929. Yet other suitable branched surfactants include those described in WO9738956, WO9738957, and WO0102451.

In some aspects, the branched anionic surfactant comprises a branched modified alkylbenzene sulfonate (MLAS), as discussed in WO 99/05243, WO 99/05242, WO 99/05244, WO 99/05082, WO 99/05084, WO 99/05241, WO 99/07656, WO 00/23549, and WO 00/23548.

In some aspects, the branched anionic surfactant comprises a C12/13 alcohol-based surfactant comprising a methyl branch randomly distributed along the hydrophobe chain, e.g., Safol®, Marlipal® available from Sasol.

Other suitable branched surfactants include those disclosed in U.S. Pat. No. 6,037,313 (P&G), WO9521233 (P&G), U.S. Pat. No. 3,480,556 (Atlantic Richfield), U.S. Pat. No. 6,683,224 (Cognis), US20030225304A1 (Kao), US2004236158A1 (R&H), U.S. Pat. No. 6,818,700 (Atofina), US2004154640 (Smith et al), EP1280746 (Shell), EP1025839 (L'Oreal), U.S. Pat. No. 6,765,119 (BASF), EP1080084 (Dow), U.S. Pat. No. 6,723,867 (Cognis), EP1401792A1 (Shell), EP1401797A2 (Degussa AG), US2004048766 (Raths et al), U.S. Pat. No. 6,596,675 (L'Oreal), EP1136471 (Kao), EP961765 (Albemarle), U.S. Pat. No. 6,580,009 (BASF), US2003105352 (Dado et al), U.S. Pat. No. 6,573,345 (Cryovac), DE10155520 (BASF), U.S. Pat. No. 6,534,691 (du Pont), U.S. Pat. No. 6,407,279 (ExxonMobil), U.S. Pat. No. 5,831,134 (Peroxid-Chemie), U.S. Pat. No. 5,811,617 (Amoco), U.S. Pat. No. 5,463,143 (Shell), U.S. Pat. No. 5,304,675 (Mobil), U.S. Pat. No. 5,227,544 (BASF), U.S. Pat. No. 5,446,213A (MITSUBISHI KASEI CORPORATION), EP1230200A2 (BASF), EP1159237B1 (BASF), US20040006250A1 (NONE), EP1230200B1 (BASF), WO2004014826A1 (SHELL), U.S. Pat. No. 6,703,535B2 (CHEVRON), EP1140741B1 (BASF), WO2003095402A1 (OXENO), U.S. Pat. No. 6,765,106B2 (SHELL), US20040167355A1 (NONE), U.S. Pat. No. 6,700,027B1 (CHEVRON), US20040242946A1 (NONE), WO2005037751A2 (SHELL), WO2005037752A1 (SHELL), U.S. Pat. No. 6,906,230B1 (BASF), WO2005037747A2 (SHELL) OIL COMPANY.

Additional suitable branched anionic detersive surfactants include surfactant derivatives of isoprenoid-based poly-branched detergent alcohols, as described in US 2010/0137649. Isoprenoid-based surfactants and isoprenoid derivatives are also described in the book entitled "Comprehensive Natural Products Chemistry: Isoprenoids Including Carotenoids and Steroids (Vol. two)", Barton and Nakanishi, © 1999, Elsevier Science Ltd and are included in the structure E, and are hereby incorporated by reference.

Further suitable branched anionic detersive surfactants include those derived from anteiso and iso-alcohols. Such surfactants are disclosed in WO2012009525.

Additional suitable branched anionic detersive surfactants include those described in US Patent Application Nos. 2011/0171155A1 and 2011/0166370A1.

Suitable branched anionic surfactants also include Guerbet-alcohol-based surfactants. Guerbet alcohols are branched, primary monofunctional alcohols that have two linear carbon chains with the branch point always at the second carbon position. Guerbet alcohols are chemically described as 2-alkyl-1-alkanols. Guerbet alcohols generally have from 12 carbon atoms to 36 carbon atoms. The Guerbet alcohols may be represented by the following formula: (R1)(R2)CHCH$_2$OH, where R1 is a linear alkyl group, R2 is a linear alkyl group, the sum of the carbon atoms in R1 and R2 is 10 to 34, and both R1 and R2 are present. Guerbet alcohols are commercially available from Sasol as Isofol® alcohols and from Cognis as Guerbetol.

Each of the branched surfactants described above may include a bio-based content. In some aspects, the branched surfactant has a bio-based content of at least about 50%, at least about 60%, at least about 70%, at least about 80%, at least about 90%, at least about 95%, at least about 97%, or about 100%.

Combinations of Surfactants

In some aspects, the detergent or cleaning composition of the present invention comprises an anionic surfactant and a nonionic surfactant, for example, a $C_{12}$-$C_{18}$ alkyl ethoxylate. In other aspects, the detergent or cleaning composition of the present invention comprises $C_{10}$-$C_{15}$ alkyl benzene sulfonates (LAS) and another anionic surfactant, e.g., $C_{10}$-$C_{18}$ alkyl alkoxy sulfates (AE$_x$S), where x is from 1-30. In certain aspects, the detergent or cleaning composition of the present invention comprises an anionic surfactant and a cationic surfactant, for example, dimethyl hydroxyethyl lauryl ammonium chloride. In other aspects, the detergent or cleaning composition of the present invention comprises an anionic surfactant and an amphoteric surfactant, for example, C12-C14 dimethyl amine oxide.

When the detergent or cleaning composition of the present invention comprises a combination of anionic and nonionic surfactant materials, it is preferred that the weight ratio of anionic surfactant(s) to nonionic surfactant(s) is at least about 1.5:1, more preferably at least about 2:1 or 5:1 or 25:1, and most preferably at least about 100:1.

Adjunct Cleaning Additives

The detergent or cleaning compositions of the invention may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, perfumes, and mixtures thereof.

Enzymes

The detergent or cleaning compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a detergent or cleaning composition, the aforementioned additional enzymes may be present at levels from about 0.00001% to about 2%, from about 0.0001% to about 1% or even from about 0.001% to about 0.5% enzyme protein by weight of the detergent or cleaning composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus*, *B. alkalophilus*, *B. subtilis*, *B. amyloliquefaciens*, *Bacillus pumilus* and *Bacillus gibsonii* described in U.S. Pat. No. 6,312,936 B1, U.S. Pat. No. 5,679,630, U.S. Pat. No. 4,760,025, U.S. Pat. No. 7,262,042 and WO09/021867.

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, including those derived from *Bacillus amyloliquefaciens* described in WO 07/044993A2.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the folowing mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis*, *Bacillus amyloliquefaciens*, *Bacillus stearothermophilus*, *Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants described in WO 94/02597, WO 94/18314, WO96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, S255, R172, and/or M261. Preferably said amylase comprises one or more of M202L, M202V, M2025, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus Stearophermophilus* or a truncated version thereof.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases" such as those described in U.S. Pat. No. 6,939,702 B1 and US PA 2009/0217464. In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, Calif.).

Enzyme Stabilizing System

The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, chlorine bleach scavengers and mixtures thereof, and are designed to address different stabilization problems depending on the type and physical form of the cleaning composition. See U.S. Pat. No. 4,537,706 for a review of borate stabilizers. In the case of aqueous detergent or cleaning compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders

The detergent or cleaning compositions of the present invention may optionally comprise a builder, in addition to the sulfonate group-containing copolymers as described hereinabove. Built cleaning compositions typically comprise at least about 1% builder, based on the total weight of the composition. Liquid cleaning compositions may comprise up to about 10% builder, and in some examples up to about 8% builder, of the total weight of the composition. Granular cleaning compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing cleaning compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O).ySiO_2.zM'O$ wherein M is Na and/or K, M' is Ca and/or Mg; y/x is 0.5 to 2.0; and z/x is 0.005 to 1.0 as taught in U.S. Pat. No. 5,427,711.

Preferably, the detergent or cleaning compositions of the present invention are substantially free of other builders, especially inorganic builders, and more particularly the zeolite builder and phosphate builder.

Structurant/Thickeners

When the detergent or cleaning composition of the present invention is in a liquid form, e.g., as a liquid laundry detergent composition, it may comprise from about 0.01% to about 1% by weight of a dibenzylidene polyol acetal derivative (DBPA), or from about 0.05% to about 0.8%, or from about 0.1% to about 0.6%, or even from about 0.3% to about 0.5%. Non-limiting examples of suitable DBPA molecules are disclosed in U.S. 61/167,604. In one aspect, the DBPA derivative may comprise a dibenzylidene sorbitol acetal derivative (DBS). Said DBS derivative may be selected from the group consisting of: 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4-dimethyldibenzylidene) sorbitol; 1,3:2,4-di(p-ethylbenzylidene) sorbitol; and 1,3:2,4-di(3,4-dimethyldibenzylidene) sorbitol or mixtures thereof. These and other suitable DBS derivatives are disclosed in U.S. Pat. No. 6,102,999, column 2 line 43 to column 3 line 65.

The liquid laundry detergent composition of the present invention may also comprise from about 0.005% to about 1% by weight of a bacterial cellulose network. The term "bacterial cellulose" encompasses any type of cellulose produced via fermentation of a bacteria of the genus *Acetobacter* such as CELLULON® by CPKelco U.S. and includes materials referred to popularly as microfibrillated cellulose, reticulated bacterial cellulose, and the like. Some examples of suitable bacterial cellulose can be found in U.S. Pat. No. 6,967,027; U.S. Pat. No. 5,207,826; U.S. Pat. No. 4,487,634; U.S. Pat. No. 4,373,702; U.S. Pat. No. 4,863,565 and US 2007/0027108. In one aspect, said fibres have cross sectional dimensions of 1.6 nm to 3.2 nm by 5.8 nm to 133 nm. Additionally, the bacterial cellulose fibres have an average microfibre length of at least about 100 nm, or from about 100 to about 1,500 nm. In one aspect, the bacterial cellulose microfibres have an aspect ratio, meaning the average microfibre length divided by the widest cross sectional microfibre width, of from about 100:1 to about 400:1, or even from about 200:1 to about 300:1.

In one aspect, the bacterial cellulose is at least partially coated with a polymeric thickener. The at least partially coated bacterial cellulose can be prepared in accordance with the methods disclosed in US 2007/0027108 paragraphs 8 to 19. In one aspect the at least partially coated bacterial cellulose comprises from about 0.1% to about 5%, or even from about 0.5% to about 3%, by weight of bacterial cellulose; and from about 10% to about 90% by weight of the polymeric thickener. Suitable bacterial cellulose may include the bacterial cellulose described above and suitable polymeric thickeners include: carboxymethylcellulose, cationic hydroxymethylcellulose, and mixtures thereof.

In one aspect, the composition may further comprise from about 0.01 to about 5% by weight of the composition of a cellulosic fiber. Said cellulosic fiber may be extracted from vegetables, fruits or wood. Commercially available examples are Avicel® from FMC, Citri-Fi from Fiberstar or Betafib from Cosun.

In one aspect, the composition may further comprise from about 0.01 to about 1% by weight of the composition of a non-polymeric crystalline, hydroxyl functional structurant. Said non-polymeric crystalline, hydroxyl functional structurants generally may comprise a crystallizable glyceride which can be pre-emulsified to aid dispersion into the final fluid detergent or cleaning composition. In one aspect, crystallizable glycerides may include hydrogenated castor oil or "HCO" or derivatives thereof, provided that it is capable of crystallizing in the liquid detergent or cleaning composition.

Liquid laundry detergent compositions of the present invention may comprise from about 0.01% to about 5% by weight of a naturally derived and/or synthetic polymeric structurant. Examples of naturally derived polymeric structurants of use in the present invention include: hydroxyethyl cellulose, hydrophobically modified hydroxyethyl cellulose, carboxymethyl cellulose, polysaccharide derivatives and mixtures thereof. Suitable polysaccharide derivatives include: pectine, alginate, arabinogalactan (gum Arabic), carrageenan, gellan gum, xanthan gum, guar gum and mixtures thereof. Examples of synthetic polymeric structurants of use in the present invention include: polycarboxylates, polyacrylates, hydrophobically modified ethoxylated urethanes, hydrophobically modified non-ionic polyols and mixtures thereof. In one aspect, said polycarboxylate polymer is a polyacrylate, polymethacrylate or mixtures thereof. In another aspect, the polyacrylate is a copolymer of unsaturated mono- or di-carbonic acid and $C_1$-$C_{30}$ alkyl ester of the (meth)acrylic acid. Said copolymers are available from Noveon inc under the tradename Carbopol Aqua 30.

In one aspect, the external structuring system may comprise a di-amido gellant having a molecular weight from about 150 g/mol to about 1,500 g/mol, or even from about 500 g/mol to about 900 g/mol. Such di-amido gellants may comprise at least two nitrogen atoms, wherein at least two of said nitrogen atoms form amido functional substitution groups. In one aspect, the amido groups are different. In another aspect, the amido functional groups are the same. The di-amido gellant has the following formula:

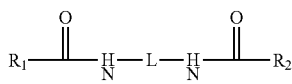

wherein:

$R_1$ and $R_2$ is an amino functional end-group, or even amido functional end-group, in one aspect $R_1$ and $R_2$ may comprise a pH-tuneable group, wherein the pH tuneable amido-gellant may have a pKa of from about 1 to about 30, or even from about 2 to about 10. In one aspect, the pH tuneable group may comprise a pyridine. In one aspect, $R_1$ and $R_2$ may be different. In another aspect, may be the same.

L is a linking moeity of molecular weight from 14 to 500 g/mol. In one aspect, L may comprise a carbon chain comprising between 2 and 20 carbon atoms. In another aspect, L may comprise a pH-tuneable group. In one aspect, the pH tuneable group is a secondary amine.

In one aspect, at least one of $R_1$, $R_2$ or L may comprise a pH-tuneable group.

Non-Limiting Examples of Di-Amido Gellants are:

N,N'-(2S,2'S)-1,1'-(dodecane-1,12-diylbis (azanediyl))bis(3-methyl-1-oxobutane-2,1-diyl)di- isonicotinamide

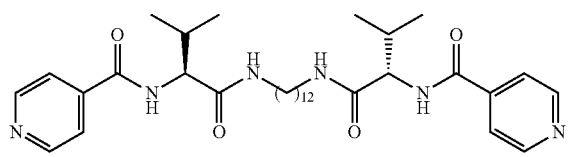

dibenzyl (2S,2'S)-1,1'-(propane-1,3-diylbis (azanediyl))bis(3-methyl-1-oxobutane-2,1-diyl)di- carbamate

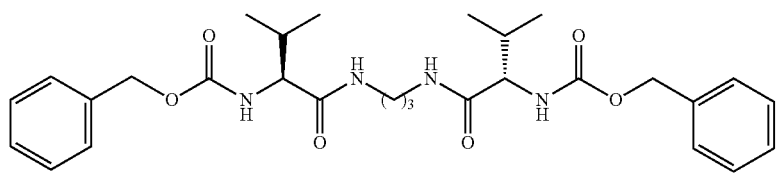

dibenzyl (2S,2'S)-1,1'-(dodecane-1,12-diylbis (azanediyl))bis(1-oxo-3-phenylpropane-2,1-diyl) dicarbamate

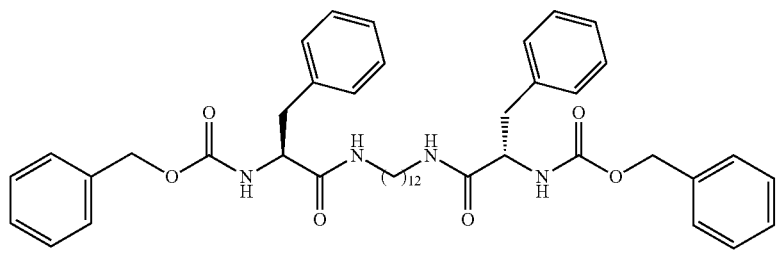

Polymeric Dispersing Agents

The detergent or cleaning composition may comprise one or more polymeric dispersing agents. Examples are carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The detergent or cleaning composition may comprise one or more amphiphilic cleaning polymers such as the compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n=from 20 to 30, and x=from 3 to 8, or sulphated or sulphonated variants thereof.

The detergent or cleaning composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. These may comprise alkoxylated polyalkylenimines, for example, having an inner polyethylene oxide block and an outer polypropylene oxide block. Such compounds may include, but are not limited to, ethoxylated polyethyleneimine, ethoxylated hexamethylene diamine, and sulfated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF. The cleaning compositions described herein may comprise from about 0.1% to about 10%, and in some examples, from about 0.1% to about 8%, and in other examples, from about 0.1% to about 6%, by weight of the cleaning composition, of alkoxylated polyamines.

Alkoxylated polycarboxylates such as those prepared from polyacrylates are useful herein to provide additional grease removal performance. Such materials are described in WO 91/08281 and PCT 90/01815. Chemically, these materials comprise polyacrylates having one ethoxy side-chain per every 7-8 acrylate units. The side-chains are of the formula —($CH_2CH_2O$)$_m$($CH_2$)$_n$$CH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. The detergent or cleaning compositions described herein may comprise from about 0.1% to about 10%, and in some examples, from about 0.25% to about 5%, and in other examples, from about 0.3% to about 2%, by weight of the cleaning composition, of alkoxylated polycarboxylates.

Suitable amphilic graft co-polymer preferable include the amphilic graft co-polymer comprises (i) polyethyelene glycol backbone; and (ii) and at least one pendant moiety selected from polyvinyl acetate, polyvinyl alcohol and mixtures thereof. A preferred amphilic graft co-polymer is Sokalan® HP22, supplied from BASF. Suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is typically about 6000 and the weight ratio of the polyethylene oxide to polyvinyl acetate is about 40 to 60 and no more than 1 grafting point per 50 ethylene oxide units.

Carboxylate polymer—The detergent or cleaning compositions of the present invention may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil release polymer—The detergent or cleaning compositions of the present invention may also include one or more soil release polymers having a structure as defined by one of the following structures (I), (II) or (III):

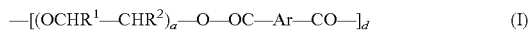

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

$$—[(OCHR^5—CHR^6)_c—OR^7]_f \quad (III)$$

wherein:
a, b and c are from 1 to 200;
d, e and f are from 1 to 50;
Ar is a 1,4-substituted phenylene;
sAr is 1,3-substituted phenylene substituted in position 5 with $SO_3Me$;
Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;
$R^1$, $R^2$, $R^3$, $R^4$, $R^5$ and $R^6$ are independently selected from H or $C_1$-$C_{18}$ n- or iso-alkyl; and
$R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Cellulosic polymer—The consumer products of the present invention may also include one or more cellulosic polymers including those selected from alkyl cellulose, alkyl alkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixures thereof. In one aspect, the carboxymethyl cellulose has a degree of carboxymethyl substitution from 0.5 to 0.9 and a molecular weight from 100,000 Da to 300,000 Da.

Examples of polymeric dispersing agents are found in U.S. Pat. No. 3,308,067, European Patent Application No. 66915, EP 193,360, and EP 193,360.

Amines

Various amines may be used in the detergent or cleaning compositions described herein for added removal of grease and particulates from soiled materials. The detergent or cleaning compositions described herein may comprise from about 0.1% to about 10%, in some examples, from about 0.1% to about 4%, and in other examples, from about 0.1% to about 2%, by weight of the cleaning composition, of additional amines. Non-limiting examples of amines include, but are not limited to, polyamines, oligoamines, triamines, diamines, pentamines, tetraamines, polyetheramines, or combinations thereof. Specific examples of suitable additional amines include tetraethylenepentamine, triethylenetetraamine, diethylenetriamine, polyetheramines, or a mixture thereof.

Bleaching Agents

The detergent or cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the detergent or cleaning compositions of the present invention may comprise from about 0.1% to about 50% or even from about 0.1% to about 25% bleaching agent by weight of the detergent or cleaning composition. Examples of suitable bleaching agents include:

(1) photobleaches for example sulfonated zinc phthalocyanine sulfonated aluminium phthalocyanines, xanthene dyes and mixtures thereof;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C═O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject detergent or cleaning composition may comprise NOBS, TAED or mixtures thereof.

When present, the peracid and/or bleach activator is generally present in the detergent or cleaning composition in an amount of from about 0.1 to about 60 wt %, from about 0.5 to about 40 wt % or even from about 0.6 to about 10 wt % based on the fabric and home care product. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Catalysts

The detergent or cleaning compositions of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof, as described in USPA 2007/0173430 A1.

In another aspect, the laundry detergent composition comprises a bleach ingredient, the bleach ingredient have a log $P_{o/w}$ no greater than 0, no greater than –0.5, no greater than –1.0, no greater than –1.5, no greater than –2.0, no greater than –2.5, no greater than –3.0, or even no greater than –3.5. The method for determining log $P_{o/w}$ is described in more detail below.

Typically, the bleach ingredient is capable of generating a bleaching species having a $X_{so}$ of from 0.01 to about 0.30, from 0.05 to about 0.25, or even from about 0.10 to 0.20. The method for determining $X_{so}$ is described in more detail below. For example, bleaching ingredients having an isoquinolinium structure are capable of generating a bleaching species that has an oxaziridinium structure. In this example, the $X_{so}$ is that of the oxaziridinium bleaching species.

Without wishing to be bound by theory, the inventors believe that controlling the electophilicity and hydrophobicity in this above described manner enables the bleach ingredient to be delivered substantially only to areas of the fabric that are more hydrophobic, and that contain electron rich soils, including visible chromophores, that are susceptible to bleaching by highly electrophilic oxidants.

In one aspect, the bleach catalyst has a structure corresponding to general formula below:

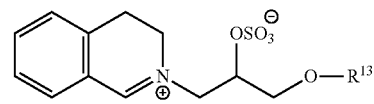

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl;

Log $P_{o/w}$ is determined according to the method found in Brooke, D. N., Dobbs, A. J., Williams, N, *Ecotoxicology and Environmental Safety* (1986) 11(3): 251-260. The parameter $X_{so}$ is determined according to the method described in Adam, W., Haas, W., Lohray, B. B. *Journal of the American Chemical Society* (1991) 113(16) 6202-6208.

Brighteners

Optical brighteners or other brightening or whitening agents may be incorporated at levels of from about 0.01% to about 1.2%, by weight of the composition, into the cleaning compositions described herein. Commercial fluorescent brighteners suitable for the present invention can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982). Specific nonlimiting examples of optical brighteners which are useful in the present compositions are those identified in U.S. Pat. No. 4,790,856, U.S. Pat. No. 3,646,015 U.S. Pat. No. 7,863,236 and its CN equivalent No. 1764714.

In some examples, the fluorescent brightener herein comprises a compound of formula (1):

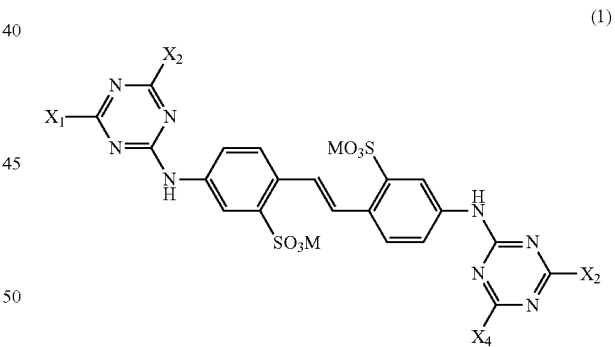

(1)

wherein: $X_1$, $X_2$, $X_3$, and $X_4$ are —N($R^1$)$R^2$, wherein $R^1$ and $R^2$ are independently selected from a hydrogen, a phenyl, hydroxyethyl, or an unsubstituted or substituted $C_1$-$C_8$ alkyl, or —N($R^1$)$R^2$ form a heterocyclic ring, preferably $R^1$ and $R^2$ are independently selected from a hydrogen or phenyl, or —N($R^1$)$R^2$ form a unsubstituted or substituted morpholine ring; and M is a hydrogen or a cation, preferably M is sodium or potassium, more preferably M is sodium.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium 4,4'-bis{[4-anilino-6-(N-2-bis-hydroxyethyl)-s- triazine-2-yk]-amino}-2,2'-stilbenedisulonate (commercially available under the tradename Tinopal UNPA-GX by Ciba-Geigy Corporation), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agents

The composition may comprise a fabric hueing agent (sometimes referred to as shading, bluing or whitening agents). Typically the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and provide the desired shade either alone or in combination. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in EP1794275 or EP1794276, or dyes as disclosed in U.S. Pat. No. 7,208,459 B2, and mixtures thereof. In another aspect, suitable small molecule dyes include small molecule dyes selected from the group consisting of C. I. numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO2011/98355, WO2011/47987, US2012/090102, WO2010/145887, WO2006/055787 and WO2010/142503.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Preferred hueing dyes include the whitening agents found in WO 08/87497 A1, WO2011/011799 and WO2012/054835. Preferred hueing agents for use in the present invention may be the preferred dyes disclosed in these references, including those selected from Examples 1-42 in Table 5 of WO2011/011799. Other preferred dyes are disclosed in U.S. Pat. No. 8,138,222. Other preferred dyes are disclosed in WO2009/069077.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used).

Encapsulates

The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

In some aspects, the encapsulate comprises a core, and the core comprises a perfume. In certain aspects, the encapsulate comprises a shell, and the shell comprises melamine formaldehyde and/or cross linked melamine formaldehyde. In some aspects, the encapsulate comprises a core comprising a perfume and a shell comprising melamine formaldehyde and/or cross linked melamine formaldehyde Suitable encapsulates may comprise a core material and a shell, where the shell at least partially surrounds the core material. At least 75%, or at least 85%, or even at least 90% of the encapsulates may have a fracture strength of from about 0.2 MPa to about 10 MPa, from about 0.4 MPa to about 5 MPa, from about 0.6 MPa to about 3.5 MPa, or even from about 0.7 MPa to about 3 MPa; and a benefit agent leakage of from 0% to about 30%, from 0% to about 20%, or even from 0% to about 5%.

In some aspects, at least 75%, 85% or even 90% of said encapsulates may have a particle size of from about 1 microns to about 80 microns, about 5 microns to 60 microns, from about 10 microns to about 50 microns, or even from about 15 microns to about 40 microns.

In some aspects, at least 75%, 85% or even 90% of said encapsulates may have a particle wall thickness of from about 30 nm to about 250 nm, from about 80 nm to about 180 nm, or even from about 100 nm to about 160 nm.

In some aspects, the core of the encapsulate comprises a material selected from a perfume raw material and/or optionally a material selected from vegetable oil, including neat and/or blended vegetable oils including caster oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil or mixtures thereof; aromatic solvents, including benzene, toluene or mixtures thereof; silicone oils; or mixtures thereof.

In some aspects, the wall of the encapsulate comprises a suitable resin, such as the reaction product of an aldehyde and an amine. Suitable aldehydes include formaldehyde. Suitable amines include melamine, urea, benzoguanamine, glycoluril, or mixtures thereof. Suitable melamines include methylol melamine, methylated methylol melamine, imino melamine and mixtures thereof. Suitable ureas include, dimethylol urea, methylated dimethylol urea, urea-resorcinol, or mixtures thereof.

In some aspects, suitable formaldehyde scavengers may be employed with the encapsulates, for example, in a capsule slurry and/or added to a composition before, during, or after the encapsulates are added to such composition.

Suitable capsules are disclosed in USPA 2008/0305982 A1; and/or USPA 2009/0247449 A1. Alternatively, suitable capsules can be purchased from Appleton Papers Inc. of Appleton, Wis. USA.

In addition, the materials for making the aforementioned encapsulates can be obtained from Solutia Inc. (St Louis, Mo. U.S.A.), Cytec Industries (West Paterson, N.J. U.S.A.), sigma-Aldrich (St. Louis, Mo. U.S.A.), CP Kelco Corp. of San Diego, Calif., USA; BASF AG of Ludwigshafen, Germany; Rhodia Corp. of Cranbury, N.J., USA; Hercules Corp. of Wilmington, Del., USA; Agrium Inc. of Calgary, Alberta, Canada, ISP of New Jersey U.S.A., Akzo Nobel of Chicago, Ill., USA; Stroever Shellac Bremen of Bremen, Germany; Dow Chemical Company of Midland, Mich., USA; Bayer AG of Leverkusen, Germany; Sigma-Aldrich Corp., St. Louis, Mo., USA.

Perfumes

Perfumes and perfumery ingredients may be used in the cleaning compositions described herein. Non-limiting examples of perfume and perfumery ingredients include, but are not limited to, aldehydes, ketones, esters, and the like. Other examples include various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients. Finished perfumes may be included at a concentration ranging from about 0.01% to about 2% by weight of the cleaning composition.

Dye Transfer Inhibiting Agents

Fabric cleaning compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents

The detergent or cleaning compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins and mixtures thereof. Chelating agents can be present in the acid or salt form including alkali metal, ammonium, and substituted ammonium salts thereof, and mixtures thereof. Non-limiting examples of chelants of use in the present invention are found in U.S. Pat. No. 7,445,644, U.S. Pat. No. 7,585,376 and U.S. Publication 2009/0176684A1.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Phosphorus containing chelants include, but are not limited to diethylene triamine penta (methylene phosphonic acid) (DTPMP CAS 15827-60-8); ethylene diamine tetra (methylene phosphonic acid) (EDTMP CAS 1429-50-1); 2-Phosphonobutane 1,2,4-tricarboxylic acid (Bayhibit® AM); hexamethylene diamine tetra(methylene phosphonic acid) (CAS 56744-47-9); hydroxy-ethane diphosphonic acid (HEDP CAS 2809-21-4); hydroxyethane dimethylene phosphonic acid; 2-phosphono-1,2,4-Butanetricarboxylic acid (CAS 37971-36-1); 2-hydroxy-2-phosphono-Acetic acid (CAS 23783-26-8); Aminotri(methylenephosphonic acid) (ATMP CAS 6419-19-8); P,P'-(1,2-ethanediyl)bis-Phosphonic acid (CAS 6145-31-9); P,P'-methylenebis-Phosphonic acid (CAS 1984-15-2); Triethylenediaminetetra(methylene phosphonic acid) (CAS 28444-52-2); P-(1-hydroxy-1-methylethyl)-Phosphonic acid (CAS 4167-10-6); bis(hexamethylene triamine penta(methylenephosphonic acid)) (CAS 34690-00-1); N2,N2,N6,N6-tetrakis(phosphonomethyl)-Lysine (CAS 194933-56-7, CAS 172780-03-9), salts thereof, and mixtures thereof. Preferably, these aminophosphonates do not contain alkyl or alkenyl groups with more than about 6 carbon atoms.

A biodegradable chelator that may also be used herein is ethylenediamine disuccinate ("EDDS"). In some examples, but of course not limited to this particular example, the [S,S] isomer as described in U.S. Pat. No. 4,704,233 may be used. In other examples, the trisodium salt of EDDA may be used, though other forms, such as magnesium salts, may also be useful. Polymeric chelants such as Triton P® from BASF may also be useful.

Polyfunctionally-substituted aromatic chelating agents may also be used in the cleaning compositions. See U.S. Pat. No. 3,812,044, issued May 21, 1974, to Connor et al. Compounds of this type in acid form are dihydroxydisulfobenzenes, such as 1,2-dihydroxy-3,5-disulfobenzene, also known as Tiron. Other sulphonated catechols may also be used. In addition to the disulfonic acid, the term "tiron" may also include mono- or di-sulfonate salts of the acid, such as, for example, the disodium sulfonate salt, which shares the same core molecular structure with the disulfonic acid.

The detergent or cleaning composition according to the present invention may comprise a substituted or unsubstituted 2-pyridinol-N-oxide compound or a salt thereof, as a chelating agent. Included within the scope of this invention are tautomers of this compound, e.g., 1-Hydroxy-2(1H)-pyridinone, as chelating agents. In certain aspects, the detergent or cleaning composition comprises a 2-pyridinol-N-oxide compound selected from the group consisting of: 2-hydroxypyridine-1-oxide; 3-pyridinecarboxylic acid, 2-hydroxy-, 1-oxide; 6-hydroxy-3-pyridinecarboxylic acid, 1-oxide; 2-hydroxy-4-pyridinecarboxylic acid, 1-oxide; 2-pyridinecarboxylic acid, 6-hydroxy-, 1-oxide; 6-hydroxy-3-pyridinesulfonic acid, 1-oxide; and mixtures thereof. In certain aspects, the detergent or cleaning composition comprises a 1-Hydroxy-2(1H)-pyridinone compound selected from the group consisting of: 1-Hydroxy-2(1H)-pyridinone (CAS 822-89-9); 1,6-dihydro-1-hydroxy-6-oxo-3-Pyridinecarboxylic acid (CAS 677763-18-7); 1,2-dihydro-1-hydroxy-2-oxo-4-Pyridinecarboxylic acid (CAS 119736-22-0); 1,6-dihydro-1-hydroxy-6-oxo-2-Pyridinecarboxylic acid (CAS 94781-89-2); 1-hydroxy-4-methyl-6-(2,4,4-trimethylpentyl)-2(1H)-Pyridinone (CAS 50650-76-5); 6-(cyclohexylmethyl)-1-hydroxy-4-methyl-2(1H)-Pyridinone (CAS 29342-10-7); 1-hydroxy-4,6-dimethyl-2(1H)-Pyridinone (CAS 29342-02-7); 1-Hydroxy-4-methyl-6-(2,4,4-trimethylpentyl)-2-pyridone monoethanolamine (CAS 68890-66-4); 1-hydroxy-6-(octyloxy)-2(1H)-Pyridinone (CAS 162912-64-3); 1-Hydroxy-4-methyl-6-cyclohexyl-2-pyridinone ethanolamine salt (CAS 41621-49-2); 1-Hydroxy-4-methyl-6-cyclohexyl-2-pyridinone (CAS 29342-05-0); 6-ethoxy-1,2-dihydro-1-hydroxy-2-oxo-4-Pyridinecarboxylic acid, methyl ester (CAS 36979-78-9); 1-hydroxy-5-nitro-2(1H)-Pyridinone (CAS 45939-70-6); and mixtures thereof. These compounds are commercially available from, for example, Sigma-Aldrich (St. Louis, Mo.), Princeton Building Blocks (Monmouth Junction, N.J.), 3B Scientific Corporation (Libertyville, Ill.), SynFine Research (Richmond Hill, ON), Ryan Scientific, Inc. (Mt. Pleasant, S.C.), and/or Aces Pharma (Branford, Conn.).

Hydroxamic acids are a class of chemical compounds in which a hydroxylamine is inserted into a carboxylic acid and be used as chelating agents. The general structure of a hydroxamic acid is the following:

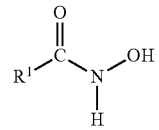

The preferred hydroxamates are those where $R^1$ is C4 to C14 alkyl, preferably normal alkyl, most preferably saturated, salts thereof and mixtures thereof. When the C8 material is used, it called octyl hydroxamic acid.

Other suitable chelating agents for use herein are the commercial DEQUEST series, and chelants from Monsanto, Akzo-Nobel, DuPont, Dow, the Trilon® series from BASF and Nalco.

The chelant may be present in the detergent or cleaning compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the detergent or cleaning compositions disclosed herein.

Suds Suppressors

Compounds for reducing or suppressing the formation of suds can be incorporated into the detergent or cleaning compositions described herein. Suds suppression can be of particular importance in the so-called "high concentration cleaning process" as described in U.S. Pat. Nos. 4,489,455, 4,489,574, and in front-loading style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds supressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols. Suds supressors are described in U.S. Pat. Nos. 2,954,347; 4,265,779; 4,265,779; 3,455,839; 3,933,672; 4,652,392; 4,978,471; 4,983,316; 5,288,431; 4,639,489; 4,749,740; and 4,798,679; 4,075,118; 8,492,325; European Patent Application No. 89307851.9; EP 150,872; and DOS 2,124,526.

Additional suitable antifoams are those derived from phenylpropylmethyl substituted polysiloxanes.

In certain examples, the detergent or cleaning composition comprises a suds suppressor selected from organomodified silicone polymers with aryl or alkylaryl substituents combined with silicone resin and a primary filler, which is modified silica. The detergent or cleaning compositions may comprise from about 0.001% to about 4.0%, by weight of the composition, of such a suds suppressor. In further examples, the detergent or cleaning composition comprises a suds suppressor selected from: a) mixtures of from about 80 to about 92% ethylmethyl, methyl(2-phenylpropyl) siloxane; from about 5 to about 14% MQ resin in octyl stearate; and from about 3 to about 7% modified silica; b) mixtures of from about 78 to about 92% ethylmethyl, methyl(2-phenylpropyl) siloxane; from about 3 to about 10% MQ resin in octyl stearate; from about 4 to about 12% modified silica; or c) mixtures thereof, where the percentages are by weight of the anti-foam.

The detergent or cleaning compositions herein may comprise from 0.1% to about 10%, by weight of the composition, of suds suppressor. When utilized as suds suppressors, monocarboxylic fatty acids, and salts thereof, may be present in amounts of up to about 5% by weight of the cleaning composition, and in some examples, from about 0.5% to about 3% by weight of the cleaning composition. Silicone suds suppressors may be utilized in amounts of up to about 2.0% by weight of the cleaning composition, although higher amounts may be used. Monostearyl phosphate suds suppressors may be utilized in amounts ranging from about 0.1% to about 2% by weight of the cleaning composition. Hydrocarbon suds suppressors may be utilized in amounts ranging from about 0.01% to about 5.0% by weight of the cleaning composition, although higher levels can be used. Alcohol suds suppressors may be used at a concentration ranging from about 0.2% to about 3% by weight of the detergent or cleaning composition.

Unit Dose Product Form with a Water-Soluble Film

The compositions of the present invention may also be encapsulated within a unit dose product form, i.e., a pouch made of water-soluble film having either a single compartment or multiple compartments. Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material.

Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779 (as described in the Applicants co-pending applications ref 44528 and 11599) and those described in U.S. Pat. No. 6,166,117 and U.S. Pat. No. 6,787,512 and PVA films of corresponding solubility and deformability characteristics.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

Suds Boosters

If high sudsing is desired, suds boosters such as the $C_{10}$-$C_{16}$ alkanolamides may be incorporated into the cleaning compositions at a concentration ranging from about 1% to about 10% by weight of the cleaning composition. Some examples include the $C_{10}$-$C_{14}$ monoethanol and diethanol amides. If desired, water-soluble magnesium and/or calcium salts such as $MgCl_2$, $MgSO_4$, $CaCl_2$, $CaSO_4$, and the like, may be added at levels of about 0.1% to about 2% by weight of the cleaning composition, to provide additional suds and to enhance grease removal performance.

Conditioning Agents

The composition of the present invention may include a high melting point fatty compound. The high melting point fatty compound useful herein has a melting point of 25° C. or higher, and is selected from the group consisting of fatty alcohols, fatty acids, fatty alcohol derivatives, fatty acid derivatives, and mixtures thereof. Such compounds of low melting point are not intended to be included in this section. Non-limiting examples of the high melting point compounds are found in International Cosmetic Ingredient Dictionary, Fifth Edition, 1993, and CTFA Cosmetic Ingredient Handbook, Second Edition, 1992.

The high melting point fatty compound is included in the composition at a level of from about 0.1% to about 40%, preferably from about 1% to about 30%, more preferably from about 1.5% to about 16% by weight of the composition, from about 1.5% to about 8% in view of providing improved conditioning benefits such as slippery feel during the application to wet hair, softness and moisturized feel on dry hair.

The compositions of the present invention may contain a cationic polymer. Concentrations of the cationic polymer in the composition typically range from about 0.05% to about 3%, in another embodiment from about 0.075% to about 2.0%, and in yet another embodiment from about 0.1% to about 1.0%. Suitable cationic polymers will have cationic charge densities of at least about 0.5 meq/gm, in another embodiment at least about 0.9 meq/gm, in another embodiment at least about 1.2 meq/gm, in yet another embodiment at least about 1.5 meq/gm, but in one embodiment also less than about 7 meq/gm, and in another embodiment less than about 5 meq/gm, at the pH of intended use of the composition, which pH will generally range from about pH 3 to about pH 9, in one embodiment between about pH 4 and about pH 8. Herein, "cationic charge density" of a polymer refers to the ratio of the number of positive charges on the polymer to the molecular weight of the polymer. The average molecular weight of such suitable cationic polymers will generally be between about 10,000 and 10 million, in one embodiment between about 50,000 and about 5 million, and in another embodiment between about 100,000 and about 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

Suitable cationic polymers are described in U.S. Pat. Nos. 3,962,418; 3,958,581; and U. S. Publication No. 2007/0207109A1, which are all.

The composition of the present invention may include a nonionic polymer as a conditioning agent. Polyalkylene glycols having a molecular weight of more than about 1000 are useful herein. Useful are those having the following general formula:

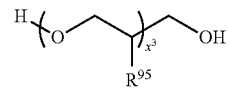

wherein $R^{95}$ is selected from the group consisting of H, methyl, and mixtures thereof. Conditioning agents, and in particular silicones, may be included in the composition. The conditioning agents useful in the compositions of the present invention typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. Such conditioning agents should be physically and chemically compatible with the essential components of the composition, and should not otherwise unduly impair product stability, aesthetics or performance.

The concentration of the conditioning agent in the composition should be sufficient to provide the desired conditioning benefits. Such concentration can vary with the conditioning agent, the conditioning performance desired, the average size of the conditioning agent particles, the type and concentration of other components, and other like factors.

The concentration of the silicone conditioning agent typically ranges from about 0.01% to about 10%. Non-limiting examples of suitable silicone conditioning agents, and optional suspending agents for the silicone, are described in U.S. Reissue Pat. No. 34,584, U.S. Pat. Nos. 5,104,646; 5,106,609; 4,152,416; 2,826,551; 3,964,500; 4,364,837; 6,607,717; 6,482,969; 5,807,956; 5,981,681; 6,207,782; 7,465,439; 7,041,767; 7,217,777; US Patent Application Nos. 2007/0286837A1; 2005/0048549A1; 2007/0041929A1; British Pat. No. 849,433; German Patent No. DE 10036533, which are all incorporated herein by reference; Chemistry and Technology of Silicones, New York: Academic Press (1968); General Electric Silicone Rubber Product Data Sheets SE 30, SE 33, SE 54 and SE 76; Silicon Compounds, Petrarch Systems, Inc. (1984); and in Encyclopedia of Polymer Science and Engineering, vol. 15, 2d ed., pp 204-308, John Wiley & Sons, Inc. (1989).

The compositions of the present invention may also comprise from about 0.05% to about 3% of at least one organic conditioning oil as the conditioning agent, either alone or in combination with other conditioning agents, such as the silicones (described herein). Suitable conditioning oils include hydrocarbon oils, polyolefins, and fatty esters. Also suitable for use in the compositions herein are the conditioning agents described by the Procter & Gamble Company in U.S. Pat. Nos. 5,674,478, and 5,750,122. Also suitable for use herein are those conditioning agents described in U.S. Pat. Nos. 4,529,586, 4,507,280, 4,663,158, 4,197,865, 4,217, 914, 4,381,919, and 4,422, 853.

Hygiene and Malodour

The compositions of the present invention may also comprise one or more of zinc ricinoleate, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Probiotics

The compositions may comprise probiotics such as those described in WO2009/043709.

Fillers and Carriers

Fillers and carriers may be used in the cleaning compositions described herein. As used herein, the terms "filler" and "carrier" have the same meaning and can be used interchangeably.

Liquid cleaning compositions and other forms of cleaning compositions that include a liquid component (such as liquid-containing unit dose cleaning compositions) may contain water and other solvents as fillers or carriers. Suitable solvents also include lipophilic fluids, including siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, and mixtures thereof.

Low molecular weight primary or secondary alcohols exemplified by methanol, ethanol, propanol, and isopropanol are suitable. Monohydric alcohols may be used in some examples for solubilizing surfactants, and polyols such as those containing from 2 to about 6 carbon atoms and from 2 to about 6 hydroxy groups (e.g., 1,3-propanediol, ethylene glycol, glycerine, and 1,2-propanediol) may also be used. Amine-containing solvents, such as monoethanolamine, diethanolamine and triethanolamine, may also be used.

The detergent cleaning compositions may contain from about 5% to about 90%, and in some examples, from about 10% to about 50%, by weight of the composition, of such carriers. For compact or super-compact heavy duty liquid or other forms of cleaning compositions, the use of water may be lower than about 40% by weight of the composition, or lower than about 20%, or lower than about 5%, or less than about 4% free water, or less than about 3% free water, or less than about 2% free water, or substantially free of free water (i.e., anhydrous).

For powder or bar cleaning compositions, or forms that include a solid or powder component (such as powder-containing unit dose cleaning composition), suitable fillers may include, but are not limited to, sodium sulfate, sodium chloride, clay, or other inert solid ingredients. Fillers may also include biomass or decolorized biomass. Fillers in granular, bar, or other solid cleaning compositions may comprise less than about 80% by weight of the cleaning composition, and in some examples, less than about 50% by weight of the cleaning composition. Compact or supercompact powder or solid cleaning compositions may comprise less than about 40% filler by weight of the cleaning composition, or less than about 20%, or less than about 10%.

For either compacted or supercompacted liquid or powder cleaning compositions, or other forms, the level of liquid or solid filler in the product may be reduced, such that either the same amount of active chemistry is delivered to the wash liquor as compared to noncompacted cleaning compositions, or in some examples, the cleaning composition is more efficient such that less active chemistry is delivered to the wash liquor as compared to noncompacted compositions. For example, the wash liquor may be formed by contacting the cleaning composition to water in such an amount so that the concentration of cleaning composition in the wash liquor is from above 0 g/l to 6 g/l. In some examples, the concentration may be from about 0.5 g/l to about 5 g/l, or to about 3.0 g/l, or to about 2.5 g/l, or to about 2.0 g/l, or to about 1.5 g/l, or from about 0 g/l to about 1.0 g/l, or from about 0 g/l to about 0.5 g/l. These dosages are not intended to be limiting, and other dosages may be used that will be apparent to those of ordinary skill in the art.

Buffer System

The detergent or cleaning compositions described herein may be formulated such that, during use in aqueous cleaning operations, the wash water will have a pH of between about 7.0 and about 12, and in some examples, between about 7.0 and about 11. Techniques for controlling pH at recommended usage levels include the use of buffers, alkalis, or acids, and are well known to those skilled in the art. These include, but are not limited to, the use of sodium carbonate, citric acid or sodium citrate, lactic acid or lactate, monoethanol amine or other amines, boric acid or borates, and other pH-adjusting compounds well known in the art.

The detergent or cleaning compositions herein may comprise dynamic in-wash pH profiles. Such cleaning compositions may use wax-covered citric acid particles in conjunction with other pH control agents such that (i) about 3 minutes after contact with water, the pH of the wash liquor is greater than 10; (ii) about 10 minutes after contact with water, the pH of the wash liquor is less than 9.5; (iii) about 20 minutes after contact with water, the pH of the wash liquor is less than 9.0; and (iv) optionally, wherein, the equilibrium pH of the wash liquor is in the range of from about 7.0 to about 8.5.

Catalytic Metal Complexes

The detergent or cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243. If desired, the compositions herein can be catalyzed by means of a manganese compound. Such compounds and levels of use are well known in the art and include, for example, the manganese-based catalysts disclosed in U.S. Pat. No. 5,576,282. Cobalt bleach catalysts useful herein are known, and are described, for example, in U.S. Pat. No. 5,597,936; U.S. Pat. No. 5,595,967. Such cobalt catalysts are readily prepared by known procedures, such as taught for example in U.S. Pat. No. 5,597,936, and U.S. Pat. No. 5,595,967. Compositions herein may also suitably include a transition metal complex of ligands such as bispidones (WO 05/042532 A1) and/or macropolycyclic rigid ligands—abbreviated as "MRLs". The compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor. Suitable transition-metals in the instant transition-metal bleach catalyst include, for example, manganese, iron and chromium. Suitable MRLs include 5,12-diethyl-1,5,8,12-tetraazabicyclo[6.6.2]hexadecane. Suitable transition metal MRLs are readily prepared by known procedures, such as taught for example in WO 00/32601, and U.S. Pat. No. 6,225,464.

Other Adjunct Ingredients

A wide variety of other ingredients may be used in the detergent or cleaning compositions herein, including other active ingredients, carriers, hydrotropes, processing aids, dyes or pigments, solvents for liquid formulations, and solid or other liquid fillers, erythrosine, colliodal silica, waxes, probiotics, surfactin, aminocellulosic polymers, Zinc Ricinoleate, perfume microcapsules, rhamnolipids, sophorolipids, glycopeptides, methyl ester sulfonates, methyl ester ethoxylates, sulfonated estolides, cleavable surfactants, biopolymers, silicones, modified silicones, aminosilicones, deposition aids, locust bean gum, cationic hydroxyethylcellulose polymers, cationic guars, hydrotropes (especially cumenesulfonate salts, toluenesulfonate salts, xylenesulfonate salts, and naphalene salts), antioxidants, BHT, PVA particle-encapsulated dyes or perfumes, pearlescent agents, effervescent agents, color change systems, silicone polyurethanes, opacifiers, tablet disintegrants, biomass fillers, fast-dry silicones, glycol distearate, hydroxyethylcellulose polymers, hydrophobically modified cellulose polymers or hydroxyethylcellulose polymers, starch perfume encapsulates, emulsified oils, bisphenol antioxidants, microfibrous cellulose structurants, properfumes, styrene/acrylate polymers, triazines, soaps, superoxide dismutase, benzophenone protease inhibitors, functionalized TiO2, dibutyl phosphate, silica perfume capsules, and other adjunct ingredients, silicate salts (e.g., sodium silicate, potassium silicate), choline oxidase, pectate lyase, mica, titanium dioxide coated mica, bismuth oxychloride, and other actives.

The detergent or cleaning compositions described herein may also contain vitamins and amino acids such as: water soluble vitamins and their derivatives, water soluble amino acids and their salts and/or derivatives, water insoluble amino acids viscosity modifiers, dyes, nonvolatile solvents or diluents (water soluble and insoluble), pearlescent aids, foam boosters, additional surfactants or nonionic cosurfactants, pediculocides, pH adjusting agents, perfumes, preservatives, chelants, proteins, skin active agents, sunscreens, UV absorbers, vitamins, niacinamide, caffeine, and minoxidil.

The detergent or cleaning compositions of the present invention may also contain pigment materials such as nitroso, monoazo, disazo, carotenoid, triphenyl methane, triaryl methane, xanthene, quinoline, oxazine, azine, anthraquinone, indigoid, thionindigoid, quinacridone, phthalocianine, botanical, and natural colors, including water soluble components such as those having C.I. Names. The cleaning compositions of the present invention may also contain antimicrobial agents.

Processes of Making Detergent or Cleaning Compositions

The detergent or cleaning compositions of the present invention can be formulated into any suitable form and prepared by any process chosen by the formulator, non-limiting examples of which are described in the examples and in U.S. Pat. No. 4,990,280; U.S. 20030087791A1; U.S. 20030087790A1; U.S. 20050003983A1; U.S. 20040048764A1; U.S. Pat. No. 4,762,636; U.S. Pat. No. 6,291,412; U.S. 20050227891A1; EP 1070115A2; U.S. Pat. No. 5,879,584; U.S. Pat. No. 5,691,297; U.S. Pat. No. 5,574,005; U.S. Pat. No. 5,569,645; U.S. Pat. No. 5,565,422; U.S. Pat. No. 5,516,448; U.S. Pat. No. 5,489,392; U.S. Pat. No. 5,486,303.

Methods of Using Detergent or Cleaning Compositions

The present invention includes methods of using the detergent or cleaning compositions described hereinabove for cleaning soiled material. As will be appreciated by one skilled in the art, the detergent or cleaning compositions of the present invention are suited for use in laundry pretreatment applications, laundry cleaning applications, and home care applications.

Such methods include, but are not limited to, the steps of contacting the detergent or cleaning compositions in neat form or diluted in wash liquor, with at least a portion of a soiled material and then optionally rinsing the soiled material. The soiled material may be subjected to a washing step prior to the optional rinsing step.

For use in laundry pretreatment applications, the method may include contacting the detergent or cleaning compositions described herein with soiled fabric. Following pretreatment, the soiled fabric may be laundered in a washing machine or otherwise rinsed.

Machine laundry methods may comprise treating soiled laundry with an aqueous wash solution in a washing machine having dissolved or dispersed therein an effective amount of a machine laundry cleaning composition in accord with the invention. An "effective amount" of the cleaning composition means from about 20 g to about 300 g of product dissolved or dispersed in a wash solution of volume from about 5L to about 65L. The water temperatures may range from about 5° C. to about 100° C. The water to soiled material (e.g., fabric) ratio may be from about 1:1 to about 30:1. The compositions may be employed at concentrations of from about 500 ppm to about 15,000 ppm in solution. In the context of a fabric laundry composition, usage levels may also vary depending not only on the type and severity of the soils and stains, but also on the wash water temperature, the volume of wash water, and the type of washing machine (e.g., top-loading, front-loading, top-loading, vertical-axis Japanese-type automatic washing machine).

The detergent or cleaning compositions herein may be used for laundering of fabrics at reduced wash temperatures. These methods of laundering fabric comprise the steps of delivering a laundry detergent composition to water to form a wash liquor and adding a laundering fabric to said wash liquor, wherein the wash liquor has a temperature of from about 0° C. to about 20° C., or from about 0° C. to about 15° C., or from about 0° C. to about 9° C. The fabric may be contacted to the water prior to, or after, or simultaneous with, contacting the laundry detergent composition with water.

Another method includes contacting a nonwoven substrate impregnated with an embodiment of the detergent or cleaning composition with soiled material. As used herein, "nonwoven substrate" can comprise any conventionally fashioned nonwoven sheet or web having suitable basis weight, caliper (thickness), absorbency, and strength characteristics. Non-limiting examples of suitable commercially available nonwoven substrates include those marketed under the tradenames SONTARA® by DuPont and POLYWEB® by James River Corp.

Hand washing/soak methods, and combined handwashing with semi-automatic washing machines, are also included.

Kaolin Turbidity

When the detergent or cleaning composition is in the form of a liquid, the kaolin turbidity of the detergent or cleaning composition is preferably not more than 200 mg/L, more preferably not more than 150 mg/L, still more preferably not more than 120 mg/L, particularly preferably not more than 100 mg/L, and most preferably not more than 50 mg/L.

The amount of change (difference) between the kaolin turbidities when the polymer composition of the present invention is added to the liquid detergent or cleaning composition as a detergent builder and when no polymer composition of the present invention is added to the liquid detergent or cleaning composition as a detergent builder is preferably not more than 500 mg/L, more preferably not more than 400 mg/L, still more preferably not more than 300 mg/L, particularly preferably not more than 200 mg/L, and most preferably not more than 100 mg/L.

The value of the kaolin turbidity is measured by the following method: A uniformly stirred sample (liquid detergent) is charged in a 50-mm square cell having a thickness of 10 mm, and bubbles are removed therefrom. Then, the sample is measured for turbidity (kaolin turbidity: mg/L) at 25° C. using an NDH2000 (trade name, turbidity meter) produced by Nippon Denshoku Industries Co., Ltd.

Test Methods

Various techniques are known in the art to determine the properties of the detergents or cleaning compositions of the present invention comprising the sulfonate group-containing polymers, however, the following assays must be used in order that the invention described and claimed herein may be fully understood.

Test 1: Measurement of Weight Average Molecular Weight (Mw)

The weight average molecular weight of the polymers are determined by the technique of Gel Permeation Chromatography (GPC) under the following conditions.

Measuring device: L-7000 series (product of Hitachi Ltd.)
Detector: RI (weight average molecular weight), UV (residual monomer)
Column: SHODEX Asahipak GF-310-HQ, GF-710-HQ, GF-1G 7B (products of Showa Denko K. K.)
Column temperature: 40° C.
Flow velocity: 0.5 mL/min
Calibration curve: Polyacrylic Standard (product of Sowa Kagaku Co., Ltd.)
Eluent: 0.1 N sodium acetate/acetonitrile=3/1 (mass ratio)

Test 2: Measurement of Solids Content

A mixture of 1.0 g of a sulfonate group-containing polymer composition of the present invention and 1.0 g of water is left in an oven heated to 130° C. in nitrogen atmosphere for one hour so as to be dried. The solids content (%) and volatile component content (%) are calculated from the weight difference before and after the drying step.

Test 3: Anti-Soil Redeposition Test (Under Hard Water Conditions)

This test measures the ability of the polymers to prevent soil from depositing onto the fabric. The anti-soil redeposition ability test is performed with carbon black based on the following procedure.

(1) Test fabric selected from white cotton cloth (available from Testfabric Inc.) is cut into 5 cm×5 cm samples. The degree of whiteness is determined for the white cloth samples by measuring the reflectance with a colorimetric color difference meter (SE6000, product of Nippon Denshoku Industries Co., Ltd.).
(2) Pure (ion exchanged) water is added to calcium chloride dihydrate (5.0 g) such that hard water condition (17 kg) is prepared.
(3) An aqueous surfactant solution (100.0 g) is prepared by adding pure (ion exchanged) water to polyoxyethylene (8) lauryl ether (4.0 g) and adjusted to pH 8.5 with sodium hydroxide.
(4) A tergotmeter is set at 25° C. The hard water (1 L), the aqueous surfactant solution (5 g), a 2% (based on the solids content) aqueous polymer solution (1 g), and a test powder 1 (class 11) (1 g) according to JIS Z 8901 are added to a pot, and the contents in the pot are stirred for one minute at 100 rpm. Subsequently, five white cloth samples are put into the mixture solution, and the mixture solution is stirred for 10 minutes at 100 rpm.
(5) The white cloth samples are wrung by hand, and hard water (1 L) at 25° C. is poured into the pot and stirred at 100 rpm for 2 minutes.
(6) The white cloth samples are each pressed with a piece of filler cloth and dried while wrinkles are smoothed. The cloth samples are measured again for reflectance as whiteness with the above-described colorimetric difference meter.
(7) The anti-soil redeposition ratio is determined from based on the measurement results using the following equation:

$$\text{Anti-Soil Redeposition Ratio (\%)} = \left(\frac{\text{Whiteness of White Cloth After Wash}}{\text{Intial Whiteness of White Cloth}}\right) \times 100\%$$

Test 4: Test for Compatibility with Liquid Detergents

Liquid detergents each comprising a sulfonate group-containing polymer of the present invention according to the examples are prepared using the materials listed as follows:
SFT-70H (or SOFTANOL 70H, which is a polyoxyethylene alkyl ether, product of NIPPON SHOKUBAI Co., Ltd.): 11 g
NEOPELEX F-65 (sodium dodecylbenzene sulfonate, product of Kao Corp.): 32 g
Diethanolamine: 10 g
Ethanol: 5 g
Propylene glycol: 5 g
Novel copolymers and comparative copolymers obtained in the examples hereinafter: 1.0 g (based on solids content)
Pure (ion-exchanged) water: balance to provide 100 g of detergent or cleaning composition.

The mixture is sufficiently stirred so that all components are uniformly dispersed. Turbidity of the mixture is visually evaluated at 25° C. The results are evaluated according to the following criteria:

(1) Excellent: No phase separation, no precipitation and no white turbidity are visually observed.
(2) Good: White turbidity is slightly observed.
(3) Fair: White turbidity is visually observed.

Test 5. Whiteness Maintenance Assay

This test is intended to measure the ability of the laundry detergent to prevent loss in whiteness (i.e., whiteness maintenance) of fabrics. Whiteness maintenance of fabrics is evaluated by image analysis after single or multi-cycle washes. Typically, "whiteness" can be reported by its whiteness index, which is conveniently converted from CIELAB (an internationally recognized color scale system developed by CIE ("Commission Internationale de l'Eclairage")). CIE color scale for whiteness is the most commonly used whiteness index and refers to measurements made under D65 illumination, which is the standard representation of outdoor daylight. In technical terms, whiteness is a single number index referencing the relative degree of whiteness (of near-white materials under specific lighting conditions), and the higher the number, the whiter the material. As an example, for a perfect reflecting, non-fluorescent white material, the CIE whiteness index (L*) would be 100.

The steps for assaying whiteness maintenance of sample laundry detergents are as follows:
(1) Dissolve 2.25 g of raw materials of a base laundry detergent in 300 g of triple-filtered (0.1 micron Millipore membrane filter is used with a vacuum Buchner filtering apparatus) deionized water according to the concentrations as provided in Table 1 herein to form a 1.5× concentrated base wash solution.

TABLE 1

FORMULATION OF CONCENTRATED BASE WASH SOLUTION (1.5X)

| Raw Materials | Amount (wt %) |
|---|---|
| Water | 76.21% |
| NaOH (for adjusting pH to 7.5%) | 3.23% |
| Propylene glycol | 2.50% |
| Citric Acid | 1.70% |
| Alkylethoxy sulfates with a weight average degree of ethoxylation of about 3 (AE3S) | 9.84% |
| Linear alkyl benzene sulphonic acid (HLAS) | 6.52% |
| Total | 100.00% |

(2) Transfer 10 ml of the prepared 1.5× concentrated base wash solution into a 40 ml glass vial.

(3) The 10 ml wash solution is then mixed with 345 ul of a polymer solution that contains 1% of either a polymer according to the present invention or a comparative polymer.

(4) Add Teflon-coated magnets into the 40 ml glass vial to provide additional agitation.

(5) Add 3.505 ml deionized (DI) water into the 40 ml glass vial.

(6) Add 150 µl of a 1% stock hard water solution to the base wash solution in the 40 ml glass vial. The 1% stock hard water solution is prepared by the following steps: (i) into a 1 L beaker, 14.08 g of $CaCl_2 \cdot 2H_2O$ and 4.87 g of $MgCl_2 \cdot 6H_2O$ are added; (ii) add 800 ml of de-ionized water; (iii) using a stirring bar and stirring plate, stir the mixture until it is fully dissolved and the solution turns clear; (iv) pour the solution into a 1L volumetric flask and fill to the 1L line; (v) add a stirring bar into the volumetric flask and stir again for about 5 minutes; (vi) remove the stirring bar and refill the volumetric flask with de-ionized water up to the 1L line; (vii) the resulting solution is stored in a plastic bottle for future use.

(7) Add 1 ml of a 45% Arizona Dust clay solution into the wash solution in the 40 mL glass vial to form a test solution having a total volume of about 15 ml. Accordingly, the clay concentration in the test solution is about 3 wt %. The Arizona Dust clay solution is made by the following steps: (i) add 4.5 g of Arizona Dust clay into a 100 ml beaker and then add 95.5 g of de-ionized water thereinto; (ii) use a stirring bar and a stirring plate to stir the mixture for at least 30 mins until the clay is dissolved.

(8) Add 6.1 µl of an artificial body soil to the wash solution in the 40 ml glass vial, to form. The artificial body soil composition is prepared according to Table 2 hereinbelow (note that the artificial body soil will go to solid phase quickly in the glass vial, so it does not contribute to the 15 ml total volume of the final test solution):

TABLE 2

ARTIFICIAL BODY SOIL COMPOSITION

| Ingredients | Amount (wt %) |
|---|---|
| Palm Kernel Fatty Acid | 15% |
| Oleic Acid | 15% |
| Paraffin Oil | 15% |
| Olive Oil | 15% |
| Soja Oil | 15% |
| Squalene | 5% |
| Cholesterol (95%) | 5% |
| Myristic Acid (95%) | 5% |
| Palmitic Acid (95%) | 5% |
| Stearic Acid (90%+) | 5% |

(9) Fabrics used for conducting this test are selected from 1.5 cm-diameter polyester fabrics (PW19) and 1.5 cm-diameter cotton fabrics (CW98) purchased from Empirical Manufacturing Company (Blue Ash, Cincinnati). Eight of the polyester fabrics or the cotton fabrics are added into the wash solution in the 40 mL glass vial to perform the whiteness test via a fast wash cycle.

(10) The 40 ml glass vial containing the wash solution and the test fabrics (either the PW19 polyester fabrics or the CW98 cotton fabrics) are secured tightly to one shaking arm of a Wrist Action Shaker Model 75 (Burrell Scientific, Pittsburgh, Pa.) and shaken for about 20 minutes to mimic a wash cycle.

(11) At the end of the wash, the liquid contents of the 40 ml glass vial are emptied through a Buchner funnel.

(12) The test fabrics remaining inside the 40 ml glass vial are then transferred to another 40 ml glass vial, into which 15 mL of a rinse solution is added. The rinse solution is prepared by adding 150 µl of the 1% stock hard water solution as described hereinabove in Step (6) into 14.85 ml of de-ionized filtered water.

(13) The 40 ml glass vial containing the rinse solution and the test fabrics are secured tightly to one shaking arm of the Wrist Action Shaker and shaken for about 3 minutes to mimic a rinse cycle.

(14) At the end of the rinse, the 40 ml glass vial is removed from the Wrist Action Shaker, and the test fabrics are taken out of the glass vial and placed on black plastic board template to air dry over night.

(15) Two whiteness measurements are carried out for each test fabric using the CIELab color parameters with a Datacolor spectrometer, which include a first whiteness measurement before the wash and rinse cycle (i.e., initial) and a second whiteness measurement after the wash and rinse cycle (i.e., treated).

(16) The difference between the average whiteness measurement of the initial fabrics and that of the treated fabrics is reported as delta W (i.e., ΔW), which is calculated for each test polymer as follows:

$W$=Average Whiteness of Treated Fabrics−Average Whiteness of Initial Fabrics,

Typically, ΔW is a negative value, which is reflective of whiteness loss suffered by fabrics after washing.

(17) A Whiteness Index (ΔWI) is calculated for each test polymer as follows:

$$\Delta WI = \Delta W_{PT} - \Delta W_{PR}$$

wherein:
 $\Delta W_{PT}$=ΔW of the test polymer;
 $\Delta W_{PR}$=ΔW of a reference polymer.

The reference polymer used herein is a sulfonated and ethoxylated (EO24) hexamethylene diamine, which is described in Example 1 of U.S. Pat. No. 6,444,633.

The delta W of the test polymer and the delta W of the reference polymer are typically measured in the same test setting. Specifically, the test polymer and the reference polymer are added into base wash solutions in different glass vials, which are then placed on different but adjacent shaking arms on the Wrist Action Shaker and shaken simultaneously to mimic the wash and rinse cycles.

(18) The Whiteness Index (ΔWI) of a test polymer represents the polymer's relative effectiveness in preventing whiteness loss of a fabric caused by washing, in comparison with that of the reference polymer. A positive ΔWI value indicates that the test polymer is more effective in reducing or preventing fabric whiteness loss than the reference polymer. A negative ΔWI value indicates that the test polymer is less effective than the reference polymer. The higher the ΔWI value, the more effective is the test polymer.

EXAMPLES

Hereinafter, the present invention is described in more detail based on examples. All parts are by weight unless otherwise specified, and all percentages are by mass unless otherwise specified.

A. Synthesis of Polymers

Example 1: Synthesis of Inventive Polymer 1

A 500 ml glass separable flask equipped with a reflux condenser and a stirrer are charged with pure water (49.7 g) and Mohr's salt (0.010 g), and the temperature is raised to 85° C. while stirring. Then, 80% acrylic acid (112.5 g) (hereinafter, abbreviated as 80% AA), a 40% aqueous solution (54.9 g) (92 mmol) of sodium 3-allyloxy-2-hydroxypropanesulfonate (hereinafter, abbreviated as 40% HAPS), a 80% aqueous solution (90.0 g) of an isoprenol-ethylene oxide 10 mol adduct (hereinafter, abbreviated as 80% IPN10), 15% sodium persulfate (30.2 g) (hereinafter, abbreviated as 15% NaPS), 35% sodium hydrogen sulfite (12.9 g) (hereinafter, abbreviated as 35% SBS), and pure water (50.9 g) are added dropwise from different nozzles. The addition times for the respective solutions are 180 min for 80% AA, 150 min for 40% HAPS, 90 min for 80% IPN10, 190 min for 15% NaPS, and 175 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled, and neutralized with 48% sodium hydroxide (89.1 g) (hereinafter, abbreviated as 48% NaOH). Thus, an aqueous copolymer solution (1) having a solid content concentration of 44% and a final degree of neutralization of 90 mol % is prepared (the copolymer is referred to as polymer (1)). The polymer (1) is subjected to the compatibility test, and the compatibility is evaluated as "Excellent".

Example 2: Synthesis of Inventive Polymer 2

A 500 ml glass separable flask equipped with a reflux condenser and a stirrer is charged with pure water (74.1 g) and Mohr's salt (0.010 g), and the temperature is raised to 85° C. while stirring. Then, 80% AA (121.5 g), 40% HAPS (65.9 g) (111 mmol), a 60% aqueous solution (102.0 g) of an isoprenol-ethylene oxide 25 mol adduct (hereinafter, abbreviated as 60% IPN25), 15% NaPS (20.6 g), and 35% SBS (11.0 g) are added dropwise from different nozzles. The addition times for the respective solutions are 180 min for 80% AA, 150 min for 40% HAPS, 150 min for 60% IPN25, 190 min for 15% NaPS, and 175 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (95.7 g). Thus, an aqueous copolymer solution (2) having a solid content concentration of 44% and a final degree of neutralization of 90 mol % is prepared (the copolymer is referred to as polymer (2)). The polymer (2) is subjected to the compatibility test, and the compatibility is evaluated as "Good".

Example 3: Synthesis of Inventive Polymer 3

A 500 ml glass separable flask equipped with a reflux condenser and a stirrer is charged with pure water (83.1 g) and Mohr's salt (0.013 g), and the temperature is raised to 85° C. while stirring. Then, 80% AA (198.0 g), 40% HAPS (25.9 g) (44 mmol), a 60% aqueous solution (31.1 g) of an isoprenol-ethylene oxide 50 mol adduct (hereinafter, abbreviated as 60% IPN50), 15% NaPS (30.1 g), and 35% SBS (10.3 g) are added dropwise from different nozzles. The addition times for the respective solutions are 180 min for 80% AA, 150 min for 40% HAPS, 150 min for 60% IPN50, 190 min for 15% NaPS, and 175 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with pure water (56.3 g) and 48% NaOH (162.6 g). Thus, an aqueous copolymer solution (3) having a solid content concentration of 40% and a final degree of neutralization of 90 mol % is prepared (the copolymer is referred to as polymer (3)).

Example 4: Synthesis of Inventive Polymer 4

A 500 ml glass separable flask equipped with a reflux condenser and a stirrer is charged with pure water (118.0 g) and Mohr's salt (0.012 g), and the temperature is raised to 85° C. while stirring. Then, 80% AA (157.5 g), 40% HAPS (54.9 g) (92 mmol), a 60% aqueous solution (60.0 g) of an isoprenol-ethylene oxide 50 mol adduct (hereinafter, abbreviated as 60% IPN50), 15% NaPS (37.3 g), and 35% SBS (12.5 g) are added dropwise from different nozzles. The addition times for the respective solutions are 180 min for 80% AA, 150 min for 40% HAPS, 150 min for 60% IPN50, 190 min for 15% NaPS, and 175 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (126.6 g). Thus, an aqueous copolymer solution (4) having a solid content concentration of 40% and a final degree of neutralization of 90 mol % is prepared (the copolymer is referred to as polymer (4)).

Example 5: Synthesis of Inventive Polymer 5

A 500 ml glass separable flask equipped with a reflux condenser and a stirrer is charged with pure water (75.0 g) and Mohr's salt (0.011 g), and the temperature is raised to 85° C. while stirring. Then, 80% AA (103.5 g), 40% HAPS (85.7 g) (144 mmol), 60% IPN50 (131.6 g), 15% NaPS (22.4 g), 35% SBS (9.2 g), and pure water (5.0 g) are added dropwise from different nozzles. The addition times for the respective solutions are 180 min for 80% AA, 60 min for 40% HAPS, 100 min for 60% IPN50, 210 min for 15% NaPS, and 200 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with pure water (59.4 g) and 48% NaOH (56.6 g). Thus, an aqueous copolymer solution (5) having a solid content concentration of 40% and a final degree of neutralization of 70 mol % is prepared (the copolymer is referred to as polymer (5)). The polymer (5) is subjected to the compatibility test, and the compatibility is evaluated as "Excellent".

Example 6: Synthesis of Inventive Polymer 6

A 500 ml glass separable flask equipped with a reflux condenser and a stirrer is charged with pure water (116.5 g) and Mohr's salt (0.012 g), and the temperature is raised to 85° C. while stirring. Then, 80% AA (135.0 g), 40% HAPS (65.9 g) (111 mmol), 60% IPN50 (84.0 g), 15% NaPS (32.7 g), and 35% SBS (11.7 g) are added dropwise from different nozzles. The addition times for the respective solutions are 180 min for 80% AA, 150 min for 40% HAPS, 150 min for 60% IPN50, 190 min for 15% NaPS, and 175 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (107.0 g). Thus, an aqueous copolymer solution (6) having a solid content concentration of 40% and a final degree of neutralization of 90 mol % is prepared (the copolymer is referred to as polymer (6)).

Example 7: Synthesis of Inventive Polymer 7

A 500 ml glass separable flask equipped with a reflux condenser and a stirrer is charged with pure water (88.9 g) and Mohr's salt (0.014 g), and the temperature is raised to 85° C. while stirring. Then, 80% AA (135.0 g), 40% HAPS (75.1 g) (126 mmol), 60% IPN50 (150.0 g), 15% NaPS (23.5 g), 35% SBS (15.3 g), and pure water (10.0 g) are added dropwise from different nozzles. The addition times for the respective solutions are 180 min for 80% AA, 60 min for 40% HAPS, 100 min for 60% IPN50, 210 min for 15% NaPS, and 200 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with pure water (62.4 g) and 48% NaOH (106.2 g). Thus, an aqueous copolymer solution (7) having a solid content concentration of 40% and a final degree of neutralization of 90 mol % is prepared (the copolymer is referred to as polymer (7)). The polymer (7) is subjected to the compatibility test, and the compatibility is evaluated as "Excellent".

Example 8: Synthesis of Inventive Polymer 8

A 500 ml glass separable flask equipped with a reflux condenser and a stirrer is charged with pure water (75.0 g) and Mohr's salt (0.011 g), and the temperature is raised to 85° C. while stirring. Then, 80% AA (112.5 g), 40% HAPS (50.1 g) (84 mmol), 60% IPN50 (120.0 g), 15% NaPS (22.8 g), 35% SBS (7.7 g), and pure water (5.0 g) are added dropwise from different nozzles. The addition times for the respective solutions are 180 min for 80% AA, 60 min for 40% HAPS, 100 min for 60% IPN50, 210 min for 15% NaPS, and 200 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with pure water (56.5 g) and 48% NaOH (67.3 g). Thus, an aqueous copolymer solution (8) having a solid content concentration of 40% and a final degree of neutralization of 70 mol % is prepared (the copolymer is referred to as polymer (8)). The polymer (8) is subjected to the compatibility test, and the compatibility is evaluated as "Excellent".

Example 9: Synthesis of Inventive Polymer 9

A 500 ml glass separable flask equipped with a reflux condenser and a stirrer is charged with pure water (45.0 g), 60% IPN50 (60.0 g), and Mohr's salt (0.014 g), and the temperature is raised to 85° C. while stirring. Then, 80% AA (72.0 g), 40% HAPS (96.1 g) (162 mmol), 60% IPN50 (266.4 g), 15% NaPS (70.8 g), 35% SBS (10.3 g), and pure water (10.0 g) are added dropwise from different nozzles. The addition times for the respective solutions are 180 min for 80% AA, 30 min for 40% HAPS, 90 min for 60% IPN50, 210 min for 15% NaPS, and 200 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (51.2 g). Thus, an aqueous copolymer solution (9) having a solid content concentration of 47% and a final degree of neutralization of 90 mol % is prepared (the copolymer is referred to as polymer (9)). The polymer (9) is subjected to the compatibility test, and the compatibility is evaluated as "Excellent".

Example 10: Synthesis of Inventive Polymer 10

A 500 ml glass separable flask equipped with a reflux condenser and a stirrer is charged with pure water (69.0 g) and Mohr's salt (0.011 g), and the temperature is raised to 85° C. while stirring. Then, 80% AA (103.5 g), 40% HAPS (25.0 g) (42 mmol), 60% IPN50 (147.0 g), 15% NaPS (20.5 g), 35% SBS (7.0 g), and pure water (4.6 g) are added dropwise from different nozzles. The addition times for the respective solutions are 180 min for 80% AA, 90 min for 40% HAPS, 100 min for 60% IPN50, 210 min for 15% NaPS, and 200 min for 35% SBS and pure water. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with pure water (70.5 g) and 48% NaOH (64.3 g). Thus, an aqueous copolymer solution (10) having a solid content concentration of 40% and a final degree of neutralization of 70 mol % is prepared (the copolymer is referred to as polymer (10)). The polymer (10) is subjected to the compatibility test, and the compatibility is evaluated as "Excellent".

Example 11: Synthesis of Inventive Polymer 11

A 500 ml glass separable flask equipped with a reflux condenser and a stirrer is charged with pure water (69.6 g) and Mohr's salt (0.010 g), and the temperature is raised to 85° C. while stirring. Then, 80% AA (90.0 g), 48% NaOH (4.2 g), a 40% aqueous solution (74.1 g) (136 mmol) of 2-acrylamide-2-methylpropanesulfonic acid (hereinafter, abbreviated as 40% AMPS), 60% IPN50 (114.4 g), 15% NaPS (31.9 g), and 35% SBS (15.7 g) are added dropwise from different nozzles. The addition times for the respective solutions are 180 min for 80% AA and 48% NaOH, 100 min for 40% AMPS and 60% IPN50, 200 min for 15% NaPS, and 210 min for 35% SBS. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (49.3 g) and pure water (42.8 g). Thus, an aqueous copolymer solution (11) having a solid content concentration of 40% and a final degree of neutralization of 90 mol % is prepared (the copolymer is referred to as polymer (11)). The polymer (11) is subjected to the compatibility test, and the compatibility is evaluated as "Good".

Example 12: Synthesis of Inventive Polymer 12

An aqueous copolymer solution (12) (the copolymer is referred to as polymer (12)) is prepared by polymerizing the monomers and performing the post treatments as in Example 10 except that the proportions of the monomers are changed. The aqueous copolymer solution (12) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=2.2/7.7/90.1, a solid content concentration of 40%, and a final degree of neutralization of 90 mol %. The ratio by mass P of the structural unit (b) to the structural unit (a) of the copolymer is 3.7, the weight average molecular weight (Mw) of the copolymer is 42,000, the product (hereinafter, referred to as P×Mw) of the ratio by mass P of the structural unit (b) to the structural unit (a) multiplied by the weight average molecular weight Mw of the copolymer is 154,000, and the product (hereinafter, referred to as P×Mw×n) of the ratio by mass P of the structural unit (b) to the structural unit (a) multiplied by the weight average molecular weight Mw of the copolymer multiplied by the value n in the formula (2) is 7,700,000.

Example 13: Synthesis of Inventive Polymer 13

An aqueous copolymer solution (13) (the copolymer is referred to as polymer (13)) is prepared by polymerizing the monomers and performing the post treatments as in Example 10 except that the proportions of the monomers are changed. The aqueous copolymer solution (13) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=20/29/51, a solid content concentration of 40%, and a final degree of neutralization of 90 mol %. The ratio by mass P of the structural unit (b) to the structural unit (a) of the copolymer is 1.5, the weight average molecular weight Mw of the copolymer is 23,000, (P×Mw) is 33,400, and (P×Mw×n) is 1,670,000.

Example 14: Synthesis of Inventive Polymer 14

An aqueous copolymer solution (14) (the copolymer is referred to as polymer (14)) is prepared by polymerizing the monomers and performing the post treatments as in Example 1 except that the proportions of the monomers are changed. The aqueous copolymer solution (14) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 40%, and a final degree of neutralization of 90 mol %. The ratio by mass P of the structural unit (b) to the structural unit (a) of the copolymer is 3.1, the weight average molecular weight Mw of the copolymer is 36,000, (P×Mw) is 111,000, and (P×Mw×n) is 1,110,000.

Example 15: Synthesis of Inventive Polymer 15

An aqueous copolymer solution (15) (the copolymer is referred to as polymer (15)) is prepared by polymerizing the monomers and performing the post treatments as in Example 2 except that the proportions of the monomers are changed. The aqueous copolymer solution (15) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 44%, and a final degree of neutralization of 90 mol %. The ratio by mass P of the structural unit (b) to the structural unit (a) of the copolymer is 3.1, the weight average molecular weight Mw of the copolymer is 44,000, (P×Mw) is 136,000, and (P×Mw×n) is 3,400,000.

Example 16: Synthesis of Inventive Polymer 16

An aqueous copolymer solution (16) (the copolymer is referred to as polymer (16)) is prepared by polymerizing the monomers and performing the post treatments as in Example 10 except that the proportions of the monomers are changed. The aqueous copolymer solution (16) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=38/21/41, a solid content concentration of 39%, and a final degree of neutralization of 90 mol %. The ratio by mass P of the structural unit (b) to the structural unit (a) of the copolymer is 0.55, the weight average molecular weight Mw of the copolymer is 50,000, (P×Mw) is 27,600, and (P×Mw×n) is 1,380,000.

Example 17: Synthesis of Inventive Polymer 17

An aqueous copolymer solution (17) (the copolymer is referred to as polymer (17)) is prepared by polymerizing the monomers and performing the post treatments as in Example 10 except that the proportions of the monomers are changed. The aqueous copolymer solution (17) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=26/20/54, a solid content concentration of 40%, and a final degree of neutralization of 90 mol %. The ratio by mass P of the structural unit (b) to the structural unit (a) of the copolymer is 0.77, the weight average molecular weight Mw of the copolymer is 29,000, (P×Mw) is 22,300, and (P×Mw×n) is 1,110,000.

Example 18: Synthesis of Inventive Polymer 18

An aqueous copolymer solution (18) (the copolymer is referred to as polymer (18)) is prepared by polymerizing the monomers and performing the post treatments as in Example 10 except that the proportions of the monomers are changed. The aqueous copolymer solution (18) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/12/77, a solid content concentration of 40%, and a final degree of neutralization of 90 mol %. The ratio by mass P of the structural unit (b) to the structural unit (a) of the copolymer is 1.1, the weight average molecular weight Mw of the copolymer is 57,000, (P×Mw) is 62,200, and (P×Mw×n) is 3,110,000.

Example 19: Synthesis of Inventive Polymer 19

An aqueous copolymer solution (19) (the copolymer is referred to as polymer (19)) is prepared by polymerizing the monomers and performing the post treatments as in Example 10 except that the proportions of the monomers are changed. The aqueous copolymer solution (19) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=27/35/38, a solid content concentration of 40%, and a final degree of neutralization of 90 mol %. The ratio by mass P of the structural unit (b) to the structural unit (a) of the copolymer is 1.3, the weight average molecular weight Mw of the copolymer is 15,000, (P×Mw) is 19,400, and (P×Mw×n) is 972,000. The polymer (19) is subjected to the compatibility test, and the compatibility is evaluated as "Excellent".

Example 20: Synthesis of Inventive Polymer 20

An aqueous copolymer solution (20) (the copolymer is referred to as polymer (20)) is prepared by polymerizing the monomers and performing the post treatments as in Example 10 except that the proportions of the monomers are changed. The aqueous copolymer solution (20) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=16/34/50, a solid content concentration of 40%, and a final degree of neutralization of 90 mol %. The ratio by mass P of the structural unit (b) to the structural unit (a) of the copolymer is 2.1, the weight average molecular weight Mw of the copolymer is 12,000, (P×Mw) is 25,500, and (P×Mw×n) is 1,280,000. The polymer (20) is subjected to the compatibility test, and the compatibility is evaluated as "Excellent".

Example 21: Synthesis of Inventive Polymer 21

An aqueous copolymer solution (21) (the copolymer is referred to as polymer (21)) is prepared by polymerizing the monomers and performing the post treatments as in Example 10 except that the proportions of the monomers are changed. The aqueous copolymer solution (21) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=18/40/42, a solid content concentration of 40%, and a final degree of neutralization of 90 mol %. The ratio by mass P of the structural unit (b) to the structural unit (a) of the copolymer is 2.2, the weight average molecular weight Mw of the copolymer is 31,000, (P×Mw) is 68,900, and (P×Mw×n) is 3,440,000.

Example 22: Synthesis of Inventive Polymer 22

An aqueous copolymer solution (22) (the copolymer is referred to as polymer (22)) is prepared by polymerizing the monomers and performing the post treatments as in Example 10 except that the proportions of the monomers are changed. The aqueous copolymer solution (22) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 40%, and a final degree of neutralization of 90 mol %. The ratio by mass P of the structural unit (b) to the structural unit (a) of the copolymer is 3.1, the weight average molecular weight Mw of the copolymer is 28,000, (P×Mw) is 86,500, and (P×Mw×n) is 4,330,000. The polymer (22) is subjected to the compatibility test, and the compatibility is evaluated as "Good".

Example 23: Synthesis of Inventive Polymer 23

An aqueous copolymer solution (23) (the copolymer is referred to as polymer (23)) is prepared by polymerizing the monomers and performing the post treatments as in Example 10 except that the proportions of the monomers are changed. The aqueous copolymer solution (23) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 40%, and a final degree of neutralization of 90 mol %. The ratio by mass P of the structural unit (b) to the structural unit (a) of the copolymer is 3.1, the weight average molecular weight Mw of the copolymer is 57,000, (P×Mw) is 176,000, and (P×Mw×n) is 8,810,000.

Example 24: Synthesis of Inventive Polymer 24

An aqueous copolymer solution (24) (the copolymer is referred to as polymer (24)) is prepared by polymerizing the monomers and performing the post treatments as in Example 10 except that the proportions of the monomers are changed. The aqueous copolymer solution (24) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=12/40/48, a solid content concentration of 40%, and a final degree of neutralization of 90 mol %. The ratio by mass P of the structural unit (b) to the structural unit (a) of the copolymer is 3.3, the weight average molecular weight Mw of the copolymer is 25,000, (P×Mw) is 83,300, and (P×Mw×n) is 4,170,000. The polymer (24) is subjected to the compatibility test, and the compatibility is evaluated as "Excellent".

Example 25: Synthesis of Inventive Polymer 25

An aqueous copolymer solution (25) (the copolymer is referred to as polymer (25)) is prepared by polymerizing the monomers and performing the post treatments as in Example 10 except that the proportions of the monomers are changed. The aqueous copolymer solution (25) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=13/52/35, a solid content concentration of 40%, and a final degree of neutralization of 70 mol %. The ratio by mass P of the structural unit (b) to the structural unit (a) of the copolymer is 4.0, the weight average molecular weight Mw of the copolymer is 36,000, (P×Mw) is 144,000, and (P×Mw×n) is 7,200,000.

Example 26: Synthesis of Inventive Polymer 26

An aqueous copolymer solution (26) (the copolymer is referred to as polymer (26)) is prepared by polymerizing the monomers and performing the post treatments as in Example 10 except that the proportions of the monomers are changed. The aqueous copolymer solution (26) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/50/39, a solid content concentration of 40%, and a final degree of neutralization of 70 mol %. The ratio by mass P of the structural unit (b) to the structural unit (a) of the copolymer is 4.5, the weight average molecular weight Mw of the copolymer is 65,000, (P×Mw) is 295,000, and (P×Mw×n) is 14,800,000.

Comparative Example 1: Synthesis of Comparative Polymer 1

A 500 ml glass separable flask equipped with a reflux condenser and a stirrer is charged with pure water (46.2 g) and Mohr's salt (0.011 g), and the temperature is raised to 85° C. while stirring. Then, 80% AA (135.0 g), 40% HAPS (135.0 g) (227 mmol), IPN10 (54.0 g), 15% NaPS (36.6 g), and 35% SBS (26.1 g) are added dropwise from different nozzles. The addition times for the respective solutions are 180 min for 80% AA, 90 min for 40% HAPS, 120 min for IPN10, 190 min for 15% NaPS, and 175 min for 35% SBS. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (106.3 g). Thus, a comparative aqueous copolymer solution (1) having a solid content concentration of 48% by weight and a final degree of neutralization of 94 mol % is prepared (the copolymer is referred to as comparative polymer (1)). The comparative polymer (1) is subjected to the compatibility test, and the compatibility is evaluated as "Fair".

Comparative Example 2: Synthesis of Comparative Polymer 2

A 500 ml glass separable flask equipped with a reflux condenser and a stirrer is charged with pure water (80.0 g) and Mohr's salt (0.013 g), and the temperature is raised to 85° C. while stirring. Then, 80% AA (126.0 g), 40% HAPS (224.2 g) (377 mmol), an isoprenol-ethylene oxide 5 mol adduct (hereinafter, abbreviated as IPN5) (20.2 g), 15% NaPS (61.4 g), 35% SBS (8.4 g), and pure water (10.0 g) are added dropwise from different nozzles. The addition times for the respective solutions are 180 min for 80% AA, 40 min for 40% HAPS, 90 min for IPN5, 190 min for 15% NaPS, and 120 min for 35% SBS and pure water. The solutions other than 35% SBS and pure water begin to be added dropwise at the same time. Addition dropwise of the 35% SBS and the pure water is started 60 min after the addition dropwise of the 80% AA is started. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (84.4 g). Thus, a comparative aqueous copolymer solution (2) having a solid content concentration of 40% by weight and a final degree of neutralization of 90 mol % is prepared (the comparative copolymer is referred to as comparative polymer (2)). The comparative polymer (2) is subjected to the compatibility test, and the compatibility is evaluated as "Fair".

Comparative Example 3: Synthesis of Comparative Polymer 3

A 500 ml glass separable flask equipped with a reflux condenser and a stirrer is charged with pure water (12.9 g)

and Mohr's salt (0.012 g), and the temperature is raised to 85° C. while stirring. Then, 80% AA (180.0 g), 40% HAPS (138.5 g) (233 mmol), 60% IPN50 (36.9 g), 15% NaPS (30.2 g), and 35% SBS (32.2 g) are added dropwise from different nozzles. The addition times for the respective solutions are 180 min for 80% AA, 150 min for 40% HAPS, 150 min for 60% IPN50, 190 min for 15% NaPS, and 175 min for 35% SBS. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (141.7 g). Thus, a comparative aqueous copolymer solution (3) having a solid content concentration of 48% by weight and a final degree of neutralization of 92 mol % is prepared (the comparative copolymer is referred to as comparative polymer (3)). The comparative polymer (3) is subjected to the compatibility test, and the compatibility is evaluated as "Fair".

Comparative Example 4: Synthesis of Comparative Polymer 4

A 500 ml glass separable flask equipped with a reflux condenser and a stirrer is charged with pure water (80.3 g) and Mohr's salt (0.011 g), and the temperature is raised to 85° C. while stirring. Then, 80% AA (63.0 g), 40% HAPS (175.8 g) (295 mmol), 60% IPN50 (120.0 g), 15% NaPS (34.2 g), and 35% SBS (14.7 g) are added dropwise from different nozzles. The addition times for the respective solutions are 180 min for 80% AA, 150 min for 40% HAPS, 150 min for 60% IPN50, 190 min for 15% NaPS, and 175 min for 35% SBS. All the solutions begin to be added dropwise at the same time. The temperature of the content is kept at 85° C. until the addition dropwise of 80% AA is finished. Further, the temperature is kept the same for 30 min after the addition dropwise of 80% AA is completed so that the reaction solution is aged, and the polymerization is completed. After completing the polymerization, the reaction solution is cooled and neutralized with 48% NaOH (37.7 g). Thus, a comparative aqueous copolymer solution (4) having a solid content concentration of 40% by weight and a final degree of neutralization of 90 mol % is prepared (the comparative copolymer is referred to as comparative polymer (4)). The comparative polymer (4) is subjected to the compatibility test, and the compatibility is evaluated as "Excellent".

Comparative Example 5: Synthesis of Comparative Polymer 5

A comparative aqueous copolymer solution (5) (the comparative copolymer is referred to as comparative polymer (5)) is prepared by polymerizing the monomers and performing the post treatments as in Comparative Example 2 except that the proportions of the monomers are changed. The comparative aqueous copolymer solution (5) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/19/48, a solid content concentration of 40%, and a final degree of neutralization of 90 mol %. The ratio by mass P of the structural unit (b) to the structural unit (a) of the copolymer is 0.59, the weight average molecular weight Mw of the copolymer is 7,000, (P×Mw) is 4,160, and (P×Mw×n) is 20,800.

Comparative Example 6: Synthesis of Comparative Polymer 6

A comparative aqueous copolymer solution (6) (the comparative copolymer is referred to as comparative polymer (6)) is prepared by polymerizing the monomers and performing the post treatments as in Comparative Example 2 except that the proportions of the monomers are changed. The comparative aqueous copolymer solution (6) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=10/20/70, a solid content concentration of 40%, and a final degree of neutralization of 90 mol %. The ratio by mass P of the structural unit (b) to the structural unit (a) of the copolymer is 2.0, the weight average molecular weight Mw of the copolymer is 12,000, (P×Mw) is 24,000, and (P×Mw×n) is 120,000. The comparative polymer (6) is subjected to the compatibility test, and the compatibility is evaluated as "Fair".

Comparative Example 7: Synthesis of Comparative Polymer 7

A 500 ml glass separable flask equipped with a reflux condenser and a stirrer is charged with pure water (85.3 g) and Mohr's salt (0.011 g), and the temperature is raised to 85° C. while stirring. Then, 80% AA (141.8 g), 40% HAPS (60.4 g) (1.02 mmol), 80% IPN10 (58.5 g), 15% NaPS (35.8 g), and 35% SBS (10.7 g) are added dropwise from different nozzles. The addition times for the respective solutions are 180 min for the 80% AA, 150 min for the 40% HAPS, 150 min for the 80% IPN10, 190 min for the 15% NaPS, and 175 min for the 35% SBS. All the solutions begin to be added dropwise at the same time. The temperature of the content is kept at 85° C. until the addition dropwise of 80% AA is finished. Further, the temperature is kept the same for 30 min after addition dropwise of 80% AA is completed so that the reaction solution is aged, and the polymerization is completed. After completing the polymerization, the reaction solution is cooled and neutralized with 48% NaOH (113.0 g). Thus, an comparative aqueous copolymer solution (7) having a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/26/63, a solid content concentration of 44% and a final degree of neutralization of 90 mol % is prepared (the comparative copolymer is referred to as comparative polymer (7)). The comparative polymer (7) is subjected to the compatibility test, and the compatibility is evaluated as "Good".

Comparative Example 8: Synthesis of Comparative Polymer 8

A comparative aqueous copolymer solution (8) (the comparative copolymer is referred to as comparative polymer (8)) is prepared by polymerizing the monomers and performing the post treatments as in Comparative Example 7 except that the proportions of the monomers are changed. The comparative aqueous copolymer solution (8) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/19/49, a solid content concentration of 43%, and a final degree of neutralization of 90 mol %. The ratio by mass P of the structural unit (b) to the structural unit (a) of the copolymer is 0.59, the weight average molecular weight Mw is 18,000, (P×Mw) is 10,700, and (P×Mw×n) is 107,000.

Comparative Example 9: Synthesis of Comparative Polymer 9

A comparative aqueous copolymer solution (9) (the comparative copolymer is referred to as comparative polymer (9)) is prepared by polymerizing the monomers and performing the post treatments as in Comparative Example 7 except that the proportions of the monomers are changed. The comparative aqueous copolymer solution (9) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=21/20/59, a solid content concentration of 44%, and a final degree of neutralization of 90 mol %. The ratio by mass P of the structural unit (b) to the structural unit (a) of the copolymer is 1.0, the weight average molecular weight Mw is 33,000, (P×Mw) is 31,400, and (P×Mw×n) is 314,000.

Comparative Example 10: Synthesis of Comparative Polymer 10

A comparative aqueous copolymer solution (10) (the comparative copolymer is referred to as comparative polymer (10)) is prepared by polymerizing the monomers and performing the post treatments as in Comparative Example 7 except that the proportions of the monomers are changed. The comparative aqueous copolymer solution (10) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=34/34/32, a solid content concentration of 44%, and a final degree of neutralization of 90 mol %. The ratio by mass P of the structural unit (b) to the structural unit (a) of the copolymer is 1.0, the weight average molecular weight Mw is 33,000, (P×Mw) is 33,000, and (P×Mw×n) is 330,000.

Comparative Example 11: Synthesis of Comparative Polymer 11

A comparative aqueous copolymer solution (11) (the comparative copolymer is referred to as comparative polymer (11)) is prepared by polymerizing the monomers and performing the post treatments as in Comparative Example 7 except that the proportions of the monomers are changed. The comparative aqueous copolymer solution (11) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=19/20/61, a solid content concentration of 44%, and a final degree of neutralization of 90 mol %. The ratio by mass P of the structural unit (b) to the structural unit (a) of the copolymer is 1.1, the weight average molecular weight Mw of the copolymer is 24,000, (P×Mw) is 25,300, and (P×Mw×n) is 253,000.

Comparative Example 12: Synthesis of Comparative Polymer 12

A comparative aqueous copolymer solution (12) (the comparative copolymer is referred to as comparative polymer (12)) is prepared by polymerizing the monomers and performing the post treatments as in Comparative Example 7 except that the proportions of the monomers are changed. The comparative aqueous copolymer solution (12) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=17/24/59, a solid content concentration of 43%, and a final degree of neutralization of 90 mol %. The ratio by mass P of the structural unit (b) to the structural unit (a) of the copolymer is 1.4, the weight average molecular weight Mw of the copolymer is 13,000, (P×Mw) is 18,400, and (P×Mw×n) is 184,000.

Comparative Example 13: Synthesis of Comparative Polymer 13

A comparative aqueous copolymer solution (13) (the comparative copolymer is referred to as comparative polymer (13)) is prepared by polymerizing the monomers and performing the post treatments as in Comparative Example 7 except that the proportions of the monomers are changed. The comparative aqueous copolymer solution (13) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=10/40/50, a solid content concentration of 44%, and a final degree of neutralization of 90 mol %. The ratio by mass P of the structural unit (b) to the structural unit (a) of the copolymer is 4.0, the weight average molecular weight Mw of the copolymer is 15,000, (P×Mw) is 60,000, and (P×Mw×n) is 600,000.

Comparative Example 14: Synthesis of Comparative Polymer 14

A comparative aqueous copolymer solution (14) (the comparative copolymer is referred to as comparative polymer (14)) is prepared by polymerizing the monomers and performing the post treatments as in Example 2 except that the proportions of the monomers are changed. The comparative aqueous copolymer solution (14) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/19/49, a solid content concentration of 40%, and a final degree of neutralization of 90 mol %. The ratio by mass P of the structural unit (b) to the structural unit (a) of the copolymer is 0.59, the weight average molecular weight Mw of the copolymer is 11,000, (P×Mw) is 6,530, and (P×Mw×n) is 163,000.

Comparative Example 15: Synthesis of Comparative Polymer 15

A comparative aqueous copolymer solution (15) (the comparative copolymer is referred to as comparative polymer (15)) is prepared by polymerizing the monomers and performing the post treatments as in Example 2 except that the proportions of the monomers are changed. The comparative aqueous copolymer solution (15) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=26/26/48, a solid content concentration of 40%, and a final degree of neutralization of 90 mol %. The ratio by mass P of the structural unit (b) to the structural unit (a) of the copolymer is 1.0, the weight average molecular weight Mw of the copolymer is 9,000, (P×Mw) is 9,000, and (P×Mw×n) is 225,000.

Comparative Example 16: Synthesis of Comparative Polymer 16

A comparative aqueous copolymer solution (16) (the comparative copolymer is referred to as comparative polymer (16)) is prepared by polymerizing the monomers and performing the post treatments as in Example 2 except that the proportions of the monomers are changed. The comparative aqueous copolymer solution (16) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/32/36, a solid content concentration of 40%, and a final degree of neutralization of 90 mol %. The ratio by mass P of the structural unit (b) to the structural unit (a) of the copolymer is 1.0, the weight average molecular weight Mw of the copolymer is 22,000, (P×Mw) is 22,000, and (P×Mw×n) is 550,000.

Comparative Example 17: Synthesis of Comparative Polymer 17

A comparative aqueous copolymer solution (17) (the comparative copolymer is referred to as comparative polymer (17)) is prepared by polymerizing the monomers and performing the post treatments as in Example 2 except that the proportions of the monomers are changed. The comparative aqueous copolymer solution (17) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=18/20/62, a solid content concentration of 44%, and a final degree of neutralization of 90 mol %. The ratio by mass P of the structural unit (b) to the structural unit (a) of the copolymer is 1.1, the weight average molecular weight Mw of the copolymer is 23,000, (P×Mw) is 25,600, and (P×Mw×n) is 639,000.

Comparative Example 18: Synthesis of Comparative Polymer 18

A comparative aqueous copolymer solution (18) (the comparative copolymer is referred to as comparative polymer (18)) is prepared by polymerizing the monomers and performing the post treatments as in Example 2 except that the proportions of the monomers are changed. The comparative aqueous copolymer solution (18) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=10/20/70, a solid content concentration of 40%, and a final degree of neutralization of 90 mol %. The ratio by mass P of the structural unit (b) to the structural unit (a) of the copolymer is 2.0, the weight average molecular weight Mw of the copolymer is 9,000, (P×Mw) is 18,000, and (P×Mw×n) is 450,000.

B. Anti-Redeposition Tests of Inventive Polymers and Comparative Polymers

The following Table 3 shows monomer components, the proportions of the structural units (a), (b), and (c), the proportion of the structural unit (b) to the structural unit (a), the weight average molecular weight (Mw), the product of the ratio by mass P of the structural unit (b) to the structural unit (a) multiplied by the weight average molecular weight Mw, the product of the ratio by mass P of the structural unit (b) to the structural unit (a) multiplied by the weight average molecular weight Mw of the sulfonate group-containing copolymer multiplied by the value n in the formula (2), the results of evaluations of anti-redeposition properties of the polymers obtained in the Inventive Examples and Comparative Examples and the results of test for compatibility with liquid detergents.

Note that the evaluation of anti-redeposition properties in the present invention is performed with detergent compositions that are intended for liquid detergents without zeolite.

Zeolite is a water softener which catches metal ions such as calcium ions and magnesium ions contained in water to reduce hardness of water. Therefore, the tests are performed under a higher hardness condition than when a zeolite-containing detergent is used. Further, the tests are performed using dirt (test powder 1 (class 11 clay) according to JIS Z 8901) as typical hydrophilic particle soil. As a result, the evaluation of anti-redeposition properties shows that the polymer of the present invention has excellent anti-redeposition properties against hydrophilic particles under high hardness condition.

TABLE 3

| | Monomer component | | | Proportion of each structural unit (% by mass) | | | | Structural unit (b)/ Structural unit (a) (P) | Weight average molecular weight (Mw) | (P) × (Mw) | (P) × (Mw) × (n) | Anti-redeposition properties (%) | Compatibility |
|---|---|---|---|---|---|---|---|---|---|---|---|---|---|
| | Sulfonate group-containing monomer (A) | (Polyoxyalkylene) monomer (B) | Carboxyl group-containing monomer (C) | Structural unit (a) | Structural unit (b) | Structural unit (c) | | | | | | | |
| Example 1 | HAPS | IPN10 | AA | 10 | 40 | 50 | | 4.0 | 27,000 | 108,000 | 1,080,000 | 65.8 | Excellent |
| Example 2 | HAPS | IPN25 | AA | 12 | 34 | 54 | | 2.8 | 32,000 | 90,700 | 2,270,000 | 66.8 | Good |
| Example 3 | HAPS | IPN50 | AA | 5 | 10 | 85 | | 2.0 | 47,000 | 94,000 | 4,700,000 | 66.3 | Fair |
| Example 4 | HAPS | IPN50 | AA | 10 | 20 | 70 | | 2.0 | 27,000 | 54,000 | 2,700,000 | 66.3 | Fair |
| Example 5 | HAPS | IPN50 | AA | 15 | 42 | 44 | | 2.8 | 70,000 | 196,000 | 9,800,000 | 67.3 | Excellent |
| Example 6 | HAPS | IPN50 | AA | 12 | 28 | 60 | | 2.3 | 23,000 | 53,700 | 2,680,000 | 68.1 | Fair |
| Example 7 | HAPS | IPN50 | AA | 11 | 40 | 49 | | 3.6 | 42,000 | 153,000 | 7,640,000 | 67.0 | Excellent |
| Example 8 | HAPS | IPN50 | AA | 9 | 40 | 51 | | 4.4 | 72,000 | 320,000 | 16,000,000 | 66.9 | Excellent |
| Example 9 | HAPS | IPN50 | AA | 13 | 64 | 23 | | 4.9 | 44,000 | 217,000 | 10,800,000 | 65.5 | Excellent |
| Example 10 | HAPS | IPN50 | AA | 5 | 49 | 46 | | 9.8 | 68,000 | 666,000 | 33,300,000 | 67.7 | Excellent |
| Example 11 | AMPS | IPN50 | AA | 16 | 41 | 43 | | 2.6 | 70,000 | 179,000 | 8,970,000 | 64.9 | Good |
| Example 12 | HAPS | IPN50 | AA | 2 | 8 | 90 | | 3.7 | 42,000 | 154,000 | 7,700,000 | 65.6 | — |
| Example 13 | HAPS | IPN50 | AA | 20 | 29 | 51 | | 1.5 | 23,000 | 33,400 | 1,670,000 | 65.1 | — |
| Example 16 | HAPS | IPN50 | AA | 38 | 21 | 41 | | 0.55 | 50,000 | 27,600 | 1,380,000 | 65.9 | — |
| Example 18 | HAPS | IPN50 | AA | 11 | 12 | 77 | | 1.1 | 57,000 | 62,200 | 3,110,000 | 66.6 | Excellent |
| Example 19 | HAPS | IPN50 | AA | 27 | 35 | 38 | | 1.3 | 15,000 | 19,400 | 972,000 | 64.8 | Excellent |
| Example 20 | HAPS | IPN50 | AA | 16 | 34 | 50 | | 2.1 | 12,000 | 25,500 | 1,280,000 | 65.4 | — |
| Example 22 | HAPS | IPN50 | AA | 11 | 34 | 55 | | 3.1 | 28,000 | 86,500 | 4,330,000 | 67.9 | Good |
| Example 23 | HAPS | IPN50 | AA | 11 | 34 | 55 | | 3.1 | 57,000 | 176,000 | 8,810,000 | 67.4 | — |
| Example 24 | HAPS | IPN50 | AA | 12 | 40 | 48 | | 3.3 | 25,000 | 83,300 | 4,170,000 | 66.7 | Excellent |
| Example 26 | HAPS | IPN50 | AA | 11 | 50 | 39 | | 4.5 | 65,000 | 295,000 | 14,800,000 | 66.3 | — |
| Comparative Example 1 | HAPS | IPN10 | AA | 22 | 26 | 52 | | 1.2 | 20,000 | 23,600 | 236,000 | 63.7 | Poor |
| Comparative Example 2 | HAPS | IPN5 | AA | 38 | 10 | 52 | | 0.26 | 67,000 | 17,600 | 88,200 | 62.0 | Poor |
| Comparative Example 3 | HAPS | IPN50 | AA | 22 | 10 | 68 | | 0.45 | 15,000 | 6,820 | 341,000 | 63.9 | Poor |
| Comparative Example 4 | HAPS | IPN50 | AA | 32 | 40 | 28 | | 1.3 | 15,000 | 18,800 | 938,000 | 62.9 | Excellent |

C. Whiteness Maintenance Performance of Inventive Polymers and Comparative Polymers Whiteness maintenance performance of selected sulfonate group-containing polymers according to the present invention (i.e., inventive polymers) and that of selected polymers that fall outside of the scope of the present invention (i.e., comparative polymers) are evaluated. Specifically, the Whiteness Index (ΔWI) of the selected inventive polymers and the selected comparative polymers are measured by using the Whiteness Maintenance Assay as described hereinabove in Test 5, and the corresponding results are tabulated hereinafter in Table 4.

As a result, the whiteness maintenance assay test shows that inventive polymers according to the present invention has superior whiteness maintenance performance over the comparative polymers that do not fall within the scope of the present invention.

TABLE 4

|  | Proportion of Structural Units (% by mass) | | | IPN/HAPS (P) | Mw (Dalton) | P × Mw | P × Mw × n | ΔWI (PW19) | ΔWI (CW98) |
| --- | --- | --- | --- | --- | --- | --- | --- | --- | --- |
|  | HAPS | IPN | AA | | | | | | |
| Inventive Polymer 2 | 12 | 34 (n = 25) | 54 | 2.8 | 32,000 | 90,667 | 2,266,000 | 2.14 | 2.17 |
| Inventive Polymer 8 | 9 | 40 (n = 50) | 51 | 4.4 | 72,000 | 320,000 | 16,000,000 | 2.59 | 3.54 |
| Inventive Polymer 24 | 12 | 40 (n = 50) | 48 | 3.3 | 25,000 | 83,333 | 4,166,000 | 0.50 | 2.28 |
| Inventive Polymer 23 | 11 | 34 (n = 50) | 55 | 3.1 | 57,000 | 176,182 | 8,809,000 | 0.61 | 3.37 |
| Inventive Polymer 5 | 15 | 42 (n = 50) | 44 | 2.8 | 70,000 | 196,000 | 9,800,000 | 1.02 | 3.34 |
| Comparative Polymer 6 | 10 | 20 (n = 5) | 70 | 2.0 | 12,000 | 24,000 | 120,000 | −1.92 | −4.47 |
| Comparative Polymer 9 | 21 | 20 (n = 10) | 59 | 1.0 | 33,000 | 31,429 | 314,000 | −0.72 | −2.29 |

D. Exemplary Detergent or Cleaning Compositions

Example I. Exemplary Liquid Laundry Detergent Compositions

The following liquid laundry detergent compositions are prepared by traditional means known to those of ordinary skill in the art by mixing the following ingredients.

TABLE 5

| Ingredients (wt %) | A | B | C |
| --- | --- | --- | --- |
| AES[1] | 17.00 | 2.00 | 11.00 |
| LAS[2] | 2.80 | 15.00 | 10.00 |
| AE[3] | 2.30 | 2.37 | 3.44 |
| Citric Acid | 5.00 | 1.98 | — |
| Boric Acid | — | 1.00 | 3.00 |
| Amine Oxide | 1.20 | — | 0.50 |
| Trimethyl Lauryl Ammonium Chloride | — | 1.50 | — |
| Inventive Polymers (as described in Inventive Examples 1-26) | 0.50 | 1.00 | 2.00 |
| Fatty Acids | 1.20 | 1.20 | 1.20 |
| Protease (54.5 mg/g)[4] | 7.62 | 7.98 | 2.08 |
| Amylase (29.26 mg/g)[5] | 2.54 | 2.67 | 0.69 |
| Xyloglucanase[6] | — | — | 0.15 |
| Borax | 4.72 | 4.94 | — |
| Calcium Formate | 0.15 | 0.16 | 0.16 |
| Ethoxylated Polyethylenimine[7] | 1.65 | 1.73 | 1.74 |
| Amphiphilic polymer[8] | — | 1.50 | 4.36 |
| Hexamethylene diamine, ethoxylated, quaternized, sulfated[9] | — | — | 1.68 |
| DTPA[10] (50% active) | 0.28 | 0.30 | 0.64 |
| Tiron ® | 0.84 | 0.89 | — |
| Optical Brightener[11] | 0.34 | 0.37 | 0.36 |
| Ethanol | 0.97 | 4.10 | 2.99 |
| Propylene Glycol | 4.90 | 5.16 | 8.49 |
| Diethylene Glycol | — | — | 4.11 |
| Monoethanolamine (MEA) | 1.12 | 1.17 | 0.23 |
| Caustic Soda (NaOH) | 3.50 | 3.74 | 2.10 |
| Na Formate | 0.61 | 0.64 | 0.23 |
| Na Cumene Sulfonate | — | — | 1.00 |
| Suds Suppressor | — | — | 0.18 |
| Dye | 0.01 | — | 0.02 |
| Perfume | 0.85 | — | 1.00 |
| Preservative[12] | 0.05 | 0.50 | — |
| Hydrogenated castor oil | — | — | 0.27 |
| Water | Q.S. | Q.S. | Q.S. |

[1]AES can be AE$_{1.5}$S, AE$_2$S, and/or AE$_3$S, in the amount ranging from 0-20%.
[2]LAS can be provided in the amount ranging from 0-20%.
[3]AE is a C12-14 alcohol ethoxylate, with an average degree of ethoxylation of 7-9, supplied by Huntsman, Salt Lake City, Utah, USA. It can be provided in the amount ranging from 0-10%.
[4]Proteases may be supplied by Genencor International, Palo Alto, California, USA (e.g., Purafect Prime ®, Excellase ®) or by Novozymes, Bagsvaerd, Denmark (e.g. Liquanase ®, Coronase ®).
[5]Available from Novozymes, Bagsvaerd, Denmark (e.g., Natalase ®, Mannaway ®).
[6]Available from Novozymes (e.g., Whitezyme ®).
[7]Polyethyleneimine (MW = 600) with 20 ethoxylate groups per —NH.
[8]Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units, available from BASF as Sokalan PG101 ®.
[9]A compound having the following general structure: bis(($C_2H_5O$)($C_2H_4O$)$_n$)($CH_3$)—$N^+$—$C_xH_{2x}$—$N^+$—($CH_3$)—bis(($C_2H_5O$)($C_2H_4O$)$_n$), wherein n = from 20 to 30, and x = from 3 to 8, or sulphated or sulphonated variants thereof, available from BASF as Lutenzit Z 96 ®
[10]DTPA is diethylenetriaminepentaacetic acid supplied by Dow Chemical, Midland, Michigan, USA.
[11]Suitable Fluorescent Whitening Agents are for example, Tinopal ® AMS, Tinopal ® CBS-X, Sulphonated zinc phthalocyanine Ciba Specialty Chemicals, Basel, Switzerland. It can be provided in the amount ranging from 0-5%.
[12]Suitable preservatives include methylisothiazolinone (MIT) or benzisothiazolinone (BIT), which can be provided in the amount ranging from 0-1%.

Example II. Exemplary Liquid Detergent Compositions for Use in Unit Dose (UD) Products The following liquid detergent compositions are prepared and encapsulated in a multi-compartment pouch formed by a polyvinyl alcohol-film.

TABLE 6

|  | A | B |
| --- | --- | --- |
| Usage (g) | 25.36 | 24.34 |
| Usage (ml) | 23.70 | 22.43 |
| Wash Volume (L) | 64 | 64 |
| Anionic/Nonionic ratio | 1.73 | 9.9 |
| Ingredients (wt %) | | |
| Linear $C_9$-$C_{15}$ Alkylbenzene sulfonic acid | 18.25 | 22.46 |
| HC24/25 AE2/3S 90/10 blend | 8.73 | 15.29 |
| $C_{12-14}$ alkyl 9-ethoxylate | 15.56 | 3.82 |

TABLE 6-continued

| | A | B |
|---|---|---|
| Citric Acid | 0.65 | 1.55 |
| Fatty acid | 6.03 | 6.27 |
| Chelants | 1.16 | 0.62 |
| Cleaning polymers | 7.42 | 5.33 |
| Enzymes | 0.11 | 0.12 |
| Brightener 49 | 0.18 | 0.19 |
| Structurant | 0.10 | 0.10 |
| Solvent system* | 20.31 | 17.96 |
| Water | 10.31 | 11.66 |
| Perfume | 1.63 | 1.70 |
| Aesthetics | 1.48 | 1.13 |
| Mono-ethanolamine or NaOH (or mixture thereof) | 6.69 | 9.75 |
| Other laundry adjuncts/minors | Q.S. | Q.S. |

*May include, but not limited to propanediol, glycerol, ethanol, dipropyleneglycol, polytheyleneglycol, polypropyleneglycol.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A detergent or cleaning composition comprising a sulfonate group-containing copolymer that comprises:
   a structural unit (a) derived from a sulfonate group-containing monomer (A);
   a structural unit (b) derived from a polyoxyalkylene monomer (B) represented by the following formula (1):

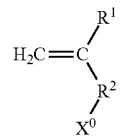

(1)

wherein $R^1$ represents a hydrogen atom or a methyl group; $R^2$ represents a direct bond, $CH_2$, or $CH_2CH_2$; and $X^0$ represents a structural unit represented by the following formula (2):

$$-Zn-OR^0 \qquad (2)$$

wherein Z may be the same or different and each represents a structural unit derived from a $C_2$-$C_{20}$ alkylene oxide; $R^0$ represents hydrogen atom or a $C_1$-$C_{30}$ organic group; and n is an integer of from 1 to 200; and a structural unit (c) derived from a carboxyl group-containing monomer (C), wherein the sulfonate group-containing copolymer comprises from 20% to 90% by mass in an acid form equivalent of the structural unit (c) in 100% by mass of all monomer structural units constituting the sulfonate group-containing copolymer, and wherein said sulfonate group-containing copolymer is characterized by a parameter of P×Mw×n that ranges from 950,000 to 8,000,000, wherein:

P is defined as the ratio by mass of the structural unit (b) to the structural unit (a) in the sulfonate group-containing copolymer, Mw is the weight average molecular weight of the sulfonate group-containing copolymer, and n is the interger in said formula (2), wherein the composition further comprises an anionic surfactant selected from the group consisting of alkyl benzene sulfonate, alkoxylated alkyl sulfates, alkyl sulfates, and mixtures thereof.

2. The detergent or cleaning composition according to claim 1, wherein the weight average molecular weight (Mw) of the sulfonate group-containing copolymer is from 20,000 to 200,000.

3. The detergent or cleaning composition according to claim 1, wherein the ratio by mass (P) of the structural unit (b) to the structural unit (a) in the sulfonate group-containing copolymer is from 1.2 to 20.

4. The detergent or cleaning composition according to claim 1, wherein the sulfonate group-containing monomer (A) is a compound represented by the following formula (3):

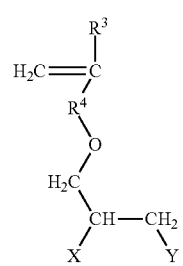

(3)

wherein $R^3$ represents a hydrogen atom or a methyl group; $R^4$ represents a direct bond, $CH_2$, or $CH_2CH_2$; X and Y each represent a hydroxy group or $SO_3M$ where M represents a hydrogen atom, Li, Na, or K, and at least one of X and Y is $SO_3M$.

5. The detergent or cleaning composition according to claim 1, wherein the sulfonate group-containing copolymer comprises from 2% to 38%, by mass in an acid form equivalent of the structural unit (a) in 100% by mass of all monomer structural units constituting the sulfonate group-containing copolymer.

6. The detergent or cleaning composition according to claim 1, wherein the sulfonate group-containing copolymer comprises from 9% to 76%, by mass of the structural unit (b) in 100% by mass of all monomer structural units constituting the sulfonate group-containing copolymer.

7. The detergent or cleaning composition according to claim 1, wherein the integer (n) in formula (2) is from 5 to 100.

8. The detergent or cleaning composition according to claim 1, wherein the sulfonate group-containing copolymer comprises from 25% to 85%, by mass in acid form equivalent of the structural unit (c) in 100% by mass of all monomer structural units constituting the sulfonate group-containing copolymer.

9. The detergent or cleaning composition according to claim 1, wherein the sulfonate group-containing copolymer comprises:
  (i) from 5% to 16% by mass of the structure unit (a) in acid form equivalent in 100% by mass of all monomer structural units constituting the sulfonate group-containing copolymer, wherein the sulfonate group-containing monomer (A) is 3-allyloxy-2-hydroxypropane-sulfonate;
  (ii) from 30% to 45% by mass of the structure unit (b) in 100% by mass of all monomer structural units constituting the sulfonate group-containing copolymer, wherein the polyoxyalkylene monomer (B) comprises an ethylene oxide-derived group having from 40 to 60 repeating oxyethylene units; and
  (iii) from 40% to 55% by mass of the structure unit (c) in acid form equivalent in 100% by mass of all monomer structural units constituting the sulfonate group-containing copolymer, wherein the carboxyl group-containing monomer (C) is acrylic acid or a salt thereof,
wherein the ratio by mass (P) of the structural unit (b) to the structural unit (a) in the sulfonate group-containing copolymer is from 2.5 to 5, wherein the weight average molecular weight (Mw) of the sulfonate group-containing copolymer is from 30,000 to 75,000, and wherein the parameter of P×Mw×n ranges from 1,000,000 to 50,000,000.

10. The detergent or cleaning composition according to claim 1, wherein the detergent or cleaning composition is selected from the group consisting of a laundry detergent composition, a hard surface cleaning composition, a hand dishwashing composition, and an automatic dishwashing composition.

11. The detergent or cleaning composition according to claim 1, further comprising a surfactant selected from the group consisting of cationic surfactants, nonionic surfactants, amphoteric surfactants, zwitterionic surfactants, and mixtures thereof.

12. The detergent or cleaning composition according to claim 1, wherein the detergent or cleaning composition is a liquid laundry detergent composition that further comprises one or more adjunct cleaning additives selected from the group consisting of builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, perfumes, and mixtures thereof.

13. The detergent or cleaning according to claim 1, wherein the detergent or cleaning composition is substantially free of zeolite builder and phosphate builder.

14. The detergent or cleaning composition according to claim 2, wherein the weight average molecular weight (Mw) of the sulfonate group-containing copolymer is from 25,000 to 100,000.

15. The detergent or cleaning composition according to claim 3, wherein the ratio by mass (P) of the structural unit (b) to the structural unit (a) in the sulfonate group-containing copolymer is from 1.5 to 15.

16. The detergent or cleaning composition according to claim 5, wherein the sulfonate group-containing copolymer comprises from 4% to 20%, by mass in an acid form equivalent of the structural unit (a) in 100% by mass of all monomer structural units constituting the sulfonate group-containing copolymer.

17. The detergent or cleaning composition according to claim 6, wherein the sulfonate group-containing copolymer comprises from 20% to 49% by mass of the structural unit (b) in 100% by mass of all monomer structural units constituting the sulfonate group-containing copolymer.

18. The detergent or cleaning composition according to claim 7, wherein the integer (n) in formula (2) is from 10 to 80.

19. The detergent or cleaning composition according to claim 18, wherein the integer (n) in formula (2) is from 40 to 60.

20. The detergent or cleaning composition according to claim 8, wherein the sulfonate group-containing copolymer comprises from 35% to 75%, by mass in acid form equivalent of the structural unit (c) in 100% by mass of all monomer structural units constituting the sulfonate group-containing copolymer.

21. The detergent or cleaning composition according to claim 1, wherein the detergent or cleaning composition is a liquid.

22. The detergent or cleaning composition according to claim 1, wherein the detergent or cleaning composition is in a single phase or multiphase unit dose form containing a liquid detergent or cleaning composition encapsulated in a single compartment or multi-compartment water-soluble pouch.

23. The detergent or cleaning composition according to claim 1, wherein the sulfonate group-containing copolymer comprises from about 40 to about 55% by mass in an acid form equivalent of the structural unit (c) in 100% by mass of all monomer structural units constituting the sulfonate group-containing copolymer.

* * * * *